(12) United States Patent
Chiang et al.

(10) Patent No.: US 10,654,640 B2
(45) Date of Patent: May 19, 2020

(54) CONTAINER FOR TRANSPORT AND STORAGE OF FOOD PRODUCTS

(71) Applicant: Zume, Inc., Mountain View, CA (US)

(72) Inventors: Casper W. Chiang, Danville, CA (US); Douglas J. Minkler, Mill Valley, CA (US); Julia Collins, San Francisco, CA (US); Alexander John Garden, Tiburon, CA (US); Chester Wajda, San Francisco, CA (US)

(73) Assignee: Zume, Inc., Mountain View, CA (US)

( * ) Notice: Subject to any disclaimer, the term of this patent is extended or adjusted under 35 U.S.C. 154(b) by 0 days.

(21) Appl. No.: 16/029,047

(22) Filed: Jul. 6, 2018

(65) Prior Publication Data
US 2019/0009968 A1 Jan. 10, 2019

Related U.S. Application Data

(60) Provisional application No. 62/529,933, filed on Jul. 7, 2017.

(51) Int. Cl.
*B65D 81/26* (2006.01)
*B65D 21/02* (2006.01)
(Continued)

(52) U.S. Cl.
CPC .......... *B65D 81/261* (2013.01); *A47J 47/145* (2013.01); *B65D 1/36* (2013.01); *B65D 21/0222* (2013.01);
(Continued)

(58) Field of Classification Search
CPC .............. B65D 81/261; B65D 21/0222; B65D 81/3813; B65D 1/36; B65D 43/0204;
(Continued)

(56) References Cited

U.S. PATENT DOCUMENTS

| 1,236,360 A | 8/1917 | Rice | |
| 1,587,288 A * | 6/1926 | Dooly | A21B 3/13 249/120 |

(Continued)

FOREIGN PATENT DOCUMENTS

| AU | 1977025870 | 6/1976 |
| AU | 2018211256 | 8/2018 |

(Continued)

OTHER PUBLICATIONS

Casper W. Chang et al., "Container for Transport and Storage of Food Products," U.S. Appl. No. 62/311,787, filed Mar. 22, 2016, 50 pages.

(Continued)

*Primary Examiner* — Kareen K Thomas

(57) ABSTRACT

Systems and methods for providing compostable food containers which preserve the quality of a food product for an extended duration of time, and which optionally allow for cooking of the food product therein. In some implementations, the food containers are sturdy, stackable, insulating, and require minimal or no manual labor to assemble. In some implementations, the food container includes a base and a cover which cooperate to form a closed chamber for supporting, protecting, insulating and optionally cooking a food product, such as a pizza. The base and cover may each be formed of a single layer of material including, but not limited to, molded sugarcane fiber ("bagasse"), molded wood fiber, molded bamboo fiber, molded paper or plastic. The base and/or the cover may include one or more detachable portions that may be selectively separable from the remaining portion of the base and/or cover.

42 Claims, 30 Drawing Sheets

(51) Int. Cl.

| | | |
|---|---|---|
| *B65D 25/04* | (2006.01) | |
| *B65D 43/02* | (2006.01) | |
| *A47J 47/14* | (2006.01) | |
| *B65D 85/36* | (2006.01) | |
| *B65D 65/46* | (2006.01) | |
| *B65D 1/36* | (2006.01) | |
| *B65D 81/38* | (2006.01) | |

(52) U.S. Cl.
CPC ......... *B65D 21/0233* (2013.01); *B65D 25/04* (2013.01); *B65D 43/0204* (2013.01); *B65D 65/466* (2013.01); *B65D 81/3813* (2013.01); *B65D 85/36* (2013.01); *B65D 2543/00092* (2013.01); *B65D 2543/00361* (2013.01); *B65D 2581/3406* (2013.01); *B65D 2585/366* (2013.01)

(58) Field of Classification Search
CPC ...... B65D 25/04; B65D 85/36; B65D 65/466; B65D 21/0233; B65D 2581/3406; B65D 2543/00361; B65D 2585/366; B65D 2543/00092; A47J 47/145
See application file for complete search history.

(56) References Cited

U.S. PATENT DOCUMENTS

| | | | |
|---|---|---|---|
| 1,718,668 A | 6/1929 | Smythe | |
| 2,301,510 A | 11/1942 | Bolen | |
| 3,132,423 A | 5/1964 | De Lano | |
| 3,155,303 A | 11/1964 | Fenkel | |
| 3,268,198 A | 8/1966 | Swett | |
| 3,392,468 A | 7/1968 | Wolf | |
| D215,766 S | 10/1969 | Dusek | |
| 3,664,256 A | 5/1972 | Peirce | |
| D223,854 S | 6/1972 | Swett | |
| 3,929,564 A | 12/1975 | Reifers | |
| 3,954,178 A | 5/1976 | Mason, Jr. | |
| 3,985,991 A | 10/1976 | Levinson | |
| D242,108 S | 11/1976 | Dart | |
| D243,912 S | 4/1977 | Daenen | |
| D244,065 S | 4/1977 | Daenen | |
| 4,061,241 A | 12/1977 | Retelny | |
| 4,120,398 A | 10/1978 | Braddon | |
| 4,127,189 A | 11/1978 | Shumrack et al. | |
| D252,008 S | 6/1979 | Jeambey | |
| 4,197,940 A | 4/1980 | DeRossett | |
| 4,360,118 A | 11/1982 | Stern | |
| 4,373,633 A | 2/1983 | Lutz, Sr. | |
| 4,373,636 A * | 2/1983 | Hoffman | B65D 1/34 206/545 |
| 4,498,586 A | 2/1985 | Vitale | |
| 4,632,836 A | 12/1986 | Abbott et al. | |
| 4,656,068 A | 4/1987 | Raines | |
| 4,816,646 A | 3/1989 | Solomon et al. | |
| 4,886,179 A * | 12/1989 | Volk | B65D 21/0204 220/23.4 |
| D306,118 S | 2/1990 | Guerrero | |
| D307,243 S | 4/1990 | Baker | |
| 4,919,477 A | 4/1990 | Bingham et al. | |
| 5,101,997 A * | 4/1992 | Bagwell | B65F 1/0066 220/23.4 |
| D333,754 S | 3/1993 | Conti | |
| 5,215,775 A | 6/1993 | Hoffman, Jr. | |
| 5,271,518 A | 12/1993 | Webb | |
| 5,273,174 A | 12/1993 | Fisher | |
| D348,219 S | 6/1994 | Goldberg | |
| D350,046 S | 8/1994 | Zimmerman | |
| 5,377,860 A | 1/1995 | Littlejohn et al. | |
| 5,411,140 A | 5/1995 | Byer | |
| 5,423,477 A | 6/1995 | Valdman et al. | |
| D361,594 S | 8/1995 | Salis | |
| 5,472,139 A | 12/1995 | Valdman et al. | |
| 5,518,133 A | 5/1996 | Hayes et al. | |
| D371,511 S | 7/1996 | Giarracca | |
| D373,704 S | 9/1996 | Doxey | |
| 5,732,610 A | 3/1998 | Halladay et al. | |
| D393,801 S | 4/1998 | Hayes et al. | |
| D394,005 S | 5/1998 | Marijnissen | |
| D395,599 S | 6/1998 | Wyslotsky | |
| D398,846 S | 9/1998 | Wyslotsky | |
| D398,847 S | 9/1998 | Wyslotsky et al. | |
| D398,848 S | 9/1998 | Wyslotsky | |
| D400,394 S | 11/1998 | Banach et al. | |
| 5,873,294 A | 2/1999 | Scuito | |
| 5,878,904 A * | 3/1999 | Schweigert | B65F 1/085 220/23.4 |
| D415,652 S | 10/1999 | Loew | |
| 5,997,924 A | 12/1999 | Olander, Jr. et al. | |
| D433,334 S | 11/2000 | Hayes et al. | |
| D438,466 S | 3/2001 | Fletcher et al. | |
| D440,490 S | 4/2001 | Lizzio | |
| 6,257,434 B1 | 7/2001 | Lizzio | |
| D473,791 S | 4/2003 | Loris | |
| 6,568,586 B1 | 5/2003 | Van Esley et al. | |
| 6,601,758 B2 | 8/2003 | Lizzio | |
| 6,627,862 B1 | 9/2003 | Pedersen | |
| D482,283 S | 11/2003 | Wichmann et al. | |
| D484,412 S | 12/2003 | Willis | |
| D484,749 S | 1/2004 | Garraway | |
| D502,050 S | 2/2005 | Munson et al. | |
| 6,858,243 B2 | 2/2005 | Blanchet et al. | |
| 6,886,704 B2 | 5/2005 | Hayes | |
| D507,078 S | 7/2005 | Greenfield | |
| 6,957,111 B2 | 10/2005 | Zhu et al. | |
| D511,096 S | 11/2005 | Demaggio | |
| D524,662 S | 7/2006 | Fager | |
| D532,689 S | 11/2006 | Rotta | |
| D535,143 S | 1/2007 | Kortleven | |
| D546,128 S | 7/2007 | Carlson | |
| D547,602 S | 7/2007 | Yamasaki | |
| D549,050 S | 8/2007 | Spencer et al. | |
| D556,567 S | 12/2007 | Templeton | |
| D562,135 S | 2/2008 | Studee | |
| D563,785 S | 3/2008 | Maki et al. | |
| D573,466 S | 7/2008 | White et al. | |
| 7,505,929 B2 | 3/2009 | Angert et al. | |
| D598,714 S | 6/2009 | Aagaard | |
| 7,678,036 B1 | 3/2010 | Malitas et al. | |
| D618,562 S | 6/2010 | Bizzell | |
| D620,765 S | 8/2010 | Sudia | |
| D620,766 S | 8/2010 | Sudia | |
| D621,650 S | 8/2010 | DeLeo | |
| 7,778,773 B2 | 8/2010 | Yaqub et al. | |
| 7,884,306 B2 | 2/2011 | Leach | |
| 7,900,793 B2 | 3/2011 | Hanson et al. | |
| D641,233 S | 7/2011 | Pugh | |
| 7,984,667 B2 | 7/2011 | Freudinger | |
| D645,711 S | 9/2011 | Sudia | |
| D653,906 S | 2/2012 | Bull | |
| D653,907 S | 2/2012 | Backaert et al. | |
| 8,343,560 B2 | 1/2013 | Blythe et al. | |
| 8,430,262 B2 | 4/2013 | Corbett et al. | |
| D684,046 S | 6/2013 | Meyer | |
| D684,462 S | 6/2013 | Hite | |
| 8,549,432 B2 | 10/2013 | Warner | |
| 8,561,823 B2 | 10/2013 | Krupa | |
| D696,066 S | 12/2013 | Parikh | |
| D699,106 S | 2/2014 | Glaser | |
| D701,567 S | 3/2014 | Abdullah | |
| 8,663,419 B2 | 3/2014 | Corbett et al. | |
| 8,807,377 B2 | 8/2014 | Corbett et al. | |
| 8,858,858 B2 | 10/2014 | Middleton et al. | |
| D720,227 S | 12/2014 | Corbett et al. | |
| 8,991,635 B2 | 3/2015 | Myerscough | |
| 9,005,348 B2 * | 4/2015 | Ott | A24F 25/02 206/213.1 |
| 9,010,621 B2 | 4/2015 | Baker et al. | |
| 9,073,666 B2 | 7/2015 | Petlak et al. | |
| 9,126,717 B2 | 9/2015 | Myerscough | |
| 9,126,719 B2 | 9/2015 | Corbett et al. | |
| D747,221 S | 1/2016 | Changpan | |
| D748,329 S | 1/2016 | Bagai et al. | |

(56) References Cited

U.S. PATENT DOCUMENTS

| | | |
|---|---|---|
| D749,906 S | 2/2016 | Lee |
| 9,292,889 B2 | 3/2016 | Garden |
| D761,103 S | 7/2016 | Lebon |
| 9,387,786 B2 | 7/2016 | Weiner et al. |
| 9,446,889 B2 | 9/2016 | Lopes et al. |
| D769,051 S | 10/2016 | Lee |
| D769,057 S | 10/2016 | Lee |
| D769,058 S | 10/2016 | Lee |
| D774,900 S | 12/2016 | Longoni et al. |
| 9,522,761 B2 | 12/2016 | Baker et al. |
| D775,500 S | 1/2017 | Hogeback |
| D795,069 S | 8/2017 | Haddad |
| D795,070 S | 8/2017 | Haddad |
| D801,176 S | 10/2017 | Lynd et al. |
| 9,815,191 B2 | 11/2017 | Oleynik |
| D804,322 S | 12/2017 | Fox et al. |
| D804,962 S | 12/2017 | Fox et al. |
| D806,575 S | 1/2018 | Collins et al. |
| D811,214 S | 2/2018 | Wu |
| D827,452 S | 9/2018 | Collins et al. |
| D828,161 S | 9/2018 | Collins et al. |
| D829,512 S | 10/2018 | Masanek, Jr. |
| D833,204 S | 11/2018 | Lee |
| 10,213,048 B2 | 2/2019 | Lee |
| D843,207 S | 3/2019 | Das et al. |
| D861,422 S | 10/2019 | Collins |
| D866,249 S | 11/2019 | Chiang |
| 2002/0040862 A1 | 4/2002 | Lizzio |
| 2002/0048624 A1 | 4/2002 | Blanchet et al. |
| 2002/0148845 A1 | 10/2002 | Zettle et al. |
| 2003/0037681 A1 | 2/2003 | Zhu et al. |
| 2005/0109653 A1 | 5/2005 | Wnek et al. |
| 2005/0189350 A1 | 9/2005 | Hayes et al. |
| 2005/0193901 A1 | 9/2005 | Buehler |
| 2006/0175223 A1 | 8/2006 | Casanovas |
| 2006/0213916 A1 | 9/2006 | Brown et al. |
| 2006/0226669 A1 | 10/2006 | Tong et al. |
| 2007/0241110 A1 | 10/2007 | Belleggia |
| 2008/0023459 A1 | 1/2008 | Leach |
| 2008/0275643 A1 | 11/2008 | Yaqub et al. |
| 2009/0048890 A1 | 2/2009 | Burgh |
| 2009/0057381 A1 | 3/2009 | Gokhale |
| 2010/0065562 A1 | 3/2010 | Vovan |
| 2010/0170899 A1 | 7/2010 | Mithal et al. |
| 2010/0200591 A1 | 8/2010 | Myerscough |
| 2011/0036846 A1 | 2/2011 | Corbett et al. |
| 2011/0086141 A1 | 4/2011 | Strilich et al. |
| 2011/0220652 A1 | 9/2011 | Corbett et al. |
| 2012/0006842 A1 | 1/2012 | Overgaag |
| 2012/0024859 A1 | 2/2012 | Longoni |
| 2012/0024897 A1 | 2/2012 | Corbett et al. |
| 2012/0031901 A1 | 2/2012 | Dudson et al. |
| 2012/0175367 A1 | 7/2012 | Lopes et al. |
| 2012/0234717 A1 | 9/2012 | Kirkland |
| 2013/0313257 A1 | 11/2013 | Gartz et al. |
| 2014/0370167 A1 | 12/2014 | Garden |
| 2015/0068945 A1 | 3/2015 | Baker et al. |
| 2015/0068946 A1 | 3/2015 | Baker et al. |
| 2015/0109653 A1 | 4/2015 | Greer et al. |
| 2015/0290795 A1 | 10/2015 | Oleynik |
| 2015/0343933 A1 | 12/2015 | Weiner et al. |
| 2016/0162833 A1 | 6/2016 | Garden |
| 2016/0214778 A1 | 7/2016 | Goodsell et al. |
| 2017/0275077 A1 | 9/2017 | Chiang et al. |
| 2018/0022523 A1 | 1/2018 | Noferi |
| 2018/0071939 A1 | 3/2018 | Garden et al. |
| 2018/0105344 A1 | 4/2018 | Chiang |
| 2018/0121037 A1 | 5/2018 | Wajda et al. |
| 2018/0215523 A1 | 8/2018 | Chiang |
| 2019/0300263 A1 | 10/2019 | Chiang |

FOREIGN PATENT DOCUMENTS

| | | |
|---|---|---|
| CN | 301396948 S | 12/2010 |
| EP | 0989067 | 3/2000 |
| EP | 2230184 | 9/2010 |
| EP | 2243723 | 10/2010 |
| EP | 3006370 | 7/2018 |
| JP | 07-002285 U | 1/1995 |
| JP | 2002-347944 | 12/2002 |
| JP | 5244344 | 7/2013 |
| KR | 20-0360448 | 8/2004 |
| KR | 10-2009-0098949 | 9/2009 |
| KR | 10-2015-0121771 | 10/2015 |
| KR | 30-0990068 | 1/2019 |
| WO | 2012/005683 | 1/2012 |
| WO | 2015/006649 | 1/2015 |

OTHER PUBLICATIONS

Core77 "Notable Packaging Award: Core77 Design Awards 2017, Zume Pizza 'Pizza Pod'" May 14, 2017, https://web.archive.org/web/20170614144555/http://designawards.core77.com/Packaging/62804/Zume-Pizza-Pod, downloaded on Mar. 26, 2018, 4 pages.

Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air-invests-in-to-simpsonville-facility-to-produce-pla . . . , 7 pages.

DuPont, "Compostable "Pizza Pod" (Zume Pizza, USA)—Diamond Finalist Award," May 22, 2017, downloaded from http://www.dupont.com/industries/packaging-and-printing/media/press-kits/2017-packaging-awards/mc-image-detail/compostable-pizza-pod.html on Apr. 20, 2018, 1 page.

Entis et al., "This Robot-Made Pizza is Baked in the Van on the Way to Your Door," Sep. 29, 2016, downloaded from http://fortune.com/2016/09/29/this-robot-made-pizza-is-baked-in-the-van-on-the-way-to-your-front-door/ on Apr. 20, 2018, 1 page.

Farkya, "Compostable Pizza Pod," Nov. 14, 2016, downloaded from http://www.packagingconnections.com/news/compostable-pizzapod.htm on Apr. 20, 2018, 7 pages.

Garden, "Systems and Methods of Preparing Food Products," Notice of Allowance, dated Jan. 7, 2016, for U.S. Appl. No. 13/920,998, 9 pages.

Garden, "Systems and Methods of Preparing Food Products," U.S. Appl. No. 15/040,866, filed Feb. 10, 2016, 71 pages.

Garden, "Systems and Methods of Preparing Food Products," Advisory Action, dated Aug. 27, 2015, for U.S. Appl. No. 13/920,998, 3 pages.

Garden, "Systems and Methods of Preparing Food Products," Advisory Action, dated Jul. 29, 2015, for U.S. Appl. No. 13/920,998, 3 pages.

Garden, "Systems and Methods of Preparing Food Products," Amendment, filed Apr. 2, 2015, for U.S. Appl. No. 13/920,998, 23 pages.

Garden, "Systems and Methods of Preparing Food Products," Amendment, filed Aug. 10, 2015, for U.S. Appl. No. 13/920,998, 29 pages.

Garden, "Systems and Methods of Preparing Food Products," Amendment, filed Jul. 22, 2015, for U.S. Appl. No. 13/920,998, 29 pages.

Garden, "Systems and Methods of Preparing Food Products," Amendment, filed Sep. 25, 2015, for U.S. Appl. No. 13/920,998, 29 pages.

Garden, "Systems and Methods of Preparing Food Products," Office Action, dated Mar. 16, 2015, for U.S. Appl. No. 13/920,998, 28 pages.

Garden, "Systems and Methods of Preparing Food Products," Office Action, dated May 27, 2015, for U.S. Appl. No. 13/920,998, 31 pages.

Gardner, "Systems and Methods of Preparing Food Products," Response to Restriction Requirement, filed Oct. 24, 2014, for U.S. Appl. No. 13/920,998, 3 pages.

Gardner, "Systems and Methods of Preparing Food Products," Restriction Requirement, dated Sep. 10, 2014, for U.S. Appl. No. 13/920,998, 5 pages.

Molina, "Yes, Apple really did patent its own pizza box," May 17, 2017, downloaded from https://www.usatoday.com/story/tech/talkingtech/2017/05/17/apple-patented-its-own-pizza-box/327267001/ on Apr. 20, 2018, 2 pages.

Notice of Allowance dated Feb. 13, 2019 issued in U.S. Appl. No. 29/558,874, 10 pages.

(56) References Cited

OTHER PUBLICATIONS

Notice of Allowance, dated Jul. 24, 2018, for U.S. Appl. No. 29/618,670, Collins et al., "Food Container," 2 pages.
Notice of Allowance, dated Jun. 6, 2018, for U.S. Appl. No. 29/618,670, Collins et al., "Food Container," 2 pages.
Notice of Allowance, dated May 31, 2018, for U.S. Appl. No. 29/574,805, Collins et al., "Food Container Cover," 2 pages.
Notice of Allowance, dated Apr. 25, 2018, for U.S. Appl. No. 29/618,670, Collins et al., "Food Container" 7 pages.
Notice of Allowance, dated May 9, 2018, for U.S. Appl. No. 29/574,805, Collins et al., "Food Container and Cover", 10 pages.
Office Action dated Aug. 28, 2018 issued in U.S. Appl. No. 15/845,916, 24 pages.
Office Action dated Aug. 30, 2018 issued in U.S. Appl. No. 15/936,069, 14 pages.
PCT International Search Report and Written Opinion in International Application PCT/US2018/040730, dated Nov. 14, 2018, 22 pages.
PCT International Search Report and Written Opinion of the International Searching Authority, dated Jun. 26, 2017, for International Application No. PCT/US2017/023408, 17 pages.
PCT International Search Report, dated Oct. 22, 2014, for International Application No. PCT/US2014/042879, 3 pages.
PCT Written Opinion of the International Searching Authority, dated Oct. 22, 2014, for International Application No. PCT/US2014/042879, 8 pages.
PW Staff, "Humanitarian initiative wins top DuPont Award," Jul. 5, 2017, downloaded from https://www.packworld.oom/article/trendsand-issues/global/humanitarian-initiative-wins-top-dupont-award on Apr. 20, 2018, 12 pages.
Robinson, "This robot-made pizza in Silicon Valley should terrify Domino's and Pizza Hut," Sep. 29, 2016, downloaded from https://sg.financeyahoo.com/news/robot-made-pizza-silicon-valley-16400825.html?guccounter=1 on Apr. 20, 2018, 12 pages.
U.S. Appl. No. 15/465,228, Amendment and Response filed Apr. 18, 2019, 16 pages.
U.S. Appl. No. 15/845,916, Amendment and Response filed Dec. 28, 2018, 17 pages.
U.S. Appl. No. 15/845,916, Office Action dated Apr. 8, 2019, 25 pages.
U.S. Appl. No. 15/936,069, Amendment and Response filed Nov. 28, 2018, 14 pages.
U.S. Appl. No. 15/936,069, Office Action dated Mar. 14, 2019, 17 pages.
U.S. Appl. No. 29/558,872, Amendment and Response filed Feb. 1, 2019, 23 pages.
U.S. Appl. No. 29/558,872, Office Action dated Nov. 1, 2018, 15 pages.
U.S. Appl. No. 29/558,872, Response to Restriction Requirement filed Aug. 16, 2018, 7 pages.
U.S. Appl. No. 29/558,872, Restriction Requirement dated May 17, 2018, 12 pages.
U.S. Appl. No. 29/558,873, Ex Parte Quayle Action mailed Sep. 6, 2018, 9 pages.
U.S. Appl. No. 29/558,873, Notice of Allowance dated Feb. 8, 2019, 9 pages.
U.S. Appl. No. 29/558,873, Response filed Nov. 6, 2018, 18 pages.
U.S. Appl. No. 29/558,873, Response to Restriction Requirement filed Jul. 17, 2018, 16 pages.
U.S. Appl. No. 29/558,873, Restriction Requirement dated May 17, 2018, 9 pages.
U.S. Appl. No. 29/558,874, Ex Parte Quayle Action mailed Sep. 6, 2018, 10 pages.
U.S. Appl. No. 29/558,874, Notice of Allowance dated Feb. 13, 2019, 10 pages.
U.S. Appl. No. 29/558,874, Restriction Requirement dated Apr. 27, 2018, 10 pages.
U.S. Appl. No. 29/574,802, Amendment and Response filed Aug. 3, 2017, 7 pages.
U.S. Appl. No. 29/574,802, Notice of Allowance dated Aug. 25, 2017, 5 pages.
U.S. Appl. No. 29/574,802, Office Action dated Jun. 1, 2017, 9 pages.
U.S. Appl. No. 29/574,805, Notice of Allowance dated Jul. 23, 2018, 2 pages.
U.S. Appl. No. 29/574,808, Amendment and Response filed Dec. 21, 2018, 15 pages.
U.S. Appl. No. 29/574,808, Office Action dated Sep. 21, 2018, 11 pages.
U.S. Appl. No. 29/574,808, Response to Restriction Requirement filed Aug. 1, 2018, 1 page.
U.S. Appl. No. 29/574,808, Restriction Requirement dated Jun. 1, 2018, 9 pages.
Wiener, "Food Movers: The Secret Evolution of the Pizza Box," Feb. 2016, downloaded from https://www.foodandcity.org/evolution-pizza-box/ on Apr. 20, 2018, 14 pages.
World Centric website, "New PizzaRound from World Centric: The Pizza Box Comes Full Circle", Petaluma, CA, USA, published Mar. 15, 2018, 2 pages, located online on May 2, 2019 at: http://www.worldcentric.org/node/442.
Zume Pizza Homepage: Announced 2015 [Online]. Site Visited [Apr. 20, 2018]. Available from Internet URL: https://zumepizza.com/, 7 pages.
Search Report and Written Opinion dated Nov. 16, 2018 issued in International Patent Application No. PCT/US2018/040749.
Also enclosed is Office Action dated Dec. 20, 2018 issued in U.S. Appl. No. 15/465,228.
European Search Report in Application 17770987.0, dated Feb. 12, 2019, 8 pages.
U.S. Appl. No. 29/558,872, Notice of Allowance dated May 10, 2019, 9 pages.
U.S. Appl. No. 29/574,808, Notice of Allowance dated May 13, 2019, 5 pages.
Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the-design-of-coffee-cup-lids/, Apr. 12, 2018, 8 pages.
U.S. Appl. No. 29/656,406, Notice of Allowance dated Jun. 20, 2019, 12 pages.
U.S. Appl. No. 29/574,808, Notice of Allowance dated Jun. 10, 2019, 10 pages.
U.S. Appl. No. 29/558,872, Notice of Allowance dated Jun. 26, 2019, 14 pages.
U.S. Appl. No. 29/558,873, Notice of Allowance dated Jun. 26, 2019, 11 pages.
U.S. Appl. No. 29/656,406, Notice of Allowance dated Aug. 6, 2019, 2 pages.
U.S. Appl. No. 15/845,916, Office Action dated Aug. 14, 2019, 23 pages.
U.S. Appl. No. 15/936,069, Office Action dated Aug. 14, 2019, 16 pages.
U.S. Appl. No. 15/465,228, Office Action dated Jul. 18, 2019, 26 pages.
U.S. Appl. No. 29/558,872, Ex-Parte Quayle Action dated Nov. 18, 2019, 10 pages.
PCT International Preliminary Report on Patentability in Application PCT/US2018/040749, dated Jan. 16, 2020, 20 pages.
U.S. Appl. No. 29/656,406, Notice of Allowance dated Jan. 23, 2020, 10 pages.
U.S. Appl. No. 29/698,689, Office Action dated Oct. 24, 2019, 12 pages.
U.S. Appl. No. 15/465,228, Office Action dated Feb. 26, 2020, 27 pages
U.S. Appl. No. 15/936,069, Notice of Allowance dated Mar. 4, 2020, 5 pages.
U.S. Appl. No. 29/558,874, Ex Parte Quayle Action dated Feb. 27, 2020, 11 pages.

* cited by examiner

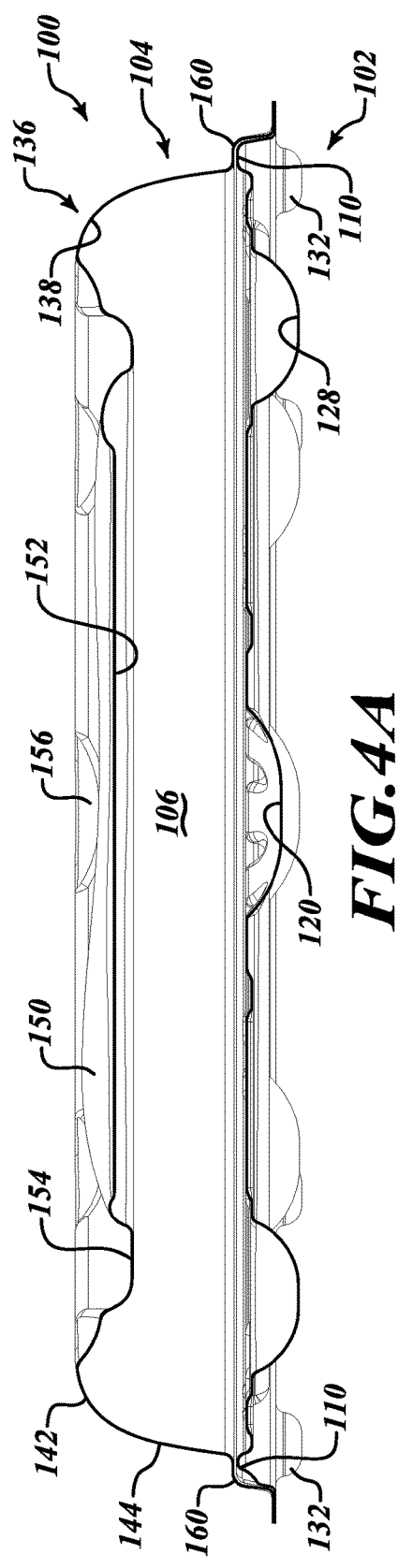
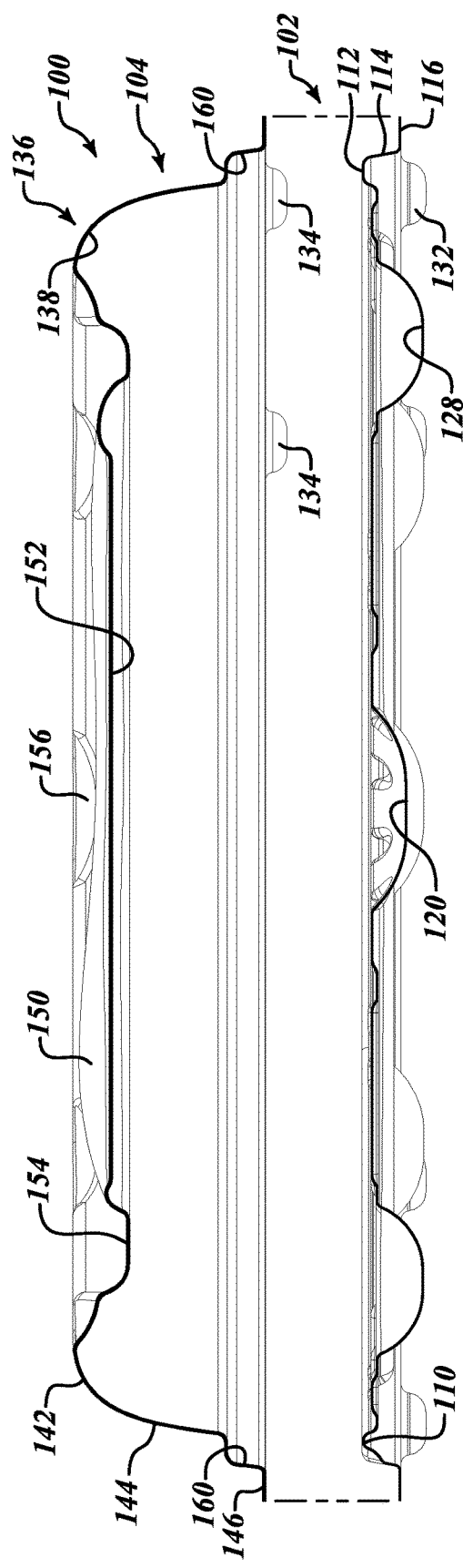
FIG.4A
FIG.4B

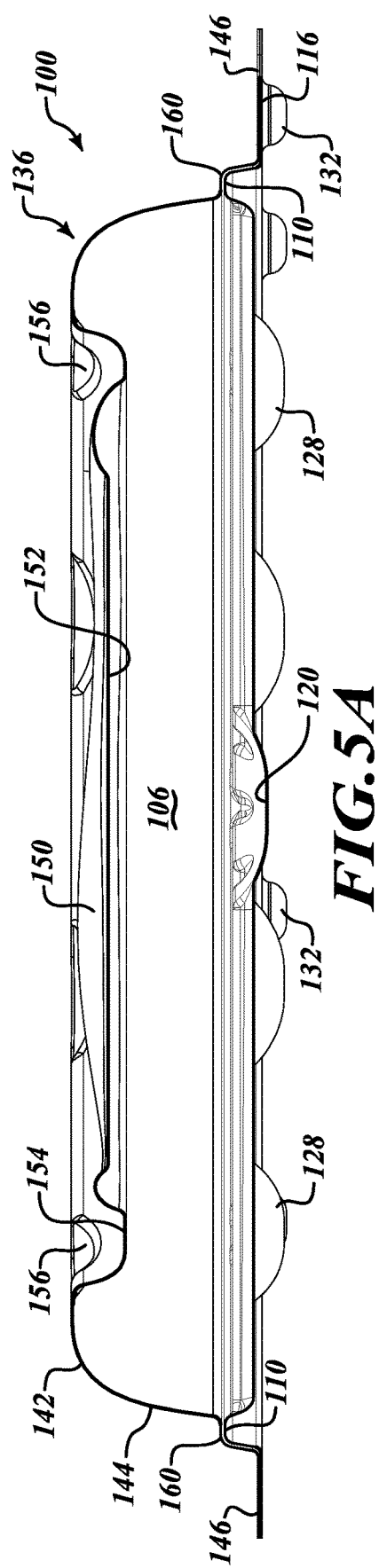
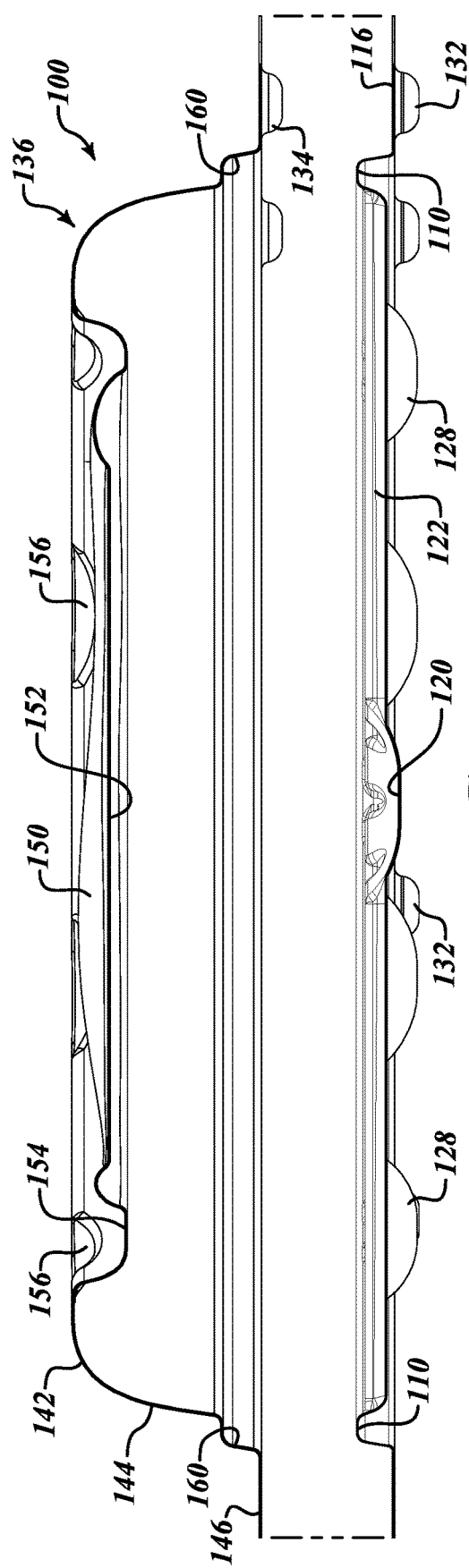
FIG.5A
FIG.5B

CONTAINER FOR TRANSPORT AND STORAGE OF FOOD PRODUCTS

BACKGROUND

Technical Field

The present disclosure generally relates to containers for protecting, insulating, transporting and/or cooking food products.

Description of the Related Art

Today, the standard pizza box is a square box that is made from a single folded blank of corrugated cardboard. Once folded, the cardboard forms a box that is normally about two inches high and having equal sides of between 12 inches and 18 inches. The corrugated cardboard used to produce the pizza box is typically thick, which provides the pizza box with structural strength needed to stack multiple filled pizza boxes atop one another without the bottom box collapsing. Even then, stacking two or more pizza boxes together typically requires the ubiquitous pedestals or "pizza savers" which are placed within the box at the approximate center thereof to prevent the top or lid of the pizza box from being forced into contact with the pizza inside the box due to forces of one or more pizza boxes stacked on top of the pizza box. An example of such pizza saver is shown in U.S. Pat. No. 4,498,586.

In a traditional pizza box, the inside bottom surface of the pizza box is flat and smooth. When a pizza is placed inside the box, the bottom of the pizza rests flush against the flat bottom of the box. Consequently, any condensation, grease, or other liquid that collects between the bottom of the pizza and the bottom of the box becomes trapped. This can cause the bottom of a pizza to become soggy or oily, and can also reduce the structural integrity of the pizza box. Additionally, the top of the pizza box absorbs moisture emanating from hot, steaming pizza, which causes the top portion to droop, and which may cause the pizza box to collapse or may at least cause the top portion of the pizza box to touch the top of the pizza in instances where the aforementioned "pizza saver" is not used.

BRIEF SUMMARY

A food container may be summarized as including: a base having at least one edge, the base comprising a raised rim disposed about a perimeter of an upwardly facing food receiving portion which receives a food product, the food receiving portion comprising a substantially planar surface and a plurality of channels each being recessed downwardly into the planar surface and extending across at least a portion of the planar surface, with at least one channel and a corresponding portion of the at least one edge delineating a respective detachable portion of the food receiving portion, each of the detachable portions selectively separable from other detachable portions; and a cover selectively engageable with at least a portion of the raised rim of the base, the cover comprising a substantially downward facing interior surface and a substantially upward facing exterior surface, the interior surface having a perimeter channel sized and dimensioned to engage the at least a portion of the raised rim of the base when the cover is engaged with the base, and the cover sized and shaped to provide an interior chamber which protects the food product, the interior chamber defined at least in part by the interior surface of the cover and a corresponding part of the food receiving portion.

The at least one detachable portion may be selectively separable along a separation line formed into the base along the at least one channel. The at least one edge may include a notch directed inwards towards the raised rim, the notch aligned with the separation line. A subset of the channels may have separation lines. The base may include a material that has a uniform thickness except at the separation lines, the separation lines which comprise a portion of the base that has a reduced thickness relative to other portions of the base. The separation line may include a line of a plurality of perforations. The separation line may include a line that has been weakened before distribution of the food container by the manufacture thereof.

The food container may further include a flange that extends outwardly the raised rim of the base.

The food container may further include a flange that extends outwardly from the food receiving portion, the flange having a first pair of parallel sides and a second set of parallel sides that form an exterior periphery for the food container, wherein the first pair and the second pair of parallel sides surrounds the raised rim.

The flange may include at least one notch located along one of the sides of the flange, the at least one notch directed inwards towards the raised rim and aligned with the separation line. The at least one notch may be manipulable to effect a separation along the separation line. The base may include a number N of sector portions, the cover may comprise the number N of interior chambers, and each of the interior chambers may be vertically aligned with one of the detachable portions when the cover is engaged with the base. The cover may include a plurality of detachable cover portions, each of the cover detachable portions corresponding to a detachable portion on the base, and at least one of the cover detachable portions may be selectively detachable from at least one other cover detachable portions. The base may include a number N of sector portions, the cover may include a number M of interior chambers, and wherein N may be a positive integer and M may be a positive integer that is less than N. The base may be rectangular in shape with a length and a width and each of the channels may extend across at least a portion of the width of the base. Each detachable portion may include a raised detachable portion rim which extends upward from the planar surface and is adjacent at least one of the channels which delineate the detachable portion. The base may have a rectangular-shaped outer perimeter with rounded corners, the outer perimeter defined by first and second parallel edges and third and fourth parallel edges, and each of the channels may be non-parallel with each of the first, second, third, and fourth edges. The base may include a base flange surrounding at least a portion of the raised rim, and the cover may include a cover flange surrounding at least a portion of the perimeter channel of the interior surface. The base flange may include at least one base fastening recess which extends downwardly from the base flange, and the cover flange may include at least one corresponding cover fastening protrusion which extends downwardly from the cover flange, the at least one base fastening recess sized and dimensioned to receive at least a portion of the at least one cover fastening protrusion when the cover is engaged with the base. The at least one base fastening recess and the at least one cover fastening protrusion may each be sized and dimensioned to provide an audible cue when the at least one base fastening recess is separated from the cover fastening protrusion. The at least one base fastening recess may have a depth that is greater than 5 millimeters and a diameter that is greater than 8 millimeters, and the at least one cover fastening protrusion may have a depth which is 1 millimeter less than the depth of the at least one base fastening recess, and a diameter which is 1 millimeter greater than the diameter of the at least one base fastening recess. The base flange may include at least one base fastening protrusion which extends upwardly from the base flange, and the cover flange may include at least one corresponding cover fastening recess which extends upwardly from the cover flange, the at least one cover fastening recess sized and dimensioned to receive at least a portion of the at least one base fastening protrusion when the cover is engaged with the base. Each detachable portion may include a sector well that extends downwardly from the planar surface. The sector well of each detachable portion may have a rim adjacent the planar surface, the rim having a profile in the shape of at least one of an oval, a circle, a triangle, a square, or a symbol. Each of a plurality of features comprising the raised rim, the sector wells, the channels, and the raised sector ribs may be spaced apart from at least one other of the plurality of features by a distance which is less than or equal to one inch. Each detachable portion may include a plurality of raised sector ribs extending upwardly from the planar surface. The base may have an overall height which is less than or equal to 1.5 inches. Each of the base and the cover may be formed from a single layer of material having a thickness in the range of 0.5 millimeters to 1.0 millimeters. Each detachable portion of the base may not have a continuously planar surface which exceeds 2 inches by 2 inches. The base may have a length dimension which is greater than or equal to 12 inches. Each of the base and the cover may be formed from one of sugarcane fiber, wood fiber, bamboo fiber, or paper; or plastic, biodegradable plastic, or other synthetic materials. The base may have a square perimeter with rounded edges, and the raised rim that forms the perimeter of the food receiving portion may have a circular profile. The cover may have at least one denesting lug which provides a space between at least a portion of the cover and at least a portion of another cover when the cover is stacked together with the other cover. The food container may be positionable on a platen to receive a food item, and the base may include a plurality of registration features that selectively, physically engage with corresponding registration features on the platen to align the base on the platen. The registration features on the platen may include one or more apertures and the registration features on the base may include a corresponding number of tabs, each tab which is sized and shaped to securely physically engage with the one of the apertures. Each detachable portion may include a sector well that extends downwardly from the planar surface, wherein the registration feature on the platen may include one or more apertures, and the registration features on the base may include one or more sector wells, and wherein each of the one or more sector wells on the base may be sized, shaped, and positioned to engage with a corresponding aperture on the platen to thereby align the food container on the platen. The registration features on the platen may include one or more protrusions extending upward and the registration features on the base may include a corresponding number of apertures or raised portions, each protrusion which is sized and shaped to securely physically engage with the one of the apertures or raised portions. The plurality of channels may include a number N of channels which delineate a corresponding number N+1 of detachable portions of the food receiving portion, where N is a positive integer. The plurality of channels may include a number N of channels which delineate a corresponding number N of detachable portions of the food receiving portion, where N is a positive integer. At least some of the channels may intersect with other channels. The base and the cover may each be formed from a single layer of material, and the base and the cover may be sized and dimensioned to be nestable with other bases and covers, respectively. The plurality of channels may be equally radially spaced to enable cutting of the food product into equally sized pieces when a cutting tool moves along the channels.

A food product support apparatus may be summarized as including: a base comprising: an edge; a raised perimeter rim; and a food receiving portion disposed within the raised perimeter rim which receives a food product, the food receiving portion comprising a substantially planar surface, and a plurality of channels each being recessed downwardly into the planar surface and extending across at least a portion of the planar surface, at least one channel and a corresponding portion of the edge delineating a respective detachable portion of the food receiving portion, each of the detachable portions being selectively separable from other detachable portions.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4A is a sectional view of the food container taken along the line 4A-4A of FIG. 3, according to one illustrated implementation.

FIG. 4B is a sectional view of the food container taken along the line 4A-4B of FIG. 1B, according to one illustrated implementation.

FIG. 5A is a sectional view of the food container taken along the line 5A-5A of FIG. 3, according to one illustrated implementation.

FIG. 5B is a sectional view of the food container taken along the line 5A-5B of FIG. 1B, according to one illustrated implementation.

DETAILED DESCRIPTION

Figure 1A:
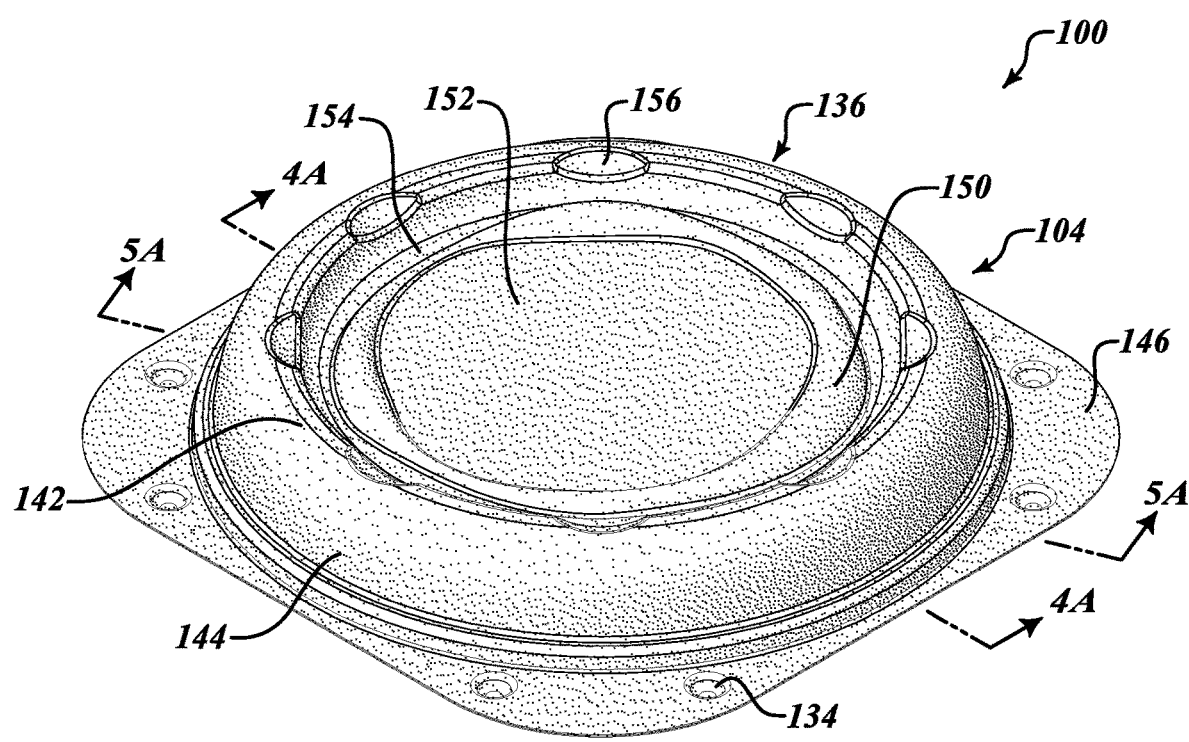
FIG. 1A is a top perspective view of a food container, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to providing food containers which preserve the quality of a food product for a duration of time, and which optionally allow for cooking of the food product therein. In one or more implementations, the food containers discussed herein are structurally sturdy, stackable, thermally insulating, disposable (e.g., compostable) and require minimal or no manual labor to assemble. In some implementations, the food containers discussed herein use a relatively small amount of material compared to existing corrugated cardboard containers, which material is compostable and/or recyclable.

Initially, a first implementation of a food container is discussed with reference to FIGS. 1A-11C and 13. Then, a second implementation of a food container is discussed with reference to FIG. 12. Then, a third implementation of a food container is discussed with reference to FIGS. 14A-21. Then, additional implementations of food containers are discussed with reference to FIGS. 22A-24C. Features of one or more of the implementations discussed herein may be modified and/or combined to provide further implementations.

Referring to FIG. 1A through FIG. 11C, various views of a food container 100 are shown. The food container 100 is illustrated as a container for containing a pizza for explanatory purposes, but it should be appreciated that the present disclosure is not limited to such. As shown in FIG. 1B, the food container 100 includes a base 102 and a separate cover 104 which cooperate as shown in the figures and described below to form a closed chamber 106 for supporting, protecting, insulating and optionally cooking a food product (e.g., pizza).

In some implementations, the base 102 and cover 104, as well as other implementations discussed herein, may each be separately formed of a single layer of liquid-resistant insulating material including, but not limited to, molded sugarcane fiber ("bagasse") which has a known ignition temperature of between 537° F. and 681° F., molded wood fiber, molded bamboo fiber, molded paper which has a known ignition temperature of above 450° F. (e.g., 451° F.), plastic (e.g., biodegradable plastic, thermoplastic material, bio-based plastic, recycled plastic, recyclable plastic), or synthetic food-safe materials other than plastic. The base and/or the cover may be opaque, semi-transparent, or transparent (e.g., an opaque base made with molded fiber and a cover made with transparent plastic material). This is in contrast to conventional pizza boxes which are made from corrugated cardboard. In implementations wherein the base 102 cover 104 are formed from molded fibers, the single layer of material may have a relatively small thickness of between 0.5 mm and 1.0 mm (e.g., 0.8 mm). In implementations wherein the base 102 and cover 104 are formed from plastic (e.g., polyethylene terephthalate (PET), polylactic acid (PLA)), the single layer of material may have a thickness of 0.5-0.6 mm or less.

In some implementations, the base 102 is formed of a single layer of insulating material and includes an upwardly facing circular-shaped food receiving portion 108 which receives the pizza thereon. The base 102 further includes a raised peripheral rim 110 disposed about a perimeter of the food receiving portion 108. The rim 110 comprises a raised upwardly facing apex surface 112 (see FIG. 4B) and an downwardly and outwardly extending sidewall 114 which meets with a substantially planar base flange 116 that extends outwardly from the rim. As shown in FIG. 1B, the base flange 116 has a substantially rectangular-shaped (e.g., square) outer perimeter with rounded corners defined by first and second parallel edges 118A and 118B and third and fourth parallel edges 118C and 118D. Among other things, the base flange 116 strengthens the rigidity of the base 102.

The food receiving portion 108 of the base 102 includes a planar surface 109 and a number of features which extend at least one of upward or downward from the planar surface 109. In particular, the food receiving portion 108 includes a central well 120 which extends downwardly from the planar surface 109 and receives liquid drippings or condensation from the cooked food (e.g., pizza) placed in the food container 100. In the illustrated implementation, the central well 120 has a circular perimeter, but may have other shapes (e.g., triangle, octagon) in other implementations.

The food receiving portion 108 also includes a plurality of food receiving portion channels or grooves 122 (also referred to herein as "channels") extending downwardly below the planar surface 109 and running radially outward from the central well 120 and terminating at the raised peripheral rim 110. In some implementations, the radial channels 122 may extend only partially between the central well 120 and the raised peripheral rim 110. In the illustrated implementation, each of the channels 122 has a U-shaped cross-sectional profile, but in other implementations the channels may have other shapes (e.g., V-shaped). In some implementations, each channel 122 may slope downward from the rim 110 toward the central well 120 to facilitate the flow of liquid through the channel into the central well. Each pair of adjacent channels 122 and a corresponding portion of the raised peripheral rim 110 delineate a respective sector portion 124 of the food receiving portion 108 which supports a portion of a food item (e.g., an individual slice of pizza). In the illustrated implementation, the base 102 includes eight channels 122 and eight sector portions 124. Generally the base 102 may include N channels and N sector portions, where N is a positive integer.

The plurality of channels 122 are equally radially spaced to enable cutting of the food item (e.g., pizza) into equally sized pieces when a cutting tool (e.g., knife) moves along the channels. Since the channels 122 extended downward from the planar surface 109, a user may cut through the food item over the channels without damaging (e.g., cutting) the food receiving portion 108 of the base 102. Further, each of the channels 122 are non-parallel with each of the edges 118A-118D of the base 102, which improves the rigidity of the base. In the illustrated implementation, each of the channels 122 is offset by 22.5° from perpendicular from a respective one of the edges 118A-118D which the channel extends toward. Further, each of the channels 122 is collinear with an opposite channel that extends radially in the opposite direction. Thus, when the base 104 is to be discarded (e.g., composted), the user may fold the base along an axis which extends through two opposing collinear channels to reduce the dimensions of the base so the base will fit within a compost receptacle.

Among other things, the channels 122 function to strengthen the base 102 in rigidity and provide supporting forces to the food receiving portion 108 when the base is disposed on a resting surface, such as a countertop, oven or another food container. The channels 122 also serve as guides for a cutting tool to cut eight equally sized pieces of a food item (e.g., pizza). Further, the channels 122 provide air space below the food item, which provides additional insulation. In some implementations, because the channels 122 may be substantially covered by the food item placed on the food receiving portion 108, indicia (e.g., visible and/or tactile markings) may be positioned on or adjacent the rim 110 radially in line with the channels to aid the user in cutting the pizza into pieces along the channels.

As discussed above, each pair of adjacent channels 122 and a corresponding portion (e.g., a 45° arc portion) of the raised peripheral rim 110 delineate a respective sector portion 124 of the food receiving portion 108 which receives an individual piece of the food item (e.g., slice of pizza). Each sector portion 124 includes a portion of the planar surface 109 and a raised sector portion rim 126 (FIG. 1B) which extends upward from the planar surface and adjacent each of the channels 122 which define the sector portion. In addition to supporting the food item above the planar surface 109, the raised sector portion rim 126 adjacent the channels 122 may aid in supporting the food item near the cutting location, thereby facilitating the cutting process to provide accurate individual pieces.

Each sector portion 124 further includes a sector well 128 which may receive liquid drippings from the food product therein. In the illustrated implementation, each sector well has a perimeter rim adjacent the planar surface 109 which has an oval profile. In other implementations, each of the perimeter rims may have a profile in the shape of at least one of a circle, a triangle, a square, another shape, or a symbol (e.g., logo). Each sector portion 124 also includes a plurality of raised sector ribs or projections 130 which extend upward from the planar surface 109 around the sector well 128 having an uppermost portion which supports the hot food product (e.g., pizza). In some implementations, the combined area of the ribs 130 in a sector portion 124 is smaller than the portion of the planar surface 109 in the sector portion. Thus, when the food product is supported on the uppermost portions of the ribs 130 and the raised sector portion rim 126, heat loss due to conduction through the planar surface 109 is substantially reduced compared to food containers with flat bottom surfaces which have relatively large surface area contact with the bottom surface of the food product. Additionally, the raised ribs 130 and sector portion rim 126 tend to isolate the bottom surface of the food product from the planar surface 109, which prevents the food product from becoming soggy due to trapped liquid on the planar surface 109 of the food receiving portion 108.

In the illustrated implementations, the shapes of the ribs 130 are elongated and have a length dimension which extends radially with respect to the central well 120. Additionally, in the illustrated implementations the ribs 130 are radially symmetrical. In other implementations, the number, sizes and dimensions of the raised ribs 130 may be different from shown in the figures. The raised ribs 130 also function to improve the rigidity of the base 102.

In some implementations, each of a plurality of features of the base 102 comprising the raised rim 110, the central well 120, the sector wells 128, the channels 122, and the raised sector ribs 130 is spaced apart from at least one other of the plurality of features by a distance which is less than or equal to one inch. In some implementations, due to the aforementioned plurality of features, the food receiving portion 108 of the base 102 does not have a continuously planar surface which exceeds 2 inches by 2 inches. Such features significantly improve the strength of the base 102, while allowing the base to have a length dimension greater than 12 inches (e.g., 16 inches), a width dimension greater than 12 inches (e.g., 16 inches), an overall height which is less than 1.5 inches (e.g., 1 inch), and a material thickness between 0.5 mm and 1.0 mm (e.g., 0.8 mm). In other implementations, the base 102 may have a relatively larger height and the cover 104 may have a relatively smaller height.

The base flange 116 which extends around the raised rim 110 includes eight fastening recesses or seats 132 that extend downwardly from the base flange. As discussed below, each of the fastening recesses 132 of the base 102 receive a corresponding one of a plurality of downwardly extending fastening protrusions 134 of the cover 104 to selectively retain the cover on the base 102. The fastening recesses 132 are generally dome-shaped in the illustrated implementations, but may be other shapes and sizes in other implementations. Further, other implementations may include more fastening recesses, fewer fastening recesses, or no fastening recesses.

In some implementations, at least some of the fastening recesses 132, the central well 120, and the sector wells 128 extend downwardly to a lowermost portion of the base 102 so that they are weight-bearing and function as "feet" which form an insulating air space below the food receiving portion 108 of the base 102 and a resting surface when the base is supported on the resting surface. Thus, the raised ribs 130 of each sector portion, together with at least some of the fastening recesses 132, the central well 120, and the sector wells 128, form a layer of air insulation between the planar surface 109 of the food receiving portion 108 and the food product and a layer of air insulation between the food receiving portion and a resting surface using only a single layer of material (i.e., the material which forms the base 102). Additionally, the aforementioned "feet" raise the remainder of the base 102 (and cover 104 when engaged with the base) slightly above a resting surface (e.g., table), which causes a shadow to be cast, similar to a more formal serving plate.

The cover 104 comprises a single layer of thermally insulating material (e.g., molded fiber) and includes a central dome portion 136 comprising a substantially downward facing interior surface 138 (FIG. 2B) and a substantially upward facing exterior surface 140 (FIG. 1B). As shown in FIG. 4B, the dome portion 136 comprises a raised outer rim 142 spaced radially outward from the center of the dome portion which terminates in a downwardly and outwardly extending sidewall 144. The sidewall 144 meets with a substantially planar cover flange 146 which extends laterally outwardly therefrom. Similar to the base flange 116, the cover flange 146 has a substantially rectangular-shaped outer perimeter with rounded corners defined by first and second parallel edges 148A and 148B and third and fourth parallel edges 148C and 148D (see FIG. 1B). Among other things, the cover flange 146 strengthens the rigidity of the cover 104.

The cover flange 146 also includes eight integrally formed fastening protrusions 134 which extend downwardly from the cover flange. The fastening protrusions 134 are generally dome-shaped in the illustrated implementations, but may be other shapes and sizes in other implementations. Further, other implementations may include more fastening protrusions, fewer fastening protrusions, or no fastening protrusions. As shown in FIG. 11C, each of the fastening protrusions 134 of the cover flange 146 is vertically aligned with one of the integrally formed fastening recesses 132 of the base flange 116 to form a fastener 131. In operation, each fastening recess 132 may receive a corresponding fastening protrusion 134 when the cover 104 is placed on the base 102. Among other things, such fasteners 131 may restrict lateral or rotational movement of the cover 104 relative to the base 102 which maintains the alignment of the cover relative to the base. In some implementations, each fastening recess 132 may be sized and dimensioned to receive a corresponding fastening protrusion 134 responsive to an external force pushing the fastening recess and the fastening protrusion together when the cover 104 is placed on the base 102, forming an interference or press fit. In such implementations, upon receiving a fastening protrusion 134, a fastening recess 132 may generate a fastening force which facilitates holding the cover 104 in a closed configuration on the base 102. Such fastening force resists external forces applied to the container 100 so that the container remains closed throughout storage, transportation or any other function of the container.

In some implementations, the base flange 116 may include a number of fastening protrusions that extend upwardly from the base flange, and the cover flange 146 may include a corresponding number of fastening recesses that extend upwardly from the cover flange. In such implementations, the fastening recesses of the cover 104 may receive the fastening protrusions of the base 102.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible make such an undercut design, and therefore it is typically accepted that a molded pulp package cannot have any locking design with an audible snap function. However, in some implementations of the present disclosure, due to the combination of dimension of the interference, the angle, and the thickness of the base 102 and cover 104, the fastening mechanisms provide an unexpected performance with an audible cue (e.g., "snap") when the fastening protrusions are disengaged from the corresponding fastening recesses. In some implementations, this audible cue may be produced more than once (e.g., each time a fastening protrusion is disengaged from a fastening recess). In some implementations, each of the fastening recesses has a depth that is greater than 5 millimeters and a diameter that is greater than 8 millimeters, and each of the fastening protrusions has a depth which is 1 millimeter less than the depth of the fastening recesses, and a diameter which is 1 millimeter greater than the diameter of the fastening recesses.

The dome portion 136 further comprises an irregularly-shaped raised inner rim 150 disposed radially inward of the raised outer rim 142, and a substantially planar ceiling portion 152 disposed inward of the raised inner rim. In some implementations, the raised inner rim 150 has a radially asymmetric profile. A downwardly extending dome portion channel or groove 154 is positioned radially between the raised outer rim 142 and the raised inner rim 150. The shapes and dimensions of the raised outer rim 142, the dome portion channel 154 and the raised inner rim 150 may be different in other implementations. The raised outer rim 142, the dome portion channel 154 and the raised inner rim 150 together provide rigidity to the dome portion 136 which, as discussed below, provides support to the ceiling portion 152 and facilitates stacking of multiple containers 100 together. In the illustrated example, the raised inner rim 150 is lower in height than the raised outer rim 142, but in other implementations the height of the inner rim may be equal to or greater than the outer rim. As discussed further below with reference to FIGS. 11A-11C, the outer rim 142 of the central dome portion 136 also includes eight spaced apart dome recesses 156 each sized and dimensioned to receive at least a portion of a corresponding sector well 128 of a base 102 of another food container 100 when the other food container is stacked on top of the cover 104 of the food container.

Among other things, the shapes of the sidewall 144, raised outer rim 142, dome portion channel 154, and raised inner rim 150 function to improve the rigidity of the cover 104, and serve to distribute supporting forces when an object (e.g., one or more other food containers) is stacked on the cover 104. Further, the shape of the interior surface 138 of the central dome portion 136 and/or the texture (e.g., rough texture) of the interior surface may tend to absorb or retain moisture (e.g., condensation) which reduces the amount of moisture that returns to the hot food item (e.g., pizza) which could cause quality deterioration of the food item. Additionally, the generally round shape of the central dome portion 136 which corresponds to a round food item (e.g., pizza) provides a reduced surface area for heat transfer compared to a conventional square pizza box, thus prolonging the duration that the food item maintains an elevated temperature. In other implementations, the central dome portion 136 may be sized and/or dimensioned differently than shown in the illustrated implementations.

As shown in FIGS. 4A and 4B, the interior surface 138 of the sidewall 144 of the central dome portion 136 has an inwardly and downwardly facing perimeter channel 160 sized and dimensioned to form engage the raised perimeter rim 110 of the base 102 when the cover 104 is engaged with the base. When the cover 104 is engaged with the base 102, the perimeter channel 160 of the sidewall 144 of the cover contacts the top surface 112 and sidewall 114 of the raised rim 110 of the base 102 to form a "seal" which may limit or even prevent the flow of air into or out of the enclosed chamber 106 which houses the food item. In some implementations, the perimeter channel 160 and the raised rim 110 are sized and dimension to form an interference or press fit therebetween when the cover 104 is engaged with the base 102.

The various features of the dome portion 136 provide significant strength which, among other things, allows for stacking multiple food containers 100 together. Specifically, the dome portion 136 includes several curved or cornered portions which together improve the rigidity of the cover 104. For example, the dome portion 136 includes the perimeter channel 160 adjacent the base flange 116, the curved sidewall 144 radially inward of the perimeter channel, the raised outer rim 142 radially inward of the sidewall, the dome portion channel 154 radially inward of the raised outer rim, the raised inner rim 150 radially inward of the dome portion channel, and the planar ceiling portion 152 radially inward of the raised inner rim.

When the cover 104 is engaged with the base 102 (FIG. 4A), the base flange 116 and cover flange 146 are also in contact and fastened by the fasteners 131 which, as noted above, serve to restrict lateral or rotational motion between the cover and the base, to add strength to the assembled food container 100, and to increase the limiting of airflow into the chamber 106. As discussed above, in some implementations the fasteners 131 may form an interference or press fit between each pair of protrusions 134 and recesses 132 of the cover 104 and base 102, respectively. In such implementations, the fasteners 131 also function to retain the cover 104 on the base 102.

In the illustrated implementation, the outer dimensions of the base 102 and the cover 104 are substantially matched which aids the user in aligning the cover 104 when placing the cover onto the base during use, particularly when the cover is not joined to the base via a hinge (e.g., flexible joint). In some implementations, due to various symmetries of the base 102 and the cover 104, the cover may be secured to the base at any of four relative rotational angles (e.g., 0°, 90°, 180°, and) 270° relative to the base. That is, the edge 148A (FIG. 1B) of the cover 104 may be vertically aligned with any of the edges 118A-118D of the base 102. To remove the cover 104 from the base 102, the user may lift the cover relative to the base with sufficient force to overcome the "seal" between the perimeter channel 160 of the cover and the rim 110 of the base and, in implementations where the fasteners 131 are secured by interference or press fits, sufficient force to overcome the fastening forces of the respective fasteners 131.

As shown in FIG. 1B, in some implementations, the raised rim 110 of the base 102 includes one or more grooves or notches 162 at an intersection of the top surface 112 and the sidewall 114 of the rim 110. Such grooves 162 may function to release the seal between the cover 104 and the base 102 when the user begins to lift the cover from the base prior to the perimeter channel 160 disengaging with the remainder of the raised rim 110. Such feature advantageously makes the cover 104 easier to remove from the base 102 when a user desires to access the food item in the food container 100.

The base 102 and cover 104 of the food container 100 may be nestable with other bases and covers, respectively, with a minimum amount of vertical height (i.e., essentially the thickness of the material for each component). That is, when a first base 102 is stacked on top of a second base, the top surfaces of the features of the lower second base are positioned adjacent the bottom surfaces of corresponding features of the upper first base, with minimal air space therebetween. Similarly, when a first cover 104 is stacked on top of a second cover, the top surfaces of the features of the lower second cover are positioned adjacent the bottom surfaces of corresponding features of the upper first cover. Thus, numerous bases may be stacked together at a height which is much less than the combined height of the individual bases. Similarly, numerous covers may be stacked together at a height which is much less than the combined height of the individual covers. Such nesting feature is advantageous for shipping and for storing the food containers 100 in a small space (e.g., restaurant, vehicle, packaging).

Further, unlike conventional pizza boxes formed from a cardboard blank which has to be folded, no pre-assembly is required. Thus, the base 102 and cover 104 need not be handled by a user until selected for use to perform its intended function, which significantly reduces the likelihood of contamination.

Figure 1B:
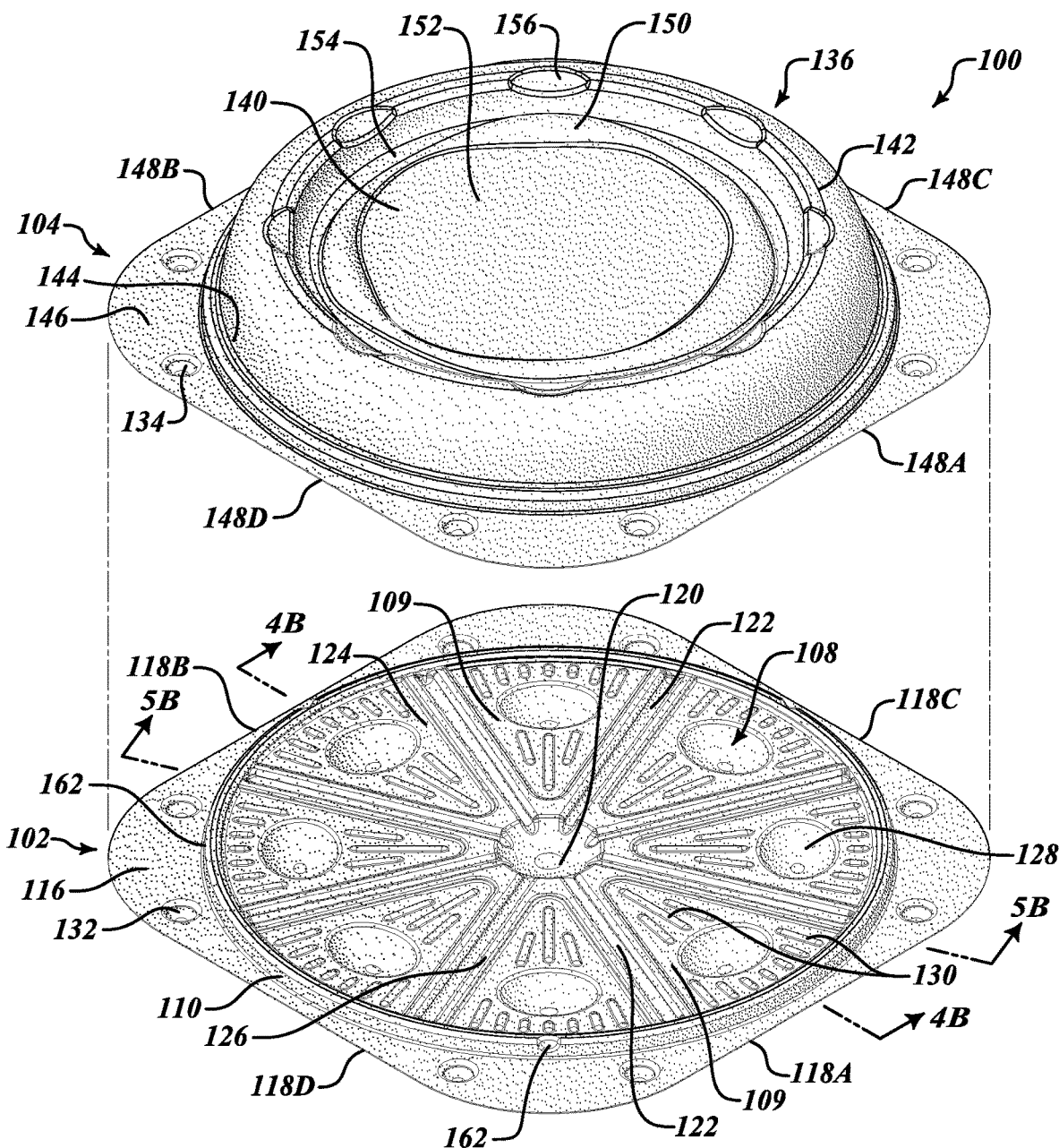
FIG. 1B is a top perspective view of the food container with a cover of the food container separated from a base thereof, according to one illustrated implementation.
Figure 2A:
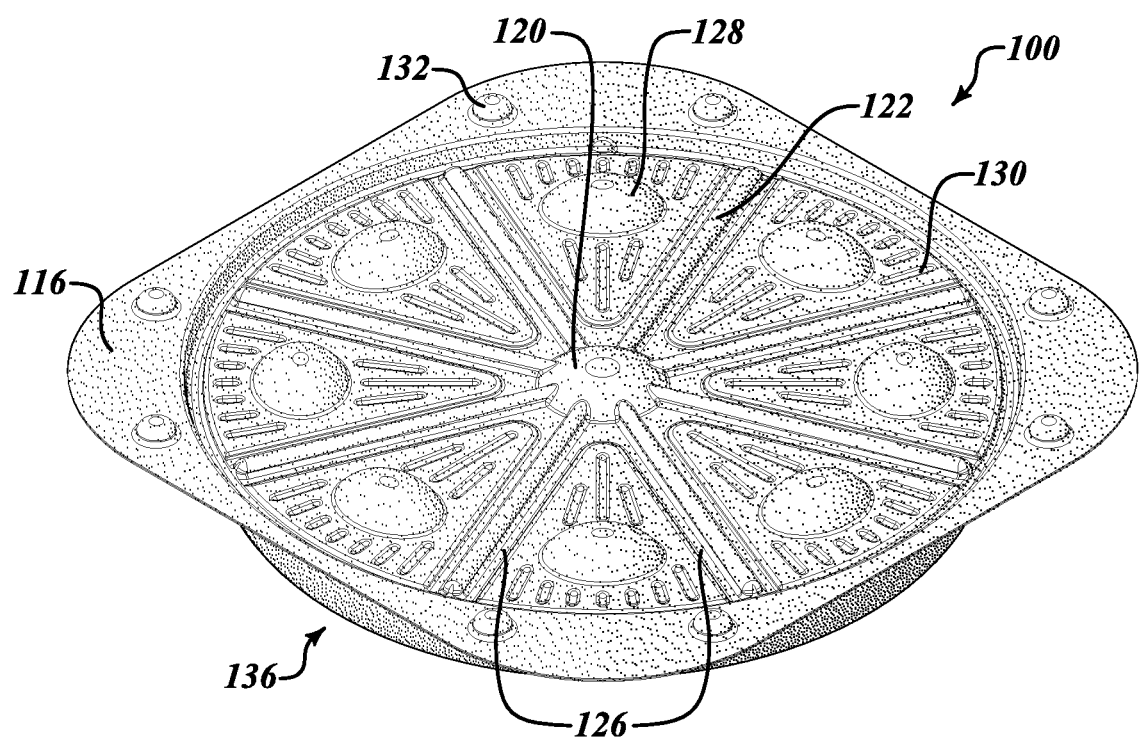
FIG. 2A is a bottom perspective view of the food container, according to one illustrated implementation.
Figure 2B:
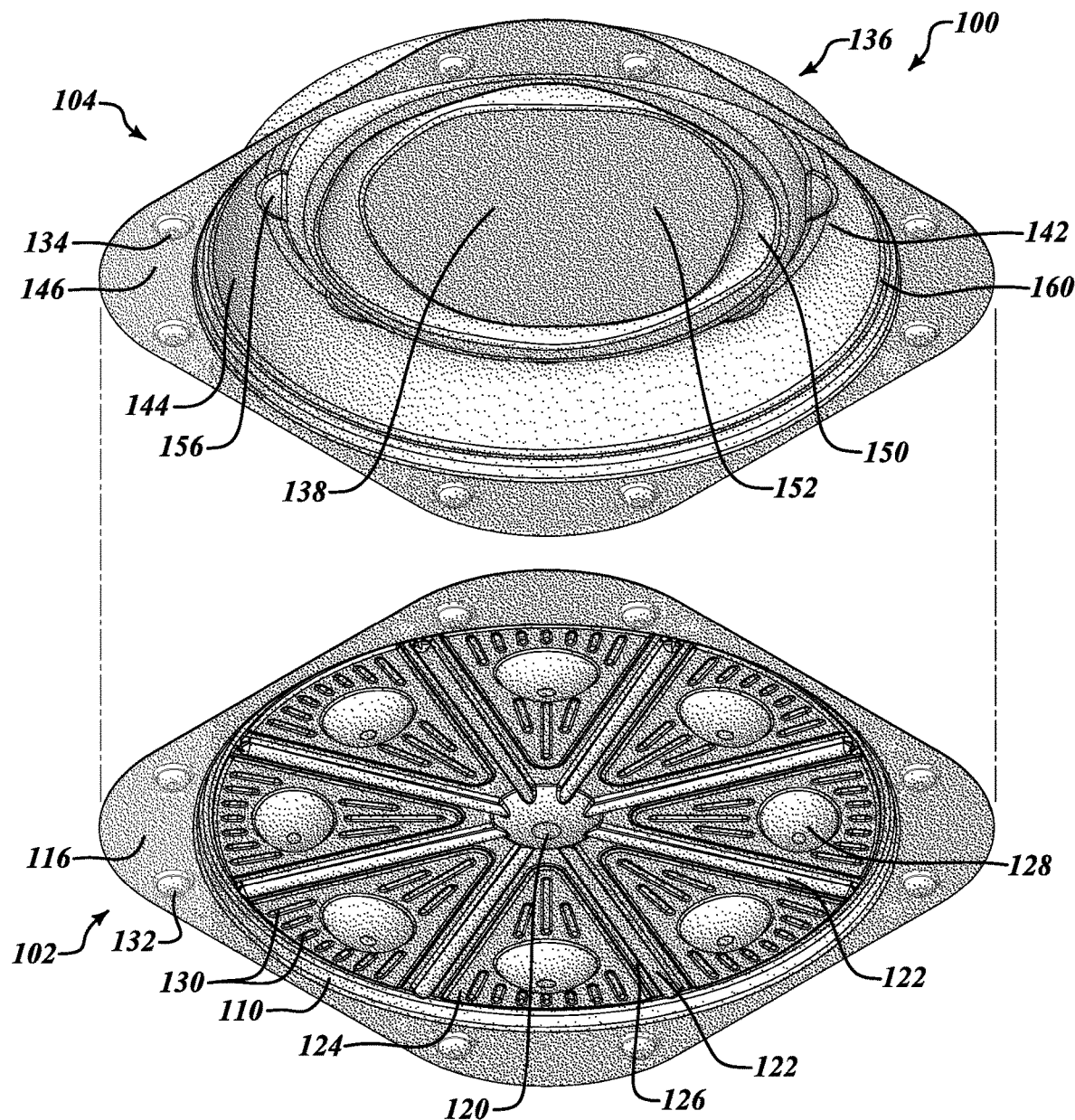
FIG. 2B is a bottom perspective view of the food container with the cover separated from the base, according to one illustrated implementation.
Figure 3:
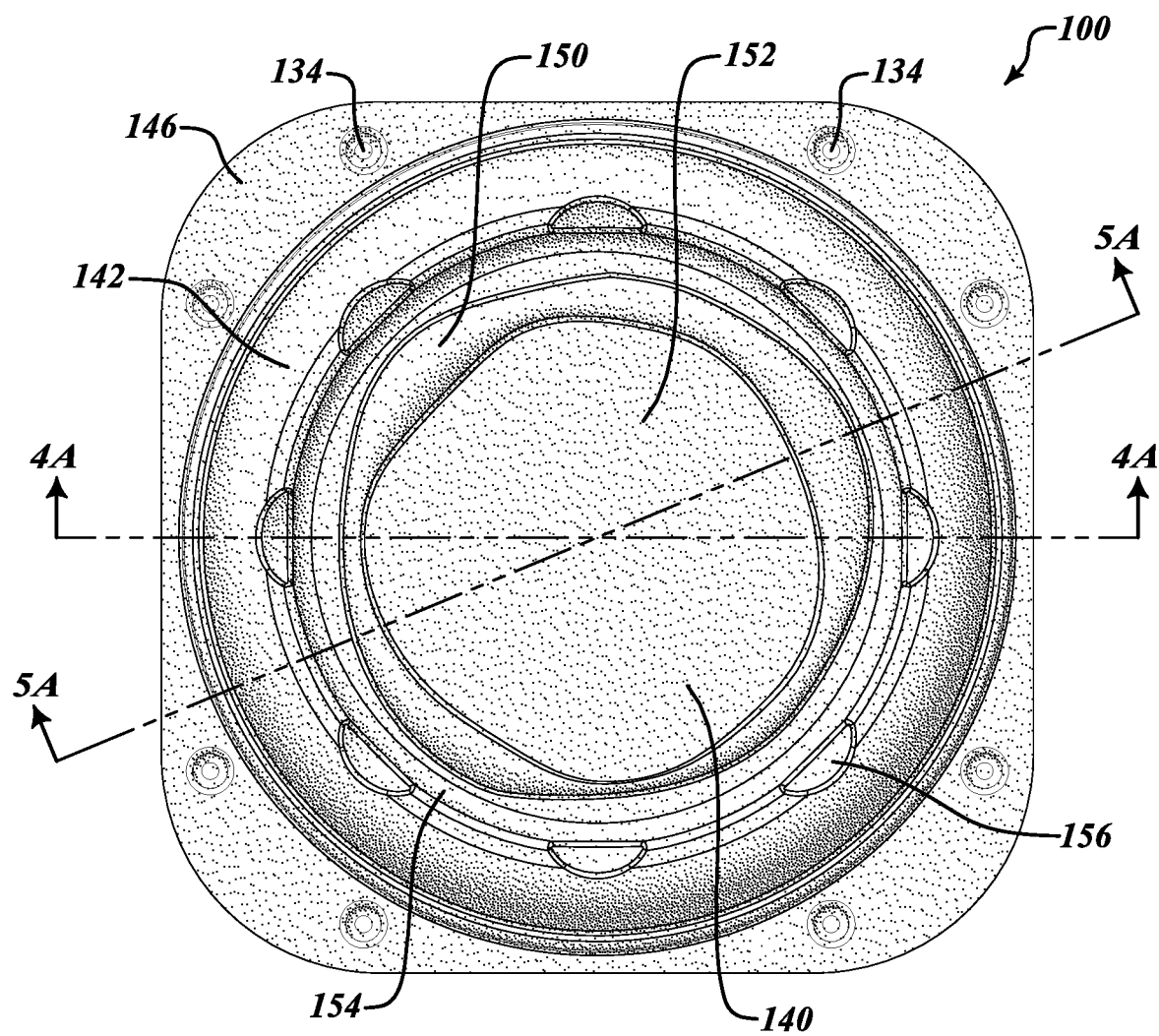
FIG. 3 is a top plan view of the food container, according to one illustrated implementation.

In operation, a user may select a base 102 from a stack of nested bases, place a food item (cooked or uncooked) onto the food receiving portion 108 of the base, select a cover 104 from a stack of nested covers, and lower the cover onto the base as shown in FIGS. 1A and 2A.

Because the food item is generally supported above the planar surface 109 of the food receiving portion 108 by the raised ribs 130 and sector portion rim 126 of each sector portion 124, liquid drippings from the food item fall away from the food item and into the sector wells 128, the central well 120 and/or the channels 122. Such features prevent the bottom of the food item from becoming soggy in addition to strengthening the rigidity of the food container. Thus, the aforementioned features of the food container 100 provide a housing which is lightweight, sturdy, compostable, and supports the food item in a manner which keeps the food item in a hot and dry condition, which preserves the freshness of the food item.

Figure 11A:
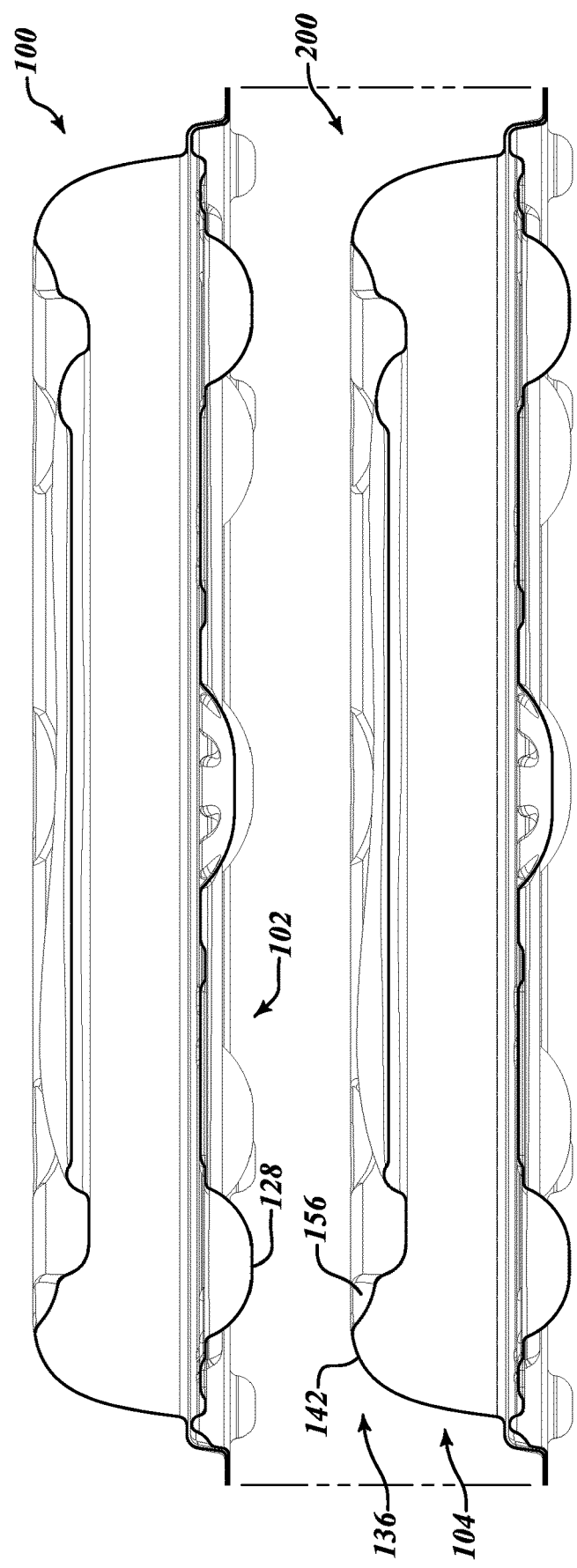
FIG. 11A is a sectional elevational view of a first food container vertically aligned with and spaced apart from a second food container, according to one illustrated implementation.
Figure 11B:
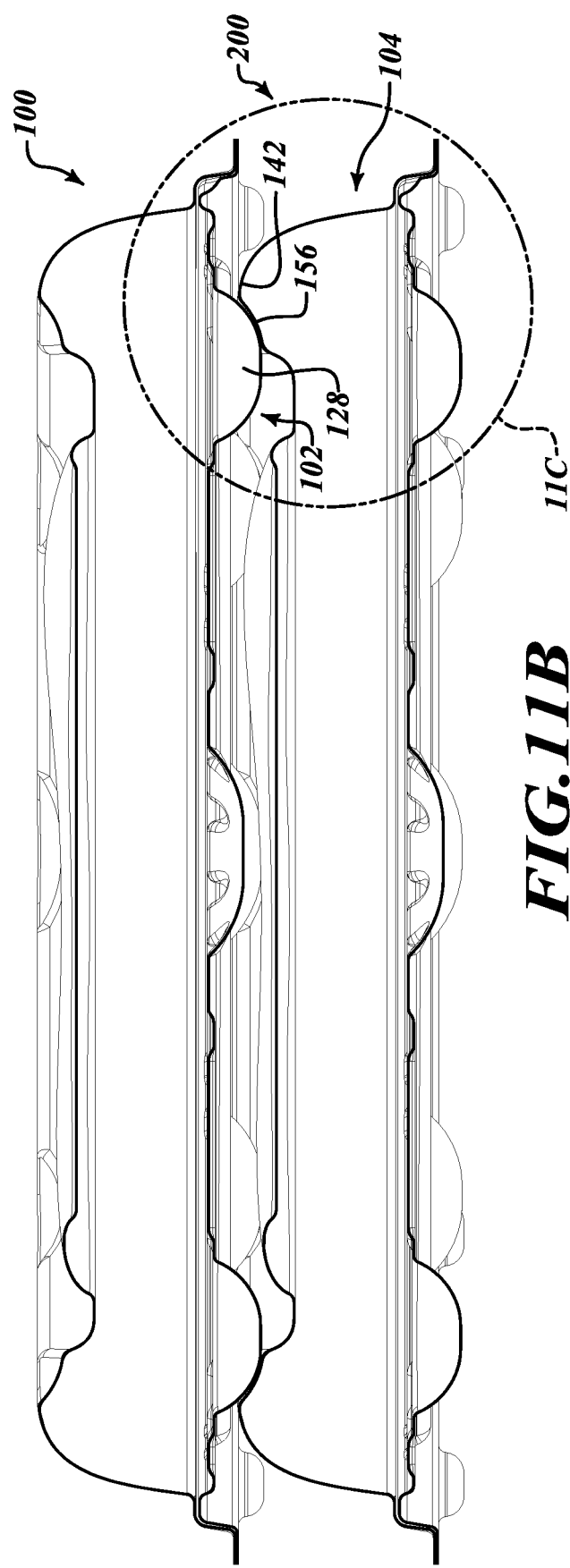
FIG. 11B is a sectional elevational view of the first and second food containers in a stacked relationship, according to one illustrated implementation.
Figure 11C:
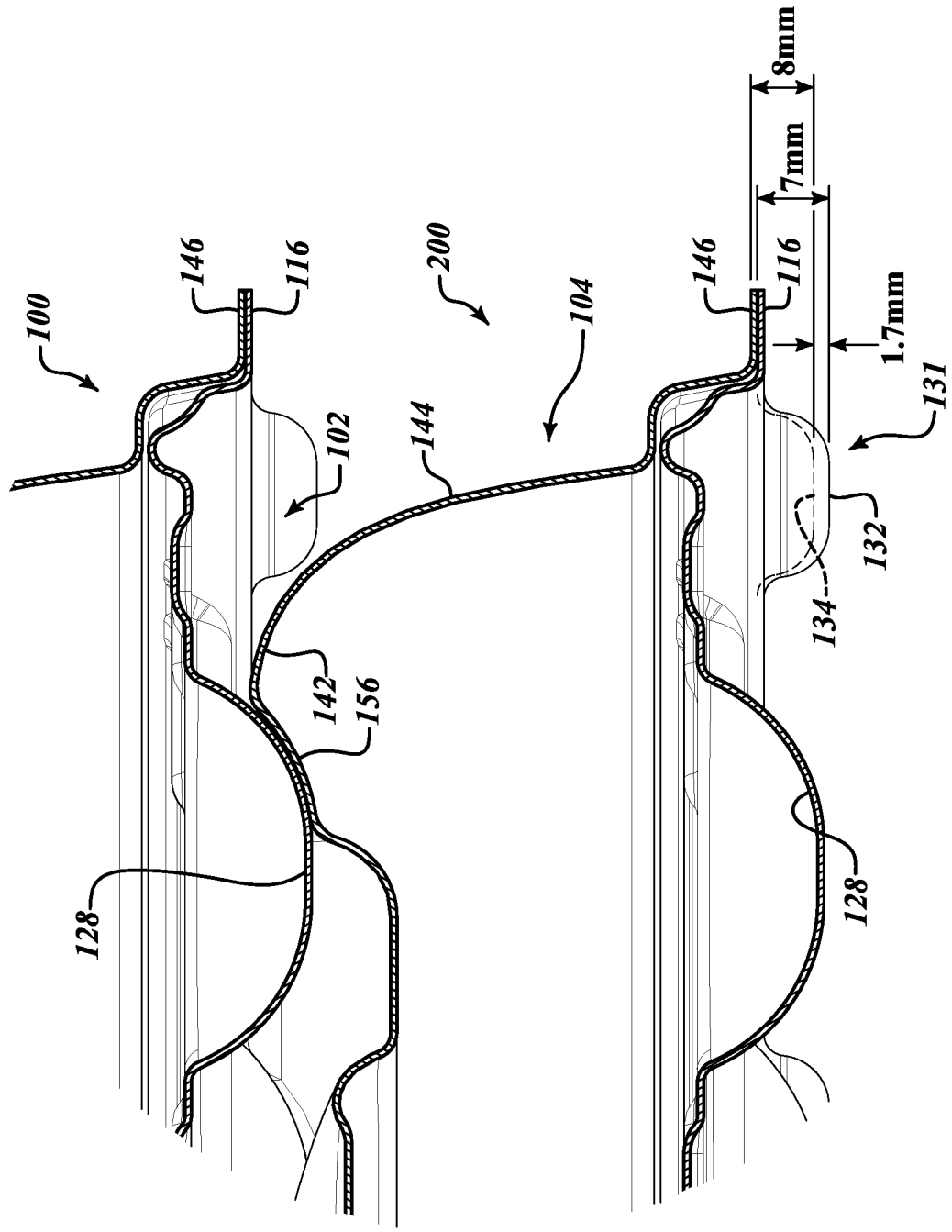
FIG. 11C is a detailed view of a portion of FIG. 11B, according to one illustrated implementation.

FIGS. 11A-11C show how the food container 100 is stackable with one or more other food containers, such as another food container 200 which is substantially the same or identical to the food container 100. As shown in FIG. 11C, an inward facing portion of the apex of the raised outer rim 142 of the central dome portion 136 of the cover 104 includes a plurality of dome recesses or seats 156 radially spaced from the center of the dome portion. Each of the dome recesses 156 are sized and dimensioned to receive at least a portion of one sector well 128 of a base 102 of another food container 100 when the other food container is stacked on top of the cover 104 of the food container 200. In some implementations, the shape of the recesses 156 may complement the shape of the sector wells 158 to maximize the contact surface area between the recesses and the sector wells. Thus, the sector wells 128 function as "feet" for the base of the food container 100 when the food container 100 is stacked on top of the food container 200. When in such a stacked relationship, only the sector wells 128 of the base 102 of the top food container 100 contact the dome recesses 156 of the cover 104 of the bottom food container 200, which provides a substantial air space between the two containers 100 and 200, thus minimizing heat transfer therebetween. Additionally, since the sector wells 128 of the base 102 of the top food container 100 are spaced apart from the food product in the food container 100 and the sector recesses 156 of the dome portion 136 of the bottom food container 200 are not in contact with the food product in the food container 200, surfaces of the food containers adjacent the hot food products do not contact each other when the containers are stacked, which further minimizes heat transfer between containers.

As discussed above, the outer rim 142 of the central dome portion 136 is structurally rigid and serves to distribute supporting forces of the sector wells 128 of the base 102 when the top food container 100 is stacked on the cover 104 of the bottom food container 200. Moreover, when the food container 100 is stacked on the food container 200 and the bottom surface of each of the sector wells 128 of the base 102 is received in a respective one of the dome recesses 156, the food container 100 and the food container 200 are restricted from lateral or rotational movement with respect to each other, which helps keep the food containers in a stacked relationship during transportation of the food containers.

Figure 12:
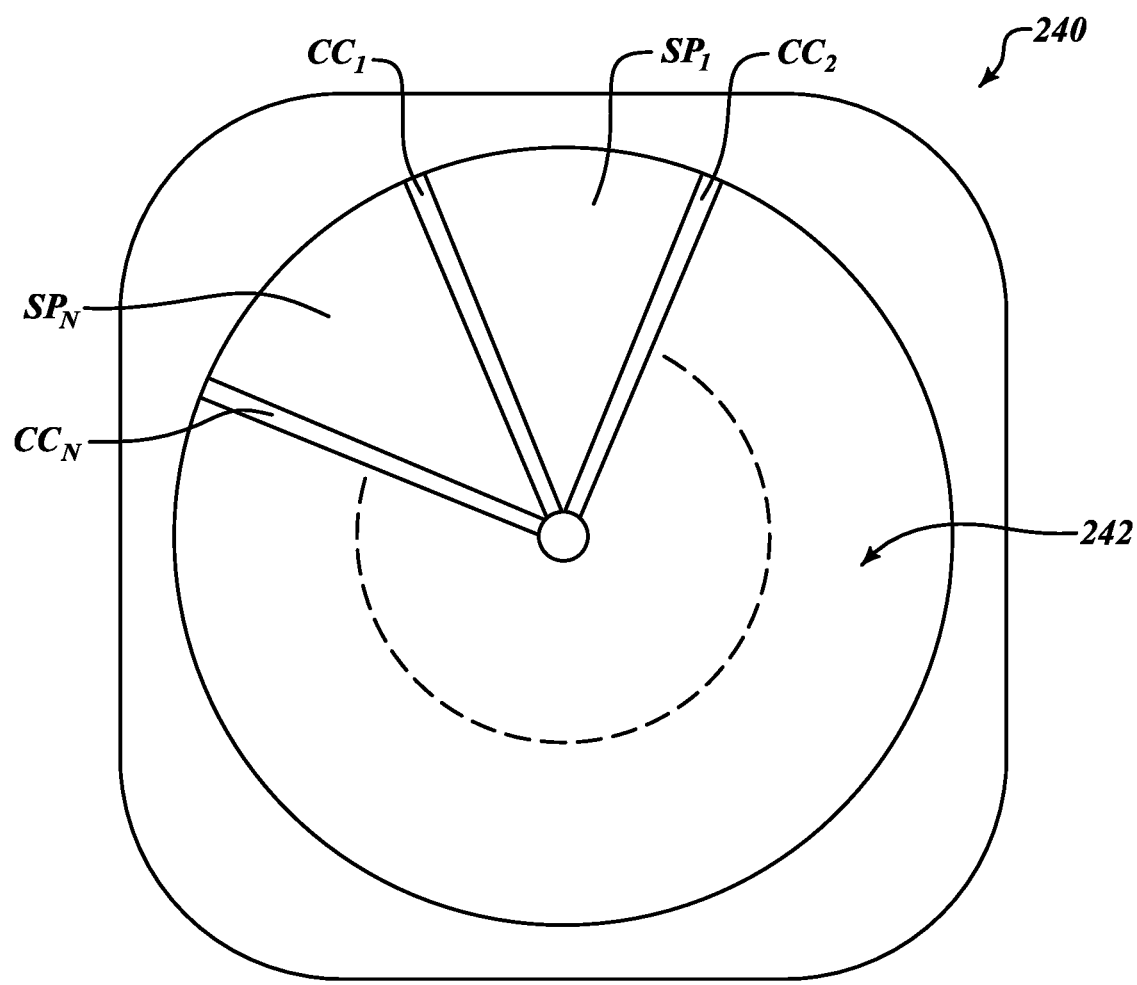
FIG. 12 is a top plan view of a food container which includes a number N of food receiving portion channels and a corresponding number N of sector portions, according to one illustrated implementation.

FIG. 12 shows a simplified schematic diagram of a base 240 for a food container. The base 240 may be similar or identical to the base 102 discussed above. In this implementation, the base 240 includes a food receiving portion 242 which includes a number N of channels $CC_{1-N}$ which delineate a corresponding number N of sector portions $SP_{1-N}$. The channels $CC_{1-N}$ and sector portions $SP_{1-N}$ may be similar to the channels 122 and sector portions 124, respectively, discussed above. As a non-limiting example, the number N may be equal to a positive integer (e.g., 4, 7, 8, 9, 10, 13, 16).

Figure 6:
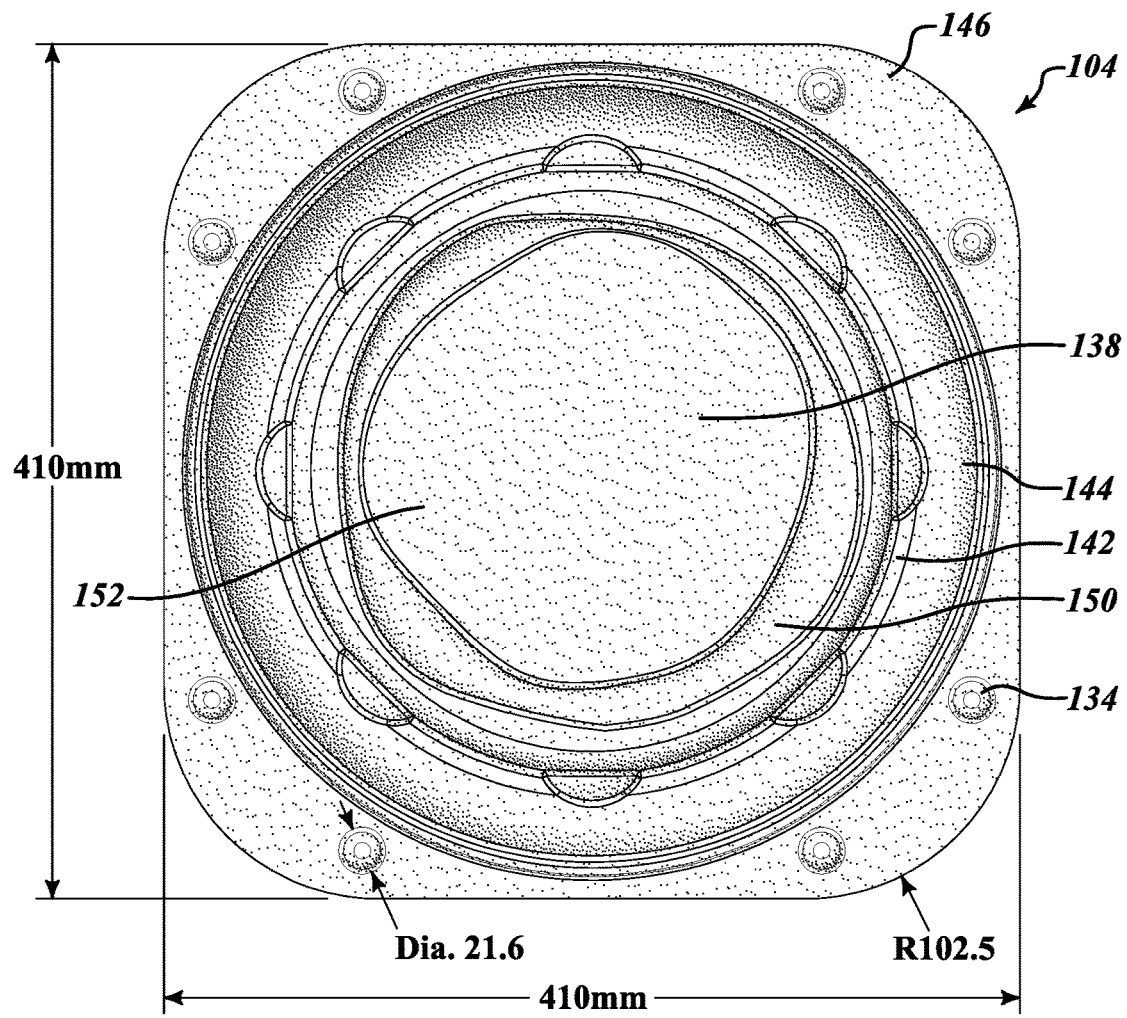
FIG. 6 is a bottom plan view of the cover of the food container, according to one illustrated implementation.
Figure 7:
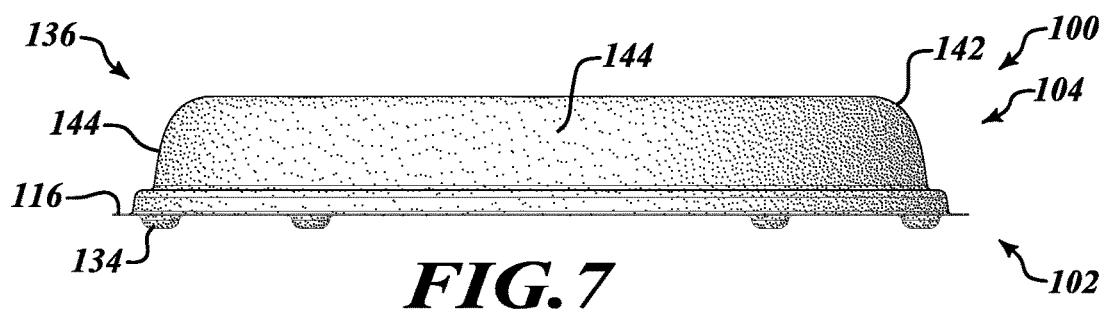
FIG. 7 is a front elevational view of the cover of the food container, according to one illustrated implementation.
Figure 8:
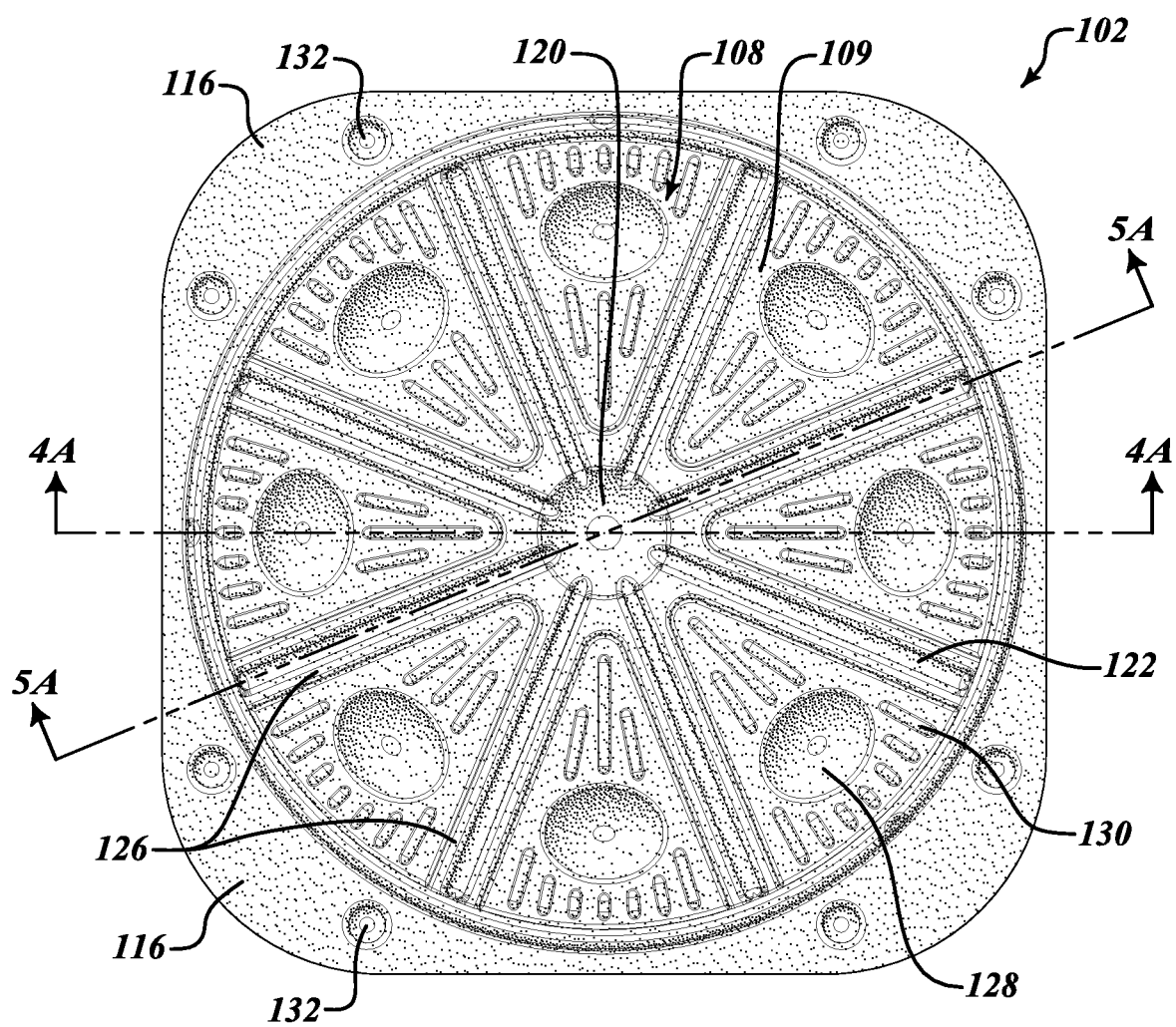
FIG. 8 is a top plan view of the base of the food container, according to one illustrated implementation.
Figure 9:
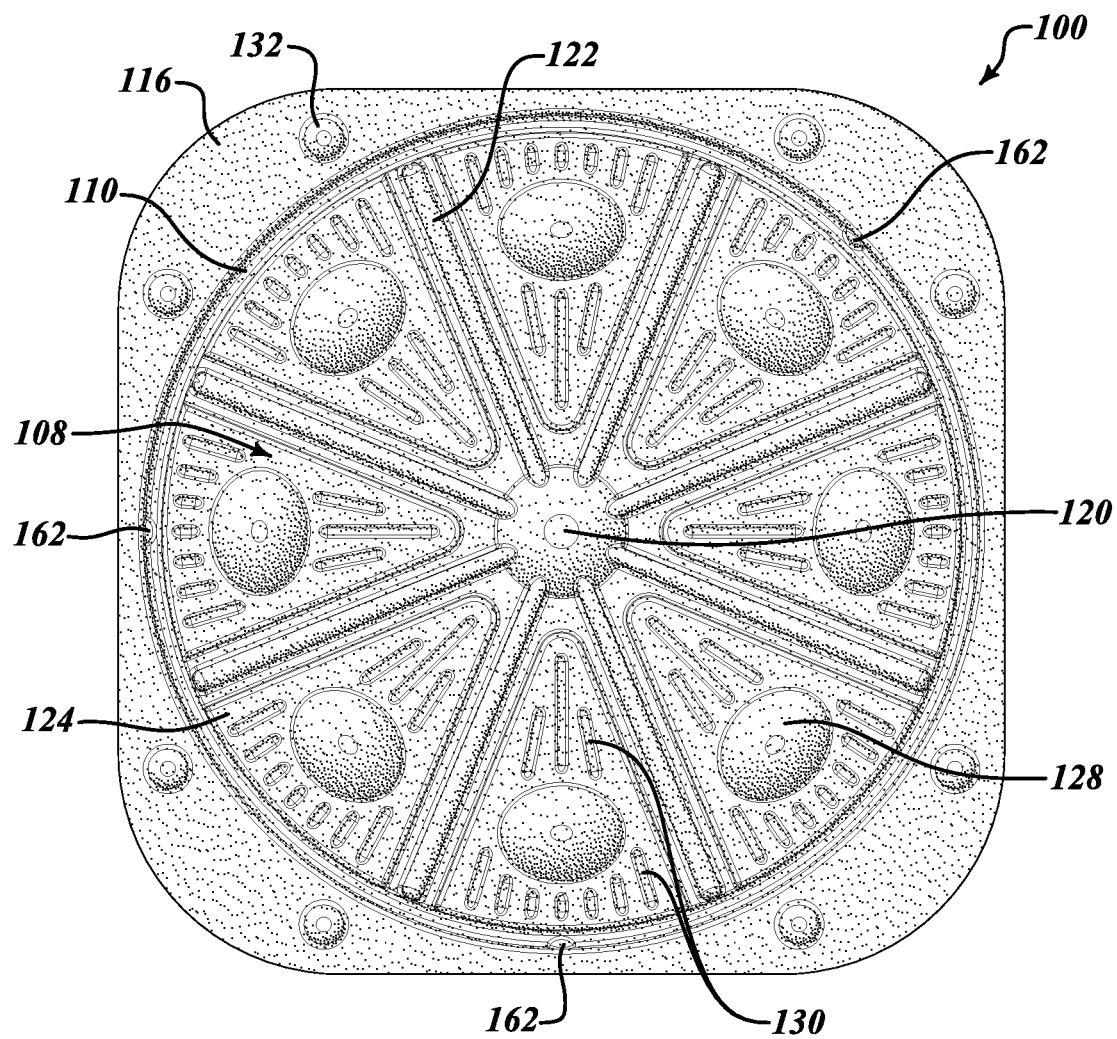
FIG. 9 is a bottom plan view of the food container, according to one illustrated implementation.
Figure 10:
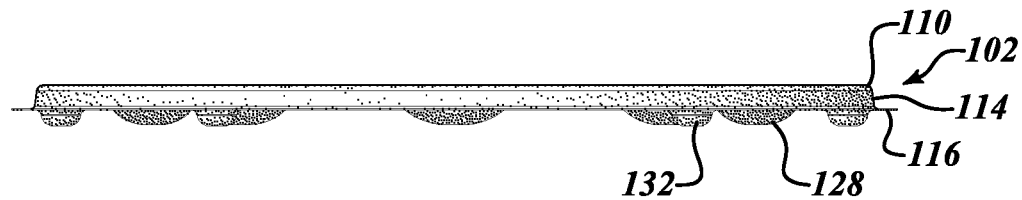
FIG. 10 is a front elevational view of the base of the food container, according to one illustrated implementation.
Figure 13:
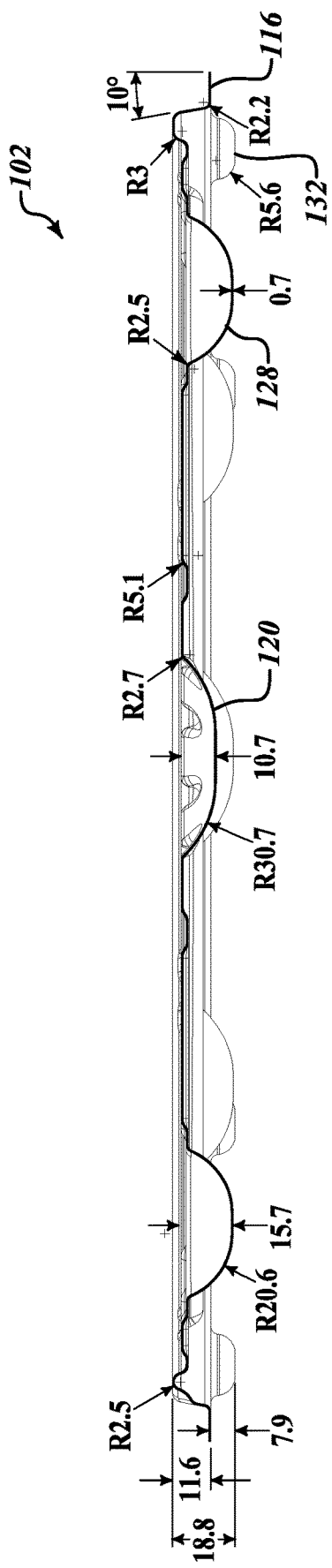
FIG. 13 is a sectional elevational view of the base of the food container, showing various dimensions thereof, according to one illustrated implementation.

FIG. 13 shows a sectional elevational view of the base 102 and includes a number of dimensional measurements and radius of curvature measurements in millimeters for the base 102, according to one or more implementations. FIG. 6 also shows example measurements for the outer edges of the cover 104 and/or base 102. As shown, in some implementations the base 102 and cover 104 may each have outer dimensions of 410 millimeters by 410 millimeters. The aforementioned strengthening structural features allow the food container 100 to be relatively large and to utilize a relatively thin layer of material for each of the base and the cover while providing the aforementioned required support for receiving a food item and/or stacking multiple food containers together. Such measurements are provided as examples and should not be considered to be limiting.

Referring now to FIG. 14A through FIG. 21, various views of a food container 300 are shown. The food container 300 may be similar or identical to the food containers 100 and 200 in many respects (e.g., shapes, materials, sizes, features). Accordingly, at least some of the discussion above is applicable to the food container 300 and may not be repeated below for the sake of brevity.

Figure 14A:
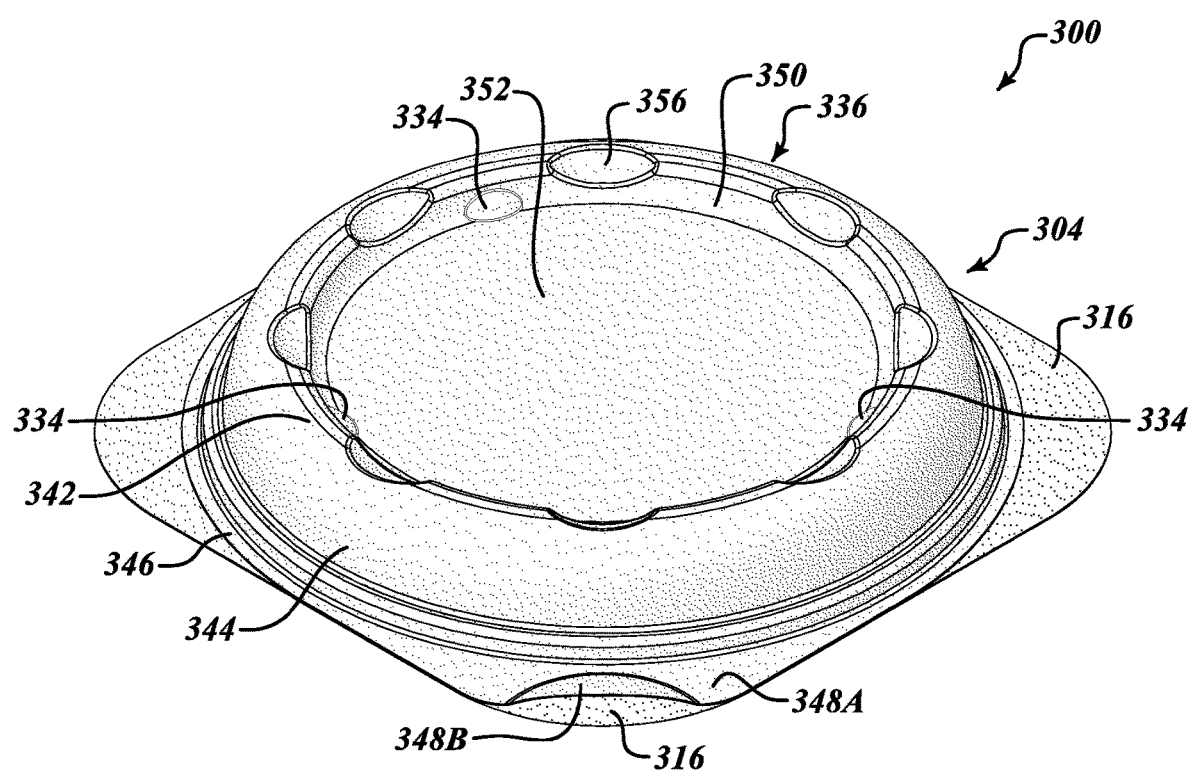
FIG. 14A is a top perspective view of another food container, according to one illustrated implementation.
Figure 14B:
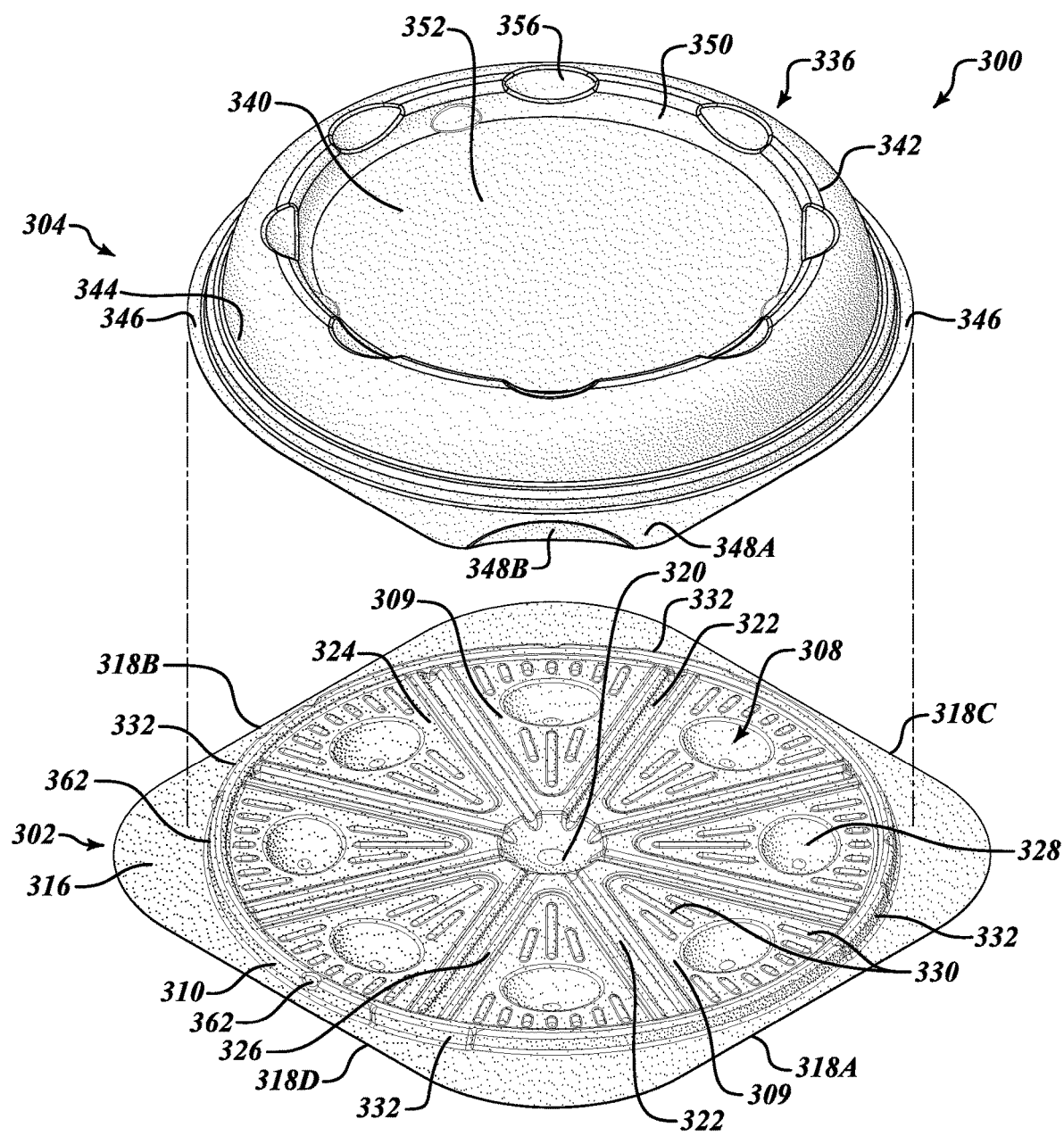
FIG. 14B is a top perspective view of the food container of FIG. 14A with a cover of the food container separated from a base thereof, according to one illustrated implementation.
Figure 15A:
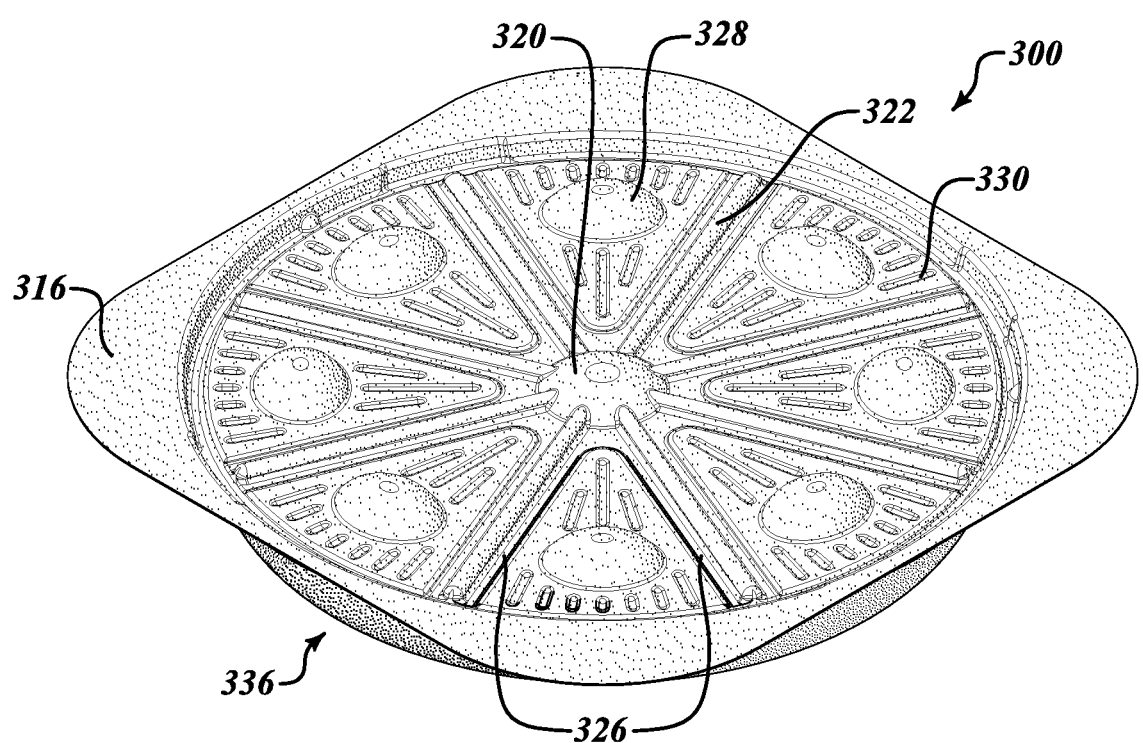
FIG. 15A is a bottom perspective view of the food container of FIG. 14A, according to one illustrated implementation.
Figure 15B:
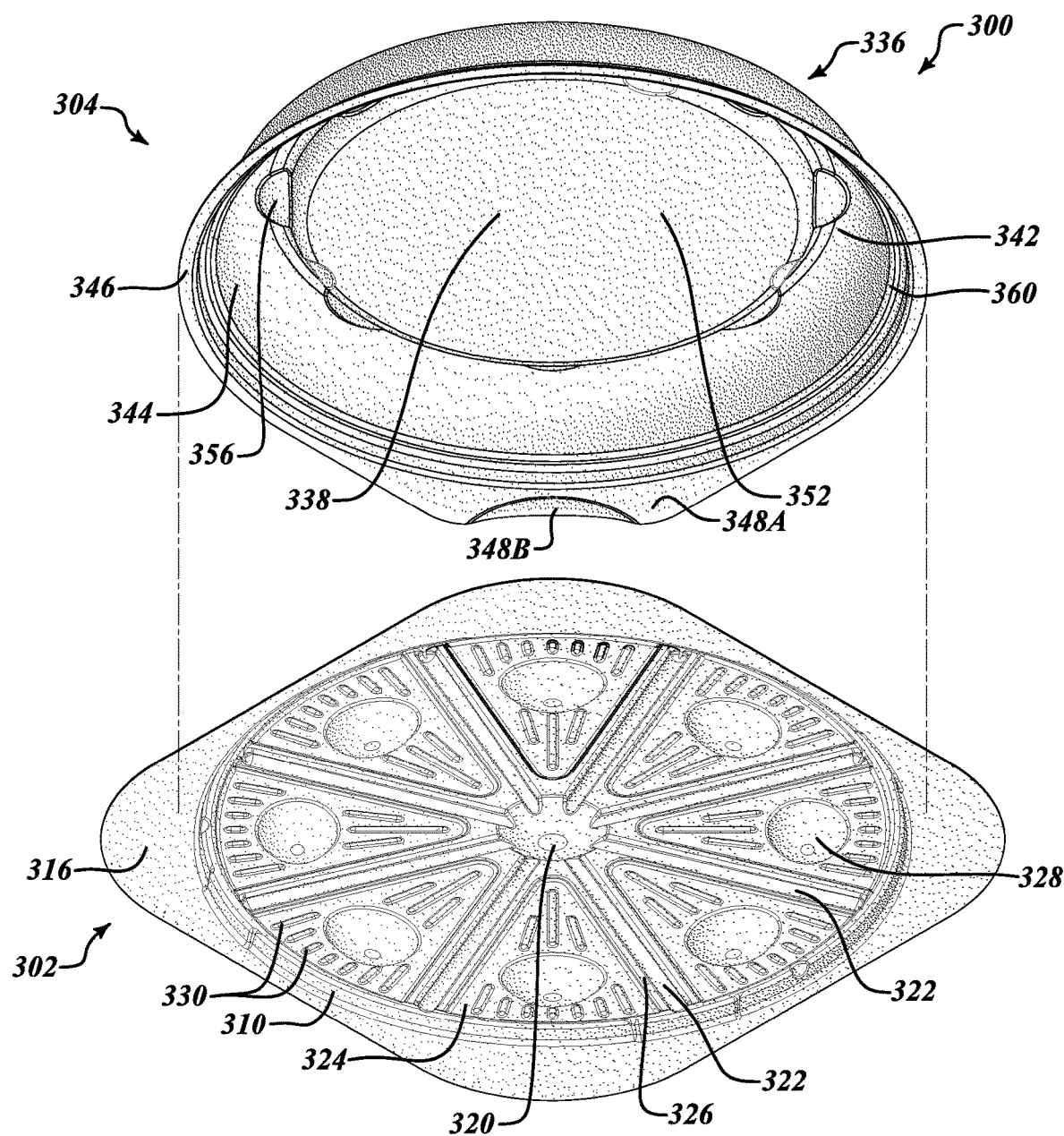
FIG. 15B is a bottom perspective view of the food container of FIG. 14A with the cover separated from the base, according to one illustrated implementation.
Figure 16:
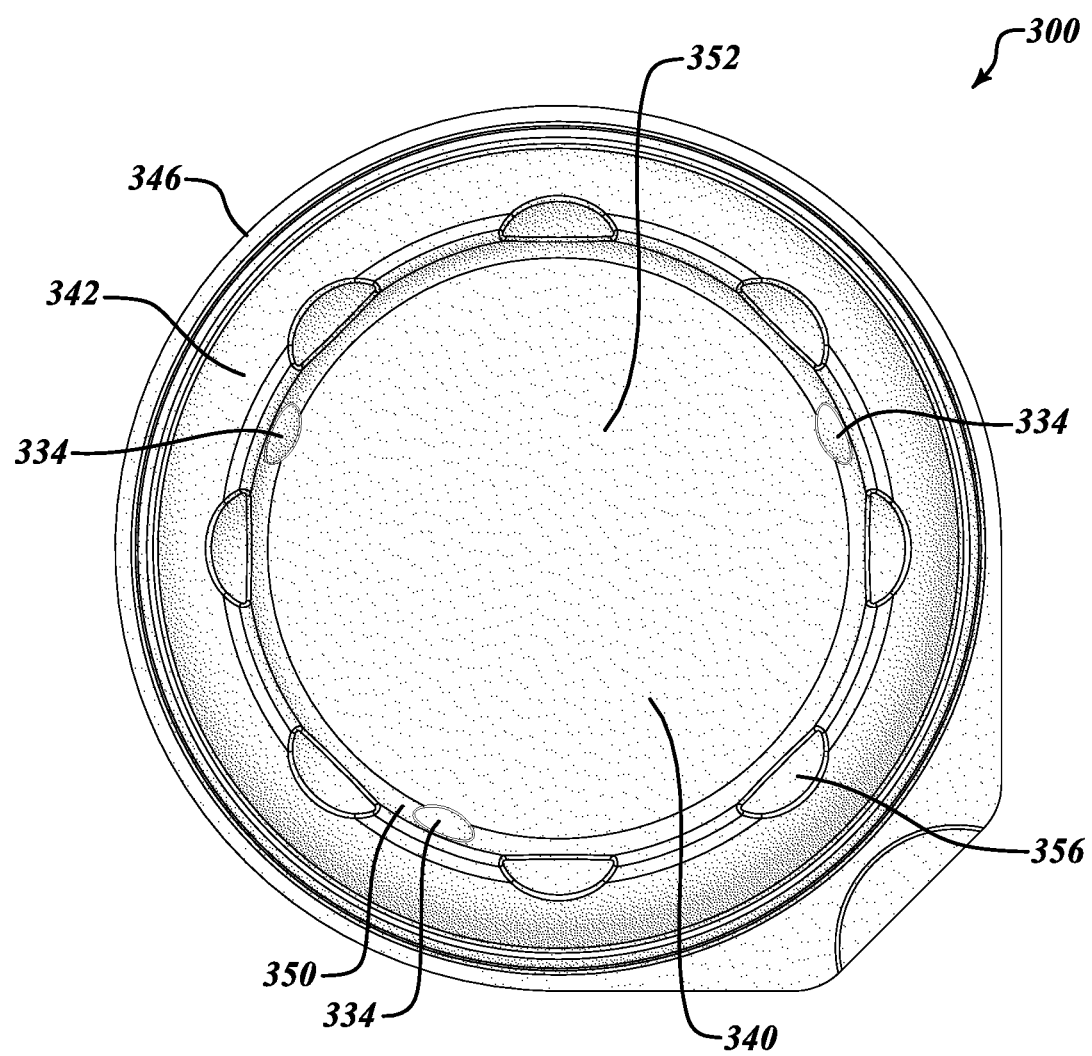
FIG. 16 is a top plan view of the food container of FIG. 14A, according to one illustrated implementation.
Figure 17:
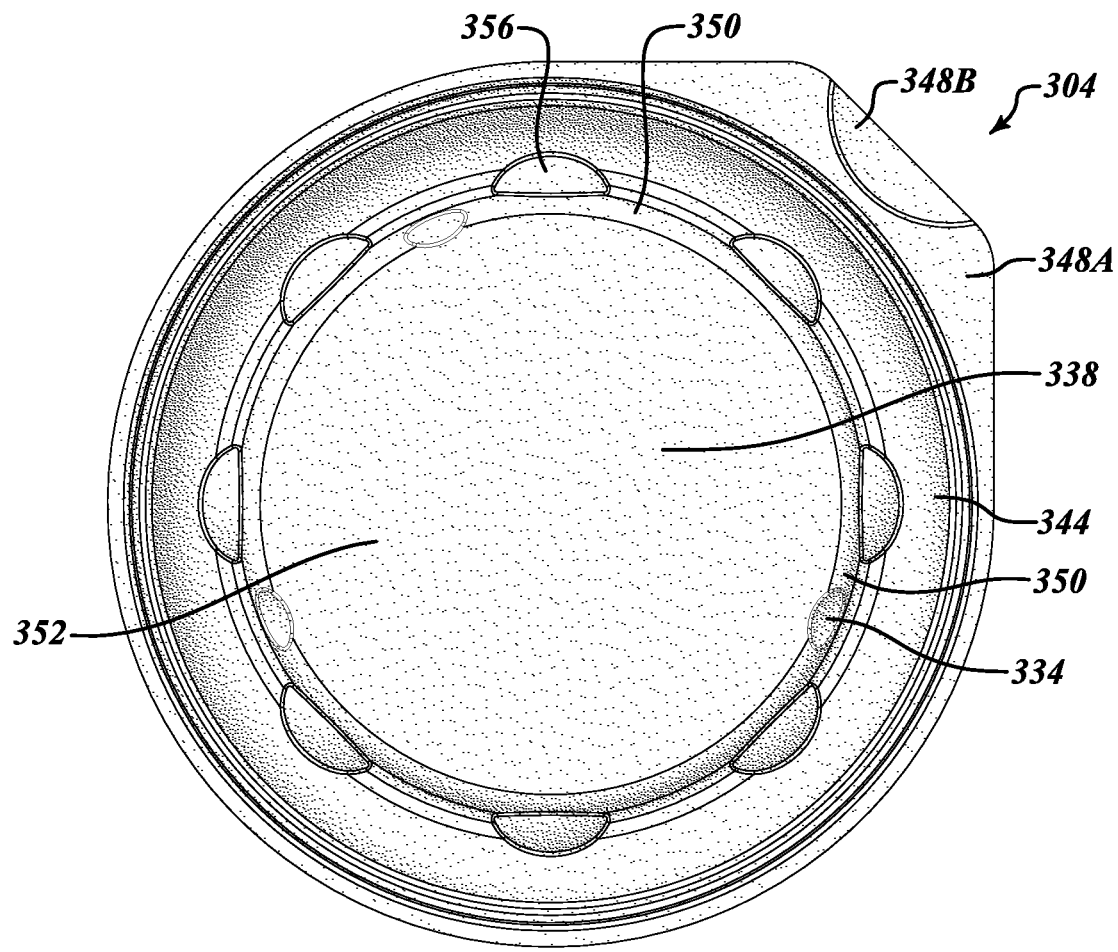
FIG. 17 is a bottom plan view of the cover of the food container of FIG. 14A, according to one illustrated implementation.
Figure 18:
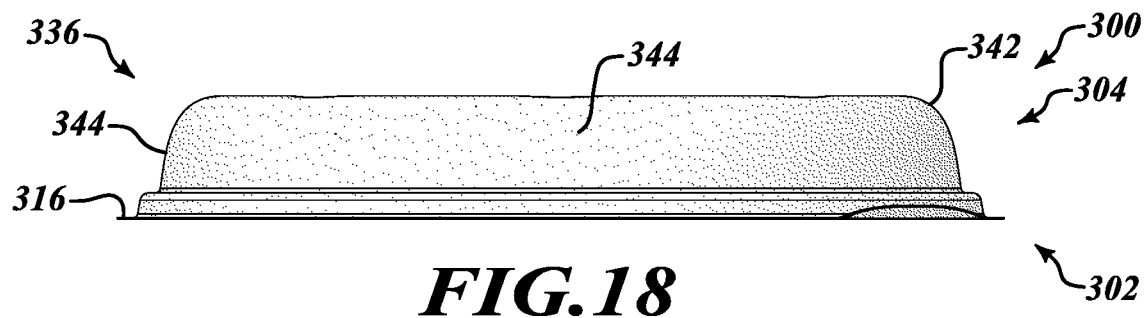
FIG. 18 is a front elevational view of the cover of the food container of FIG. 14A, according to one illustrated implementation.
Figure 19:
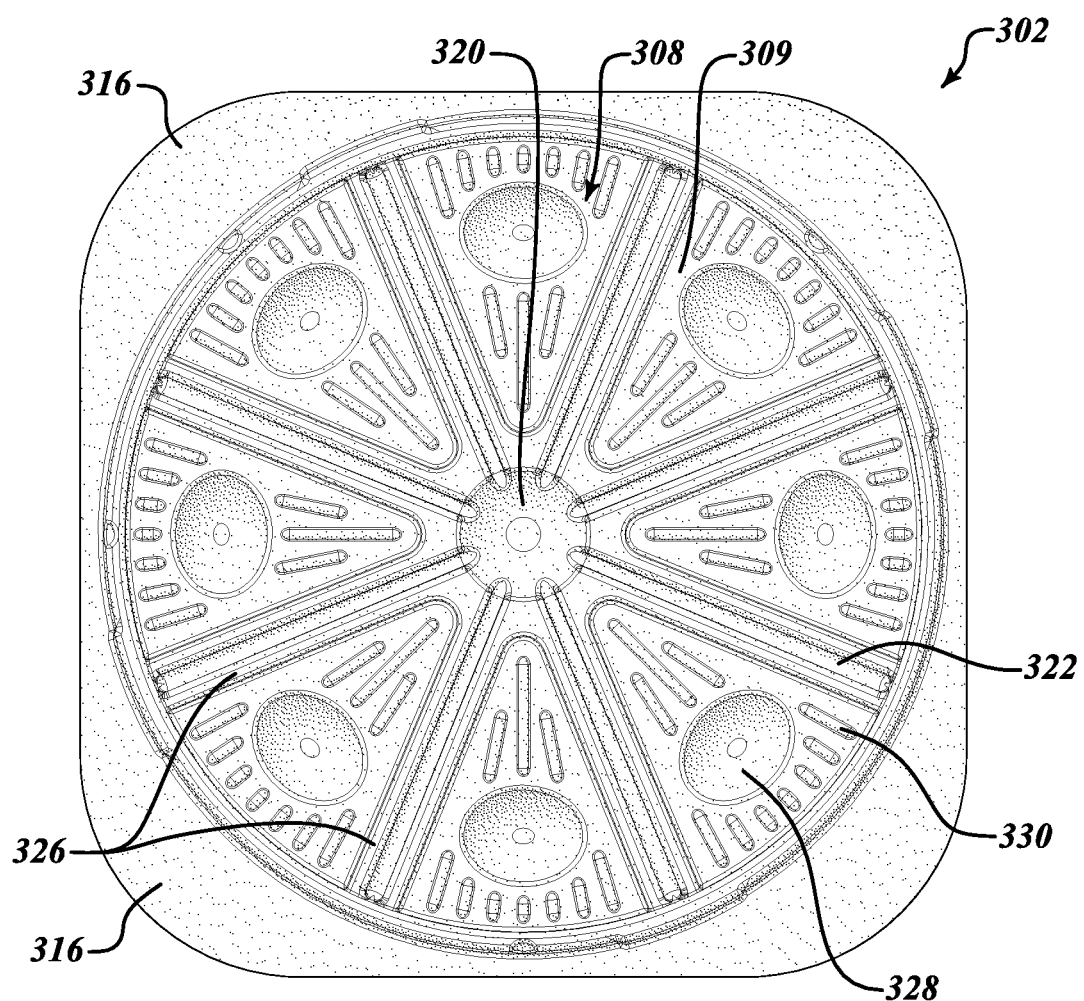
FIG. 19 is a top plan view of the base of the food container of FIG. 14A, according to one illustrated implementation.
Figure 20:
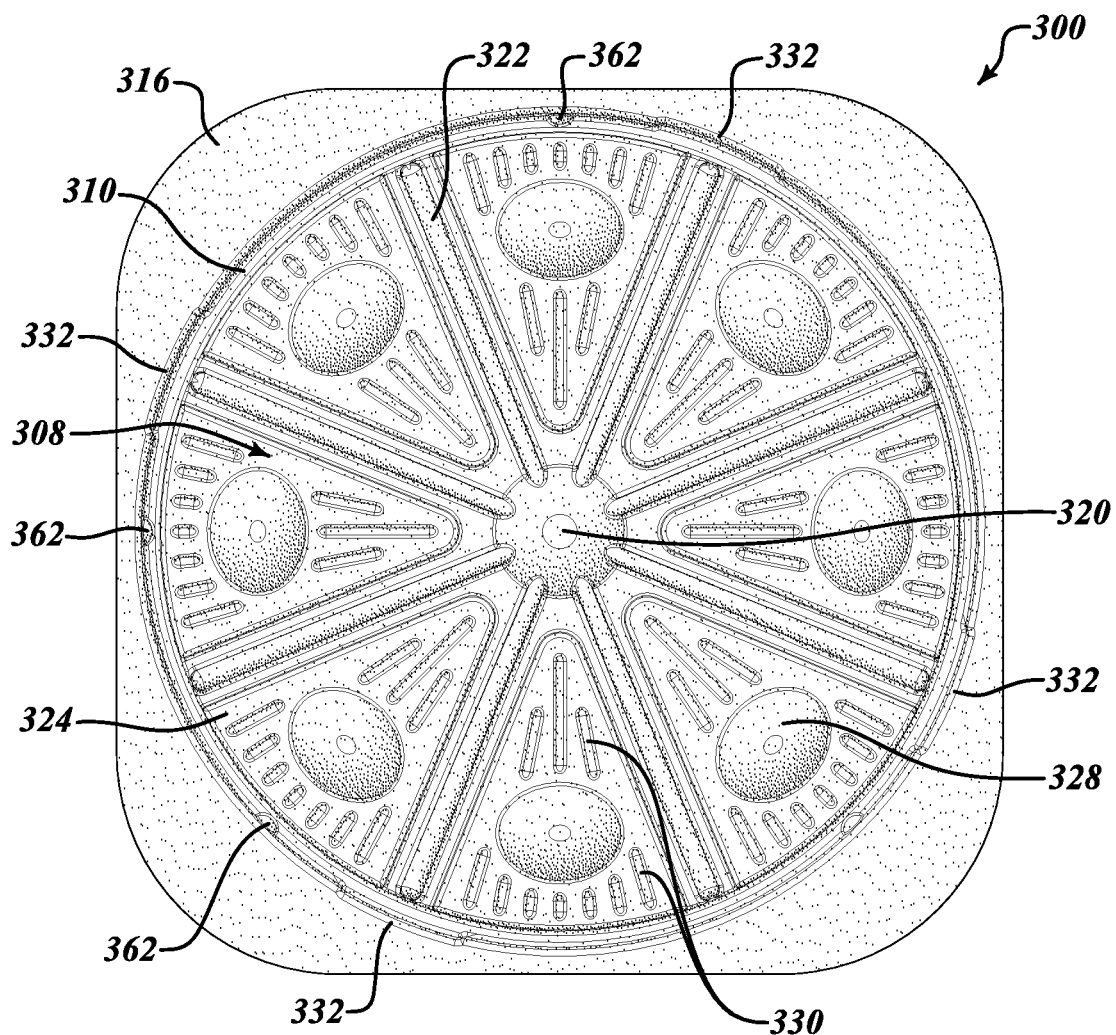
FIG. 20 is a bottom plan view of the food container of FIG. 14A, according to one illustrated implementation.
Figure 21:
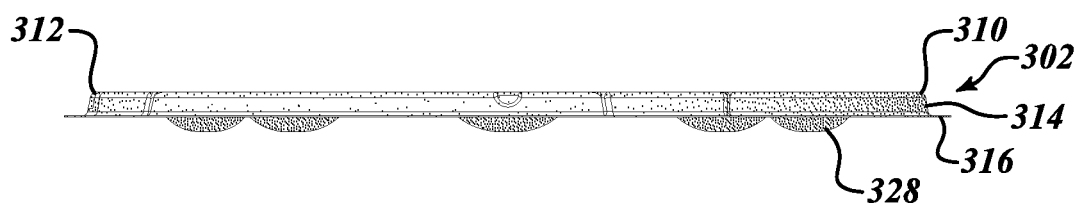
FIG. 21 is a front elevational view of the base of the food container of FIG. 14A, according to one illustrated implementation.

As shown in FIG. 14B, the food container 300 includes a base 302 and a separate cover 304 which cooperate as shown in the figures and described below to form a closed chamber for supporting, protecting, insulating and optionally cooking a food product (e.g., pizza). In at least some implementations, the base 302 is formed of a single layer of insulating material and includes an upwardly facing circular-shaped food receiving portion 308 which receives the pizza thereon. The base 302 further includes a raised peripheral rim 310 disposed about a perimeter of the food receiving portion 308. The rim 310 comprises a raised upwardly facing apex surface 312 (FIG. 21) and a downwardly and outwardly extending sidewall 314 which meets with a substantially planar base flange 316 that extends outwardly from the rim. As shown in FIG. 14B, the base flange 316 has a substantially rectangular-shaped (e.g., square) outer perimeter with rounded corners defined by first and second parallel edges 318A and 318B and third and fourth parallel edges 318C and 318D (collectively, "edge(s) 318"). Among other things, the base flange 316 strengthens the rigidity of the base 302.

The food receiving portion 308 of the base 302 includes a planar surface 309 and a number of features which extend at least one of upward or downward from the planar surface 309. In particular, the food receiving portion 308 includes a central well 320 which extends downwardly from the planar surface 309 and receives liquid drippings or condensation from the cooked food (e.g., pizza) placed in the food container 300. In the illustrated implementation, the central well 320 has a circular perimeter, but may have other shapes (e.g., triangle, octagon) in other implementations.

The food receiving portion 308 also includes a plurality of food receiving portion channels or grooves 322 (also referred to herein as "channels") extending downwardly below the planar surface 309 and running radially outward from the central well 320 and terminating at the raised peripheral rim 310. In some implementations, the radial channels 322 may extend only partially between the central well 320 and the raised peripheral rim 310. In the illustrated implementation, each of the channels 322 has a U-shaped cross-sectional profile, but in other implementations the channels may have other shapes (e.g., V-shaped). In some implementations, each channel 322 may slope downward from the rim 310 toward the central well 320 to facilitate the flow of liquid through the channel into the central well. Each pair of adjacent channels 322 and a corresponding portion of the raised peripheral rim 310 delineate a respective sector portion 324 of the food receiving portion 308 which supports a portion of a food item (e.g., an individual slice of pizza). In the illustrated implementation, the base 302 includes eight channels 322 and eight sector portions 324. Generally the base 302 may include N channels and N sector portions, where N is a positive integer.

The plurality of channels 322 are equally radially spaced to enable cutting of the food item (e.g., pizza) into equally sized pieces when a cutting tool (e.g., knife) moves along the channels. Since the channels 322 extended downward from the planar surface 309, a user may cut through the food item over the channels without damaging (e.g., cutting) the food receiving portion 308 of the base 302. Further, each of the channels 322 are non-parallel with each of the edges 318A-318D of the base 302, which improves the rigidity of the base. In the illustrated implementation, each of the channels 322 is offset by 22.5° from perpendicular from a respective one of the edges 318A-318D which the channel extends toward. Further, each of the channels 322 is collinear with an opposite channel that extends radially in the opposite direction. Thus, when the base 304 is to be discarded (e.g., composted), the user may fold the base along an axis which extends through two opposing collinear channels to reduce the dimensions of the base so the base will fit within a compost receptacle.

Among other things, the channels 322 function to strengthen the base 302 in rigidity and provide supporting forces to the food receiving portion 308 when the base is disposed on a resting surface, such as a countertop, oven or another food container. The channels 322 also serve as guides for a cutting tool to cut eight equally sized pieces of a food item (e.g., pizza). Further, the channels 322 provide air space below the food item, which provides additional insulation. In some implementations, because the channels 322 may be substantially covered by the food item placed on the food receiving portion 308, indicia (e.g., visible and/or tactile markings) may be positioned on or adjacent the rim 310 radially in line with the channels to aid the user in cutting the pizza into pieces along the channels.

As discussed above, each pair of adjacent channels 322 and a corresponding portion (e.g., a 45° arc portion) of the raised peripheral rim 310 delineate a respective sector portion 324 of the food receiving portion 308 which receives an individual piece of the food item (e.g., slice of pizza). Each sector portion 324 includes a portion of the planar surface 309 and a raised sector portion rim 326 (FIG. 14B) which extends upward from the planar surface and adjacent each of the channels 322 which define the sector portion. In addition to supporting the food item above the planar surface 309, the raised sector portion rim 326 adjacent the channels 322 may aid in supporting the food item near the cutting location, thereby facilitating the cutting process to provide accurate individual pieces.

Each sector portion 324 further includes a sector well 328 which may receive liquid drippings from the food product therein. In the illustrated implementation, each sector well has a perimeter rim adjacent the planar surface 309 which has an oval profile. In other implementations, each of the perimeter rims may have a profile in the shape of at least one of a circle, a triangle, a square, another shape, or a symbol (e.g., logo). Each sector portion 324 also includes a plurality of raised sector ribs or projections 330 which extend upward from the planar surface 309 around the sector well 328 having an uppermost portion which supports the hot food product (e.g., pizza). In some implementations, the combined area of the ribs 330 in a sector portion 324 is smaller than the portion of the planar surface 309 in the sector portion. Thus, when the food product is supported on the uppermost portions of the ribs 330 and the raised sector portion rim 326, heat loss due to conduction through the planar surface 309 is substantially reduced compared to food containers with flat bottom surfaces which have relatively large surface area contact with the bottom surface of the food product. Additionally, the raised ribs 330 and sector portion rim 326 tend to isolate the bottom surface of the food product from the planar surface 309, which prevents the food product from becoming soggy due to trapped liquid on the planar surface 309 of the food receiving portion 308.

In the illustrated implementations, the shapes of the ribs 330 are elongated and have a length dimension which extends radially with respect to the central well 320. Additionally, in the illustrated implementations the ribs 330 are radially symmetrical. In other implementations, the number, sizes and dimensions of the raised ribs 330 may be different from shown in the figures. The raised ribs 330 also function to improve the rigidity of the base 302.

In some implementations, each of a plurality of features of the base 302 comprising the raised rim 310, the central well 320, the sector wells 328, the channels 322, and the raised sector ribs 330 is spaced apart from at least one other of the plurality of features by a distance which is less than or equal to one inch. In some implementations, due to the aforementioned plurality of features, the food receiving portion 308 of the base 302 does not have a continuously planar surface which exceeds 2 inches by 2 inches. Such features significantly improve the strength of the base 302, while allowing the base to have a length dimension greater than 12 inches (e.g., 16 inches), a width dimension greater than 12 inches (e.g., 16 inches), an overall height which is less than 1.5 inches (e.g., 1 inch), and a material thickness between 0.5 mm and 1.0 mm (e.g., 0.8 mm). In other implementations, the base 302 may have a relatively larger height and the cover 304 may have a relatively smaller height.

The outward facing sidewall 314 of the raised rim 310 of the base 302 includes four cover interface portions 332 spaced 90° apart from each other that extend radially outward from the remainder of the outward facing sidewall 314. As discussed further below, the cover interface portions 332 of the base 302 engage an inwardly and downwardly facing perimeter channel 360 of the cover 304 when the cover is engaged with the base to provide a friction fit between the cover and the base, which retains the cover on the base until removed by a user.

In some implementations, at least some of the central well 320 and the sector wells 328 extend downwardly to a lowermost portion of the base 302 so that they are weight-bearing and function as "feet" which form an insulating air space below the food receiving portion 308 of the base 302 and a resting surface when the base is supported on the resting surface. Thus, the raised ribs 330 of each sector portion, together with at least some of the central well 320 and the sector wells 328, form a layer of air insulation between the planar surface 309 of the food receiving portion 308 and the food product and a layer of air insulation between the food receiving portion and a resting surface using only a single layer of material (i.e., the material which forms the base 302). Additionally, the aforementioned "feet" raise the remainder of the base 302 (and cover 304 when engaged with the base) slightly above a resting surface (e.g., table), which causes a shadow to be cast, similar to a more formal serving plate.

The cover 304 comprises a single layer of thermally insulating material (e.g., molded fiber) and includes a central dome portion 336 comprising a substantially downward facing interior surface 338 (FIG. 15B) and a substantially upward facing exterior surface 340 (FIG. 14B). In at least some implementations, the exterior surface 340 is circular in shape which facilitates printing (e.g., laser printing, pad printing) thereon with text and/or graphics (e.g., logo, image, instructions). As shown in FIG. 14B, the dome portion 336 comprises a raised outer rim 342 spaced radially outward from the center of the dome portion which terminates in a downwardly and outwardly extending sidewall 344. The sidewall 344 meets with a cover flange 346 which extends laterally outwardly therefrom. The cover flange 346 has a substantially circular-shaped outer perimeter and includes tab portion 348A that may align with one of the four corner portions of the base flange 316 when the cover 304 is engaged with the base. The tab portion 348A may be planar in shape or may have a distal portion 348B that extends upward that may be grasped by the user to remove the cover 304 from the base 302 during use. Among other things, the cover flange 346 strengthens the rigidity of the cover 304.

The dome portion 336 further comprises a substantially planar ceiling portion 352 disposed radially inward of the raised outer rim 342. The raised outer rim 342 provides rigidity to the dome portion 336 which, as discussed below, provides support to the ceiling portion 352 and facilitates stacking of multiple containers 300 together. The outer rim 342 of the central dome portion 336 also includes eight spaced apart dome recesses 356 each sized and dimensioned to receive at least a portion of a corresponding sector well 328 of a base 302 of another food container 300 when the other food container is stacked on top of the cover 304 of the food container.

As noted above, the interior surface 338 of the sidewall 344 of the central dome portion 336 has the perimeter channel 360 sized and dimensioned to engage the cover interface portions 332 of the raised perimeter rim 310 of the base 302 when the cover 304 is engaged with the base. In some implementations, the perimeter channel 360 and the cover interface portions 332 of the raised rim 310 are sized and dimension to form a friction or interference fit therebetween when the cover 304 is engaged with the base 302.

The various features of the dome portion 336 provide significant strength which, among other things, allows for stacking multiple food containers 300 together. Specifically, the dome portion 336 includes several curved or cornered portions which together improve the rigidity of the cover 304. For example, the dome portion 336 includes the perimeter channel 360 adjacent the base flange 316, the curved sidewall 344 radially inward of the perimeter channel, the raised outer rim 342 radially inward of the sidewall, and the planar ceiling portion 352 radially inward of the raised inner rim.

As shown in FIG. 14B, in some implementations, the raised rim 310 of the base 302 includes one or more grooves or notches 362 at an intersection of the top surface 312 and the sidewall 314 of the rim 310. Such grooves 362 may function to release the seal between the cover 304 and the base 302 when the user begins to lift the cover from the base prior to the perimeter channel 360 disengaging with the cover interface portions 332 of the raised rim 310. Such feature advantageously makes the cover 304 easier to remove from the base 302 when a user desires to access the food item in the food container 300.

The base 302 and cover 304 of the food container 300 may be nestable with other bases and covers, respectively, with a minimum amount of vertical height (i.e., essentially the thickness of the material for each component). That is, when a first base 302 is stacked on top of a second base, the top surfaces of the features of the lower second base are positioned adjacent the bottom surfaces of corresponding features of the upper first base, with minimal air space therebetween. Similarly, when a first cover 304 is stacked on top of a second cover, the top surfaces of the features of the lower second cover are positioned adjacent the bottom surfaces of corresponding features of the upper first cover. Thus, numerous bases may be stacked together at a height which is much less than the combined height of the individual bases. Similarly, numerous covers may be stacked together at a height which is much less than the combined height of the individual covers. Such nesting feature is advantageous for shipping and for storing the food containers 300 in a small space (e.g., restaurant, vehicle, packaging).

In at least some implementations, the cover 304 may include one or more spaced apart denesting lugs 334 disposed on an inward facing surface 350 of the dome portion 336 spaced radially inward from the raised outer rim 342. The denesting lugs 334 may be spaced apart from each other at uneven intervals around the circumference of inward facing surface 350. The denesting lugs 334 operate to make it easier for a user to separate the covers from one another when stacked. Thus, for example, a manufacturer of the covers may provide a number of the covers stacked together which may be easily separated prior to use. In particular, the denesting lugs 334 provide spacing between two stacked covers 304, which allows for ease in grasping only one of the covers by an individual or a machine. The uneven spacing of the denesting lugs 334 may reduce the likelihood that the denesting lugs of one cover will align with and fit into the denesting lugs of another cover stacked the cover, which would cause the denesting lugs to fail to provide the intended spacing between the two covers.

Figure 22A:
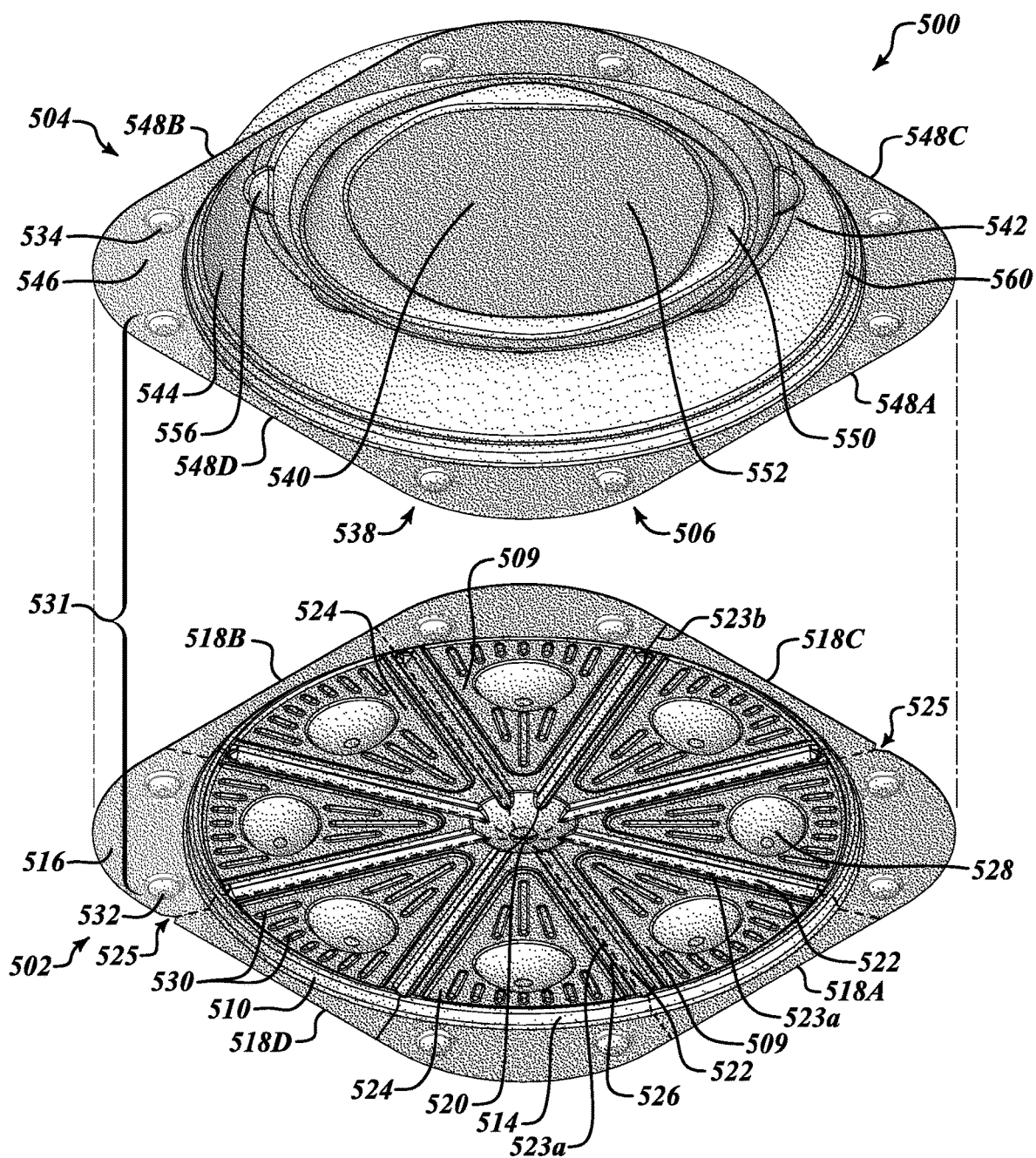
FIG. 22A is a top perspective view of another food container, according to one illustrated implementation.
Figure 22B:
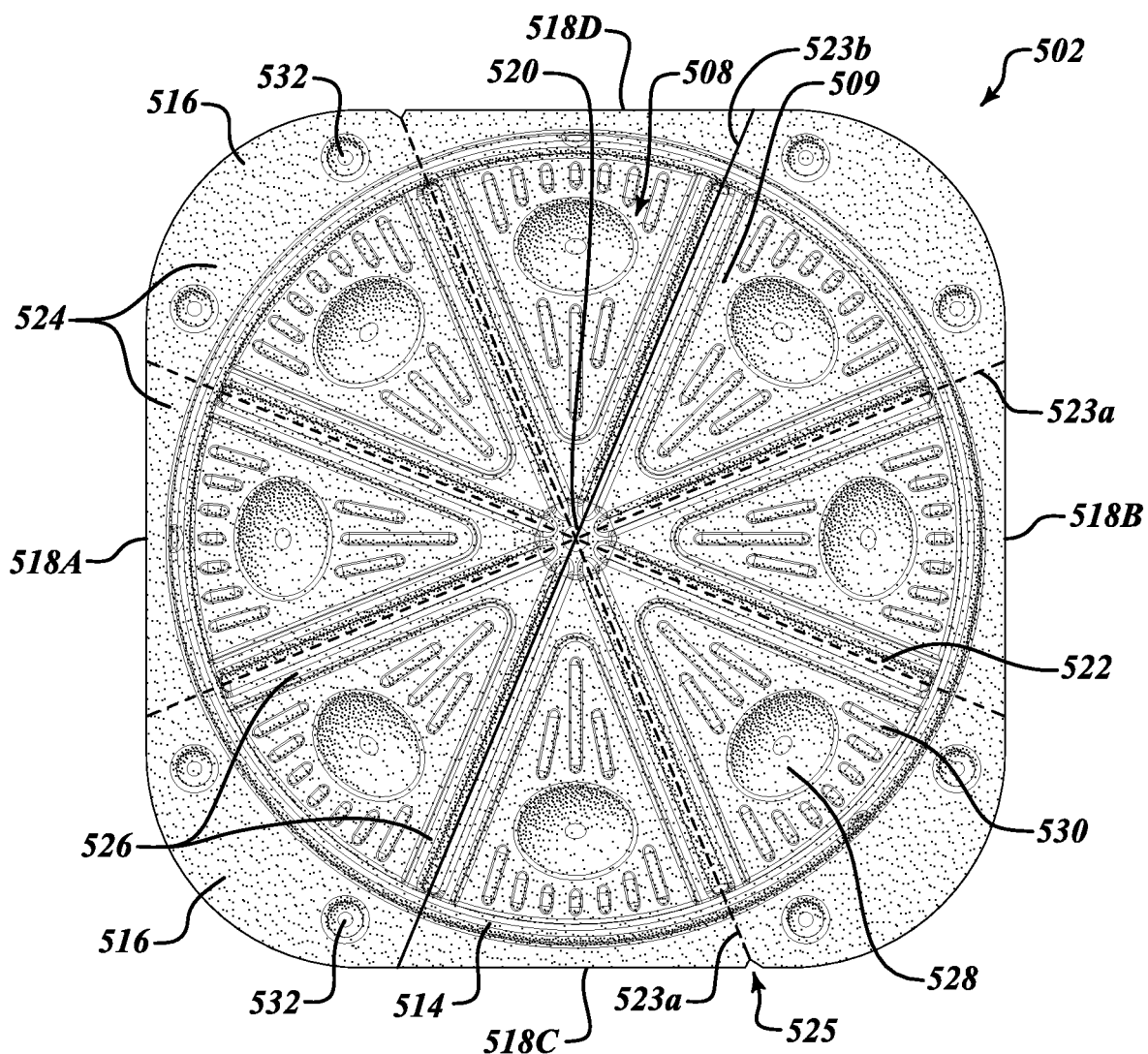
FIG. 22B is a top plan view of a base of the food container of FIG. 22A in which sections of the base are selectively separable from other sections of the base, according to one illustrated implementation.
Figure 22C:
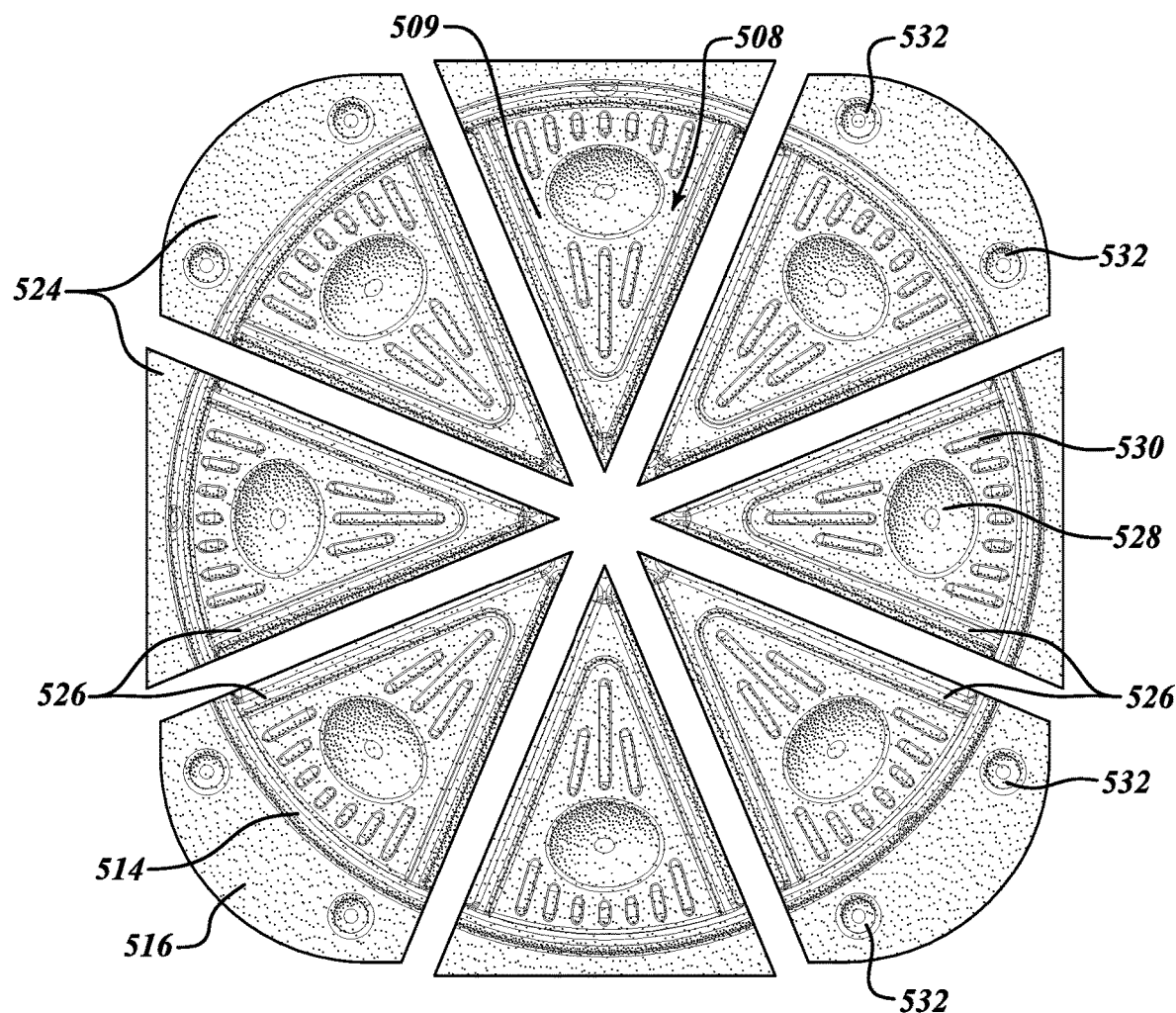
FIG. 22C is a top plan view of the different sections of the base of the food container of FIG. 22A in which the different sections have been broken apart, according to one illustrated implementation.

Referring to FIG. 22A through FIG. 22C, various views of a food container 500 are shown. The food container 500 is illustrated as a container for containing a pizza for explanatory purposes, but it should be appreciated that the present disclosure is not limited to such. As shown in FIG. 22A, the food container 500 includes a base 502 and a separate cover 504 which cooperate as shown in the figures and described below to form a closed interior chamber 506 for supporting, protecting, insulating and optionally cooking a food product (e.g., pizza).

In some implementations, the base 502 and cover 504, as well as other implementations discussed herein, may each be separately formed of a single layer of liquid-resistant insulating material including, but not limited to, molded sugarcane fiber ("bagasse") which has a known ignition temperature of between 537° F. and 681° F., molded wood fiber, molded bamboo fiber, molded paper which has a known ignition temperature of above 450° F. (e.g., 451° F.), plastic (e.g., biodegradable plastic, thermoplastic material, bio-based plastic, recycled plastic, recyclable plastic), synthetic food-safe materials other than plastic. The base 502 and/or the cover 504 may be opaque, semi-transparent, or transparent (e.g., an opaque base made with molded fiber and a cover made with transparent plastic material). This is in contrast to conventional pizza boxes which are made from corrugated cardboard. In implementations wherein the base 502 cover 504 are formed from molded fibers, the single layer of material may have a relatively small thickness of between 0.5 mm and 1.0 mm (e.g., 0.8 mm). In implementations wherein the base 502 and cover 504 are formed from plastic (e.g., polyethylene terephthalate (PET), polylactic acid (PLA)), the single layer of material may have a thickness of 0.5-0.6 mm or less.

In some implementations, the base 502 is formed of a single layer of insulating material and includes an upwardly facing circular-shaped food receiving portion 508 which receives the pizza thereon. The base 502 further includes a raised peripheral rim 510 disposed about a perimeter of the food receiving portion 508. The rim 510 comprises a raised upwardly facing apex surface and a downwardly and outwardly extending sidewall 514 which meets with a substantially planar base flange 516 that extends outwardly from the rim. As shown in FIG. 22B, the base flange 516 has a substantially rectangular-shaped (e.g., square) outer perimeter with rounded corners defined by first and second parallel edges 518A and 518B and third and fourth parallel edges 518C and 518D (collectively, "edge(s) 518"). Among other things, the base flange 516 strengthens the rigidity of the base 502.

The food receiving portion 508 of the base 502 includes a planar surface 509 and a number of features which extend at least one of upward or downward from the planar surface 509. In particular, the food receiving portion 508 includes a central well 520 which extends downwardly from the planar surface 109 and receives liquid drippings or condensation from the cooked food (e.g., pizza) placed in the food container 500. In the illustrated implementation, the central well 520 has a circular perimeter, but may have other shapes (e.g., triangle, octagon) in other implementations.

The food receiving portion 508 also includes a plurality of food receiving portion channels or grooves 522 (also referred to herein as "channels") being recessed downwardly below the planar surface 509 and running across at least a portion of the planar surface 509. In some implementations, the radial channels 522 may extend only partially across the planar surface 509. In the illustrated implementation, each of the channels 522 has a U-shaped cross-sectional profile, but in other implementations the channels may have other shapes (e.g., V-shaped). In some implementations, each channel 522 may slope downward from the rim 510 toward the central well 520 to facilitate the flow of liquid through the channel into the central well.

One or more of the channels 522 may include separation lines 523 that extend partially or completely across the base 502. Each separation line 523 may be used to physically separate the base 502 along the separation line. Such separation may be selectively effected, for example, through a user separating or tearing the base 502 along one of the separation lines 523 running along the channels 522. As shown in FIG. 22B, one or more of the separation lines 523 may extend across the base 502 from one edge 518 of the base 502 through one or more channels 522 to an opposite edge 518 of the base 502. In some implementations, at least some of the separation lines 523 may intersect each other. Each separation line 523 may be used to manually separate the base 502 along the separation line 523, via, for example tearing, without the use of a tool (e.g., scissors, knife). In some implementations, a notch 525 may be cut into the base flange 516 and directed towards the raised peripheral rim 510. The notch 525 may be aligned with one of the separation lines, and as such, may be advantageously manipulable to facilitate tearing or separating the base 502 along the separation line 523.

In some implementations, the separation lines 523 may include a line of perforations 523a. Such perforations 523a may be of any shape (circular, oval, elliptical, rectangular, elongated slits etc.). In some implementations, some or all of the perforations 523a may extend entirely through the base 502. In some implementations, some or all of the perforations 523a may extend only partially through the base 502. In some implementations, the separation lines 523 may be a tear line 523b formed by a groove that forms a continuous recess into at least a portion of the base 502. The tear line 523b may extend from one edge 518 of the base through the food receiving portion 508 of the base 502 and portions of the base flange 516 to an opposite edge 518. The thickness of the base 502 along the tear line 523b may be less than the thickness of other portions of the base 502. For example, the base may be formed of a material having a substantially uniform thickness, except at the separate or tear lines where a thickness is reduced relative to the thickness across the remainder of the base. The separate or tear line may be pre-weakened, that is deliberately weakened (e.g., by repetitive flexing, exposure to chemicals or irradiation via ionizing or non-ionizing (UV, IR) radiation) prior to distribution by the manufacturer to end users or retailers.

As shown in FIG. 22B, a pair of channels 522 and a corresponding portion of the edge(s) 518 may delineate a respective detachable portion 524 of the food receiving portion 508 which supports a portion of a food item (e.g., an individual slice of pizza). In the illustrated implementation, the base 502 includes eight channels 522 that include separation lines 523 and eight detachable portions 524. In some implementations, not all channels 522 include separation lines 523. Generally, for round food objects such as pizza, the base 502 may include N channels having separation lines 523 and N detachable portions, where N is a positive integer. As shown in FIG. 22C, for example, the base 502 from FIG. 22A and FIG. 22B has been separated into eight distinct detachable portions 524 along the separation lines 523 in each of the channels 522. Thus, as shown in FIG. 22C, the detachable portions 524 may be delineated by each of the adjacent channels 522 and the corresponding portion of the edge(s) 518 of the base 502. In some implementations, multiple detachable portions 524 may be separated from the base 502 as one contiguous unit by selectively separating non-adjacent channels 522 and the corresponding portion of the raised rim 514 from the remaining portion of the base 502. In some implementations, separation lines 523 may not be present in all of the channels 522, such that a detachable portion 524 may correspond to a relatively larger portion of the food item, such as a half or a quarter of a pizza.

The plurality of channels 522 are equally radially spaced to enable cutting of the food item (e.g., pizza) into equally sized pieces when a cutting tool (e.g., knife) or apparatus engages with the channels 522. Since the channels 522 are recessed downward from the planar surface 509, for example, a user may cut through the food item over the channels 522 without damaging (e.g., cutting) the food receiving portion 508 of the base 502. Further, each of the channels 522 may be non-parallel with each of the edges 518 of the base 502, which improves the rigidity of the base. In the illustrated implementation, each of the channels 522 is offset by 22.5° from perpendicular from a respective one of the edges 518. Further, each of the channels 522 may be collinear with an opposite channel 522 that extends radially from a center of the food receiving portion 508 of the base 502 in the opposite direction. Thus, when the base 504 is to be discarded (e.g., composted), the user may fold the base along an axis which extends through two opposing collinear channels to reduce the dimensions of the base so the base will fit within a compost receptacle.

Among other things, the channels 522 function to strengthen the base 502 in rigidity and provide supporting forces to the food receiving portion 508 when the base is disposed on a resting surface, such as a countertop, oven or another food container. The channels 522 also serve as guides for a cutting tool or apparatus to cut eight equally sized pieces of a food item (e.g., pizza). Further, the channels 522 provide air space below the food item, which provides additional insulation. In some implementations, because the channels 522 may be substantially covered by the food item placed on the food receiving portion 508, indicia (e.g., visible and/or tactile markings) may be positioned on or adjacent the rim 510 radially in line with the channels 522 to aid the user in cutting the food item into pieces along the channels 522.

As discussed above, a pair of channels 522 that includes separation lines 523 and a corresponding portion (e.g., a 45° arc portion) of the edge(s) 518 delineate a respective detachable portion 524 of the food receiving portion 508 which receives an individual piece of the food item (e.g., slice of pizza). Each detachable portion 524 includes a portion of the planar surface 509 and a raised detachable portion rim 526 which extends upward from the planar surface and adjacent each of the channels 522 which define the detachable portion 524. In addition to supporting the food item above the planar surface 509, the raised detachable portion rim 526 adjacent the channels 522 may aid in supporting the food item near the cutting location, thereby facilitating the cutting process to provide accurate individual pieces.

Each detachable portion 524 further includes a sector well 528 which may receive liquid drippings from the food product therein. In the illustrated implementation, each sector well 528 has a perimeter rim adjacent the planar surface 509 which has an oval profile. In other implementations, each of the perimeter rims may have a profile in the shape of at least one of a circle, a triangle, a square, another shape, or a symbol (e.g., logo). Each detachable portion 524 may also include a plurality of raised sector ribs or projections 530 which extend upward from the planar surface 509 having an uppermost portion which supports the hot food product (e.g., pizza). In some implementations, the combined area of the ribs 530 in a sector portion 524 is smaller than the portion of the planar surface 509 in the sector portion. Thus, when the food product is supported on the uppermost portions of the ribs 530 and the raised detachable portion rim 526, heat loss due to conduction through the planar surface 509 is substantially reduced compared to food containers with flat bottom surfaces which have relatively large surface area contact with the bottom surface of the food product. Additionally, the raised ribs 530 and detachable portion rim 526 tend to isolate the bottom surface of the food product from the planar surface 509, which prevents the food product from becoming soggy due to trapped liquid on the planar surface 509 of the food receiving portion 508.

In the illustrated implementations, the shapes of the ribs 530 are elongated and have a length dimension which extends radially with respect to the central well 520. Additionally, in the illustrated implementations the ribs 530 are radially symmetrical. In other implementations, the number, sizes and dimensions of the raised ribs 530 may be different from shown in the figures. The raised ribs 530 also function to improve the rigidity of the base 502.

In some implementations, each of a plurality of features of the base 502 comprising the raised rim 510, the central well 520, the sector wells 528, the channels 522, and the raised sector ribs 530 is spaced apart from at least one other of the plurality of features by a distance which is less than or equal to one inch. In some implementations, due to the aforementioned plurality of features, the food receiving portion 508 of the base 502 does not have a continuously planar surface which exceeds 2 inches by 2 inches. Such features significantly improve the strength of the base 502, while allowing the base to have a length dimension greater than 12 inches (e.g., 16 inches), a width dimension greater than 12 inches (e.g., 16 inches), an overall height which is less than 1.5 inches (e.g., 1 inch), and a material thickness between 0.5 mm and 1.0 mm (e.g., 0.8 mm). In other implementations, the base 502 may have a relatively larger height and the cover 504 may have a relatively smaller height.

The base flange 516 which extends around the raised rim 510 includes eight fastening recesses or seats 532 that extend downwardly from the base flange. As discussed below, each of the fastening recesses 532 of the base 502 receives a corresponding one of a plurality of downwardly extending fastening protrusions 534 of the cover 504 to selectively retain the cover on the base 502. The fastening recesses 532 are generally dome-shaped in the illustrated implementations, but may be other shapes and sizes in other implementations. Further, other implementations may include more fastening recesses, fewer fastening recesses, or no fastening recesses.

In some implementations, at least some of the fastening recesses 532, the central well 520, and the sector wells 528 extend downwardly to a lowermost portion of the base 502 so that they are weight-bearing and function as "feet" which form an insulating air space below the food receiving portion 508 of the base 502 and a resting surface when the base is supported on the resting surface. The base 502 may include additional "feet" that extend downwardly and are spaced along the base 502 such that each detachable portion 524 may steadily rest upon a resting surface. Thus, the raised ribs 530 of each sector portion, together with at least some of the fastening recesses 532, the central well 520, and the sector wells 528, form a layer of air insulation between the planar surface 509 of the food receiving portion 508 and the food product and a layer of air insulation between the food receiving portion and a resting surface using only a single layer of material (i.e., the material which forms the base 502). Additionally, the aforementioned "feet" raise the remainder of the base 502 (and cover 504 when engaged with the base) slightly above a resting surface (e.g., table), which causes a shadow to be cast, similar to a more formal serving plate.

The cover 504 comprises a single layer of thermally insulating material (e.g., molded fiber) and includes a substantially downward facing interior surface 538 and a substantially upward facing exterior surface 540. As shown in FIG. 22A, the cover 504 comprises a raised outer rim 542 spaced radially outward from the center of the cover portion which terminates in a downwardly and outwardly extending sidewall 544. The sidewall 544 meets with a substantially planar cover flange 546 which extends laterally outwardly therefrom. Similar to the base flange 516, the cover flange 546 has a substantially rectangular-shaped outer perimeter with rounded corners defined by first and second parallel edges 548A and 548B and third and fourth parallel edges 548C and 548D. Among other things, the cover flange 546 strengthens the rigidity of the cover 504.

The cover flange 546 also includes eight integrally formed fastening protrusions 534 which extend downwardly from the cover flange. The fastening protrusions 534 are generally dome-shaped in the illustrated implementations, but may be other shapes and sizes in other implementations. Further, other implementations may include more fastening protrusions, fewer fastening protrusions, or no fastening protrusions. As shown in FIG. 22A, each of the fastening protrusions 534 of the cover flange 546 is vertically aligned with one of the integrally formed fastening recesses 532 of the base flange 516 to form a fastener 531. In operation, each fastening recess 532 may receive a corresponding fastening protrusion 534 when the cover 504 is placed on the base 502. Among other things, such fasteners 531 may restrict lateral or rotational movement of the cover 504 relative to the base 502 which maintains the alignment of the cover relative to the base. In some implementations, each fastening recess 532 may be sized and dimensioned to receive a corresponding fastening protrusion 534 responsive to an external force pushing the fastening recess and the fastening protrusion together when the cover 504 is placed on the base 502, forming an interference or press fit. In such implementations, upon receiving a fastening protrusion 534, a fastening recess 532 may generate a fastening force which facilitates holding the cover 504 in a closed configuration on the base 502. Such fastening force resists external forces applied to the container 500 so that the container remains closed throughout storage, transportation or any other function of the container. The interior surface 538 of the cover 504 and one or more of the detachable portions 524 of the food receiving portion 508 of the base 502 may delineate the interior chamber 506 for containing a food item.

In some implementations, the base flange 516 may include a number of fastening protrusions that extend upwardly from the base flange, and the cover flange 546 may include a corresponding number of fastening recesses that extend upwardly from the cover flange. In such implementations, the fastening recesses of the cover 504 may receive the fastening protrusions of the base 502.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible make such an undercut design, and therefore it is typically accepted that a molded pulp package cannot have any locking design with an audible snap function. However, in some implementations of the present disclosure, due to the combination of dimension of the interference, the angle, and the thickness of the base 502 and cover 504, the fastening mechanisms provide an unexpected performance with an audible cue (e.g., "snap") when the fastening protrusions are disengaged from the corresponding fastening recesses. In some implementations, this audible cue may be produced more than once (e.g., each time a fastening protrusion is disengaged from a fastening recess). In some implementations, each of the fastening recesses has a depth that is greater than 5 millimeters and a diameter that is greater than 8 millimeters, and each of the fastening protrusions has a depth which is 1 millimeter less than the depth of the fastening recesses, and a diameter which is 1 millimeter greater than the diameter of the fastening recesses.

The cover 504 further comprises an irregularly-shaped raised inner rim 550 disposed radially inward of the raised outer rim 542, and a substantially planar ceiling portion 552 disposed inward of the raised inner rim. In some implementations, the raised inner rim 550 has a radially asymmetric profile. A downwardly extending cover portion channel or groove 554 is positioned radially between the raised outer rim 542 and the raised inner rim 550. The shapes and dimensions of the raised outer rim 542, the cover portion channel 554 and the raised inner rim 550 may be different in other implementations. The raised outer rim 542, the cover portion channel 554 and the raised inner rim 550 together provide rigidity to the cover 504, which, as discussed below, provides support to the ceiling portion 552 and facilitates stacking of multiple containers 500 together. In the illustrated example, the raised inner rim 550 is lower in height than the raised outer rim 542, but in other implementations the height of the inner rim may be equal to or greater than the outer rim. As discussed above with reference to FIGS. 11A-11C, the outer rim 542 of the cover 504 also includes eight spaced apart recesses 556 each sized and dimensioned to receive at least a portion of a corresponding sector well 528 of a base 502 of another food container 500 when the other food container is stacked on top of the cover 504 of the food container.

Among other things, the shapes of the sidewall 544, raised outer rim 542, cover portion channel 554, and raised inner rim 550 function to improve the rigidity of the cover 504, and serve to distribute supporting forces when an object (e.g., one or more other food containers) is stacked on the cover 104. Further, the shape of the interior surface 138 of the cover 504 and/or the texture (e.g., rough texture) of the interior surface may tend to absorb or retain moisture (e.g., condensation) which reduces the amount of moisture that returns to the hot food item (e.g., pizza) which could cause quality deterioration of the food item. Additionally, the generally round shape of the cover 504 which corresponds to a round food item (e.g., pizza) provides a reduced surface area for heat transfer compared to a conventional square pizza box, thus prolonging the duration that the food item maintains an elevated temperature. In other implementations, the central dome portion 136 may be sized and/or dimensioned differently than shown in the illustrated implementations.

The interior surface of the sidewall 544 of the cover 504 has an inwardly and downwardly facing perimeter channel 560 sized and dimensioned to form engage the raised perimeter rim 510 of the base 502 when the cover 504 is engaged with the base 502. When the cover 504 is engaged with the base 502, the perimeter channel 560 of the sidewall 544 of the cover contacts the sidewall 514 of the raised rim 510 of the base 502 to form a "seal" which may limit or even prevent the flow of air into or out of the sealed food container 500. In some implementations, the perimeter channel 560 and the raised rim 510 are sized and dimension to form an interference or press fit therebetween when the cover 504 is engaged with the base 502.

When the cover 504 is engaged with the base 502, the base flange 516 and cover flange 546 are also in contact and fastened by the fasteners 531 which, as noted above, serve to restrict lateral or rotational motion between the cover and the base, to add strength to the assembled food container 500, and to limit of airflow into the sealed food container 500. As discussed above, in some implementations the fasteners 531 may form an interference or press fit between each pair of protrusions 534 and recesses 532 of the cover 504 and base 502, respectively. In such implementations, the fasteners 531 also function to retain the cover 504 on the base 502.

In the illustrated implementation, the outer dimensions of the base 502 and the cover 504 are substantially matched which aids the user in aligning the cover 504 when placing the cover onto the base during use, particularly when the cover is not joined to the base via a hinge (e.g., flexible joint). In some implementations, due to various symmetries of the base 502 and the cover 504, the cover may be secured to the base at any of four relative rotational angles (e.g., 0°, 90°, 180°, and) 270° relative to the base. That is, the edge 548A (FIG. 1B) of the cover 504 may be vertically aligned with any of the edges 518A-518D of the base 502. To remove the cover 504 from the base 502, the user may lift the cover relative to the base with sufficient force to overcome the "seal" between the perimeter channel 560 of the cover 504 and the rim 510 of the base 502 and, in implementations where the fasteners 531 are secured by interference or press fits, sufficient force to overcome the fastening forces of the respective fasteners 531.

The cover 504 and separable base 502 may conveniently be used to transport a large, hot, prepared food item (e.g., an extra-large baked pizza) between a pick-up location to a location of consumption while maintaining the food item at a desired temperature for consumption. Once the food item is at the location of consumption, one or more of the detachable portions 524 of the base 502 may be separated to provide an eating surface, similar to a plate, for supporting a portion of the food item that is being consumed. In some implementations, multiple contiguous detachable portions 524 may be separated from the base 502 as a continuous unit to support a larger portion of the food item, such as a half or a quarter of a pizza. The various portions, for example, may be spread across a counter, a table, or some other serving surface to provide multiple locations where people can retrieve a portion of the food item.

Figure 23:
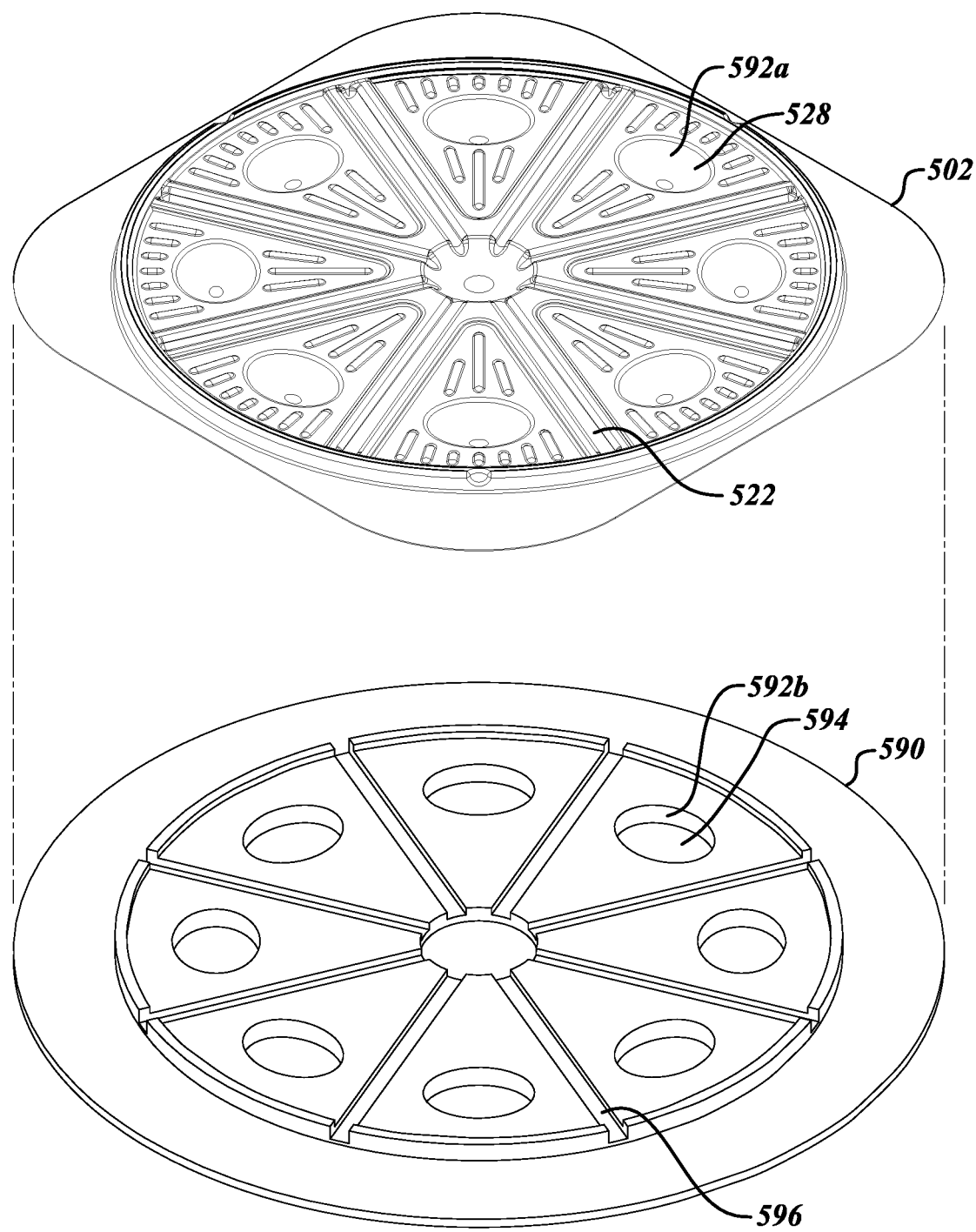
FIG. 23 is a top perspective view of the cover of a food container and a corresponding platen, according to one illustrated implementation.

FIG. 23 shows a base 502 and a corresponding platen 590 in which the base 502 may be placed on the platen 590 for processing by a machine or device, such as a cutting tool, according to one illustrated implementations. The base 502 may include one or more registration features 592a that may be selectively, physically engaged with corresponding registration features 592b in the platen 590. As shown in FIG. 23, the registration features 592 may include one or more of the sector wells 528 within the base 502, and one or more corresponding apertures 594 within the platen 590 in which the apertures 594 are sized and dimensioned to receive a bottom portion of the sector wells 528. Additionally or alternatively, the platen 590 may also include one or more platen channels 596 that correspond to the channels 522 in the base 502. Accordingly, when the base 502 is aligned with and resting on the platen 590, at least a portion of the sector wells 528 may descend into and be engaged by the apertures 594 in the platen 590. Additionally or alternatively, in some implementations, at least some of the channels 522 in the base 502 may be engaged by the platen channels 596. Such engagement by the apertures 594 and/or the platen channels 596 may prevent the base 502 from moving when the device or machine is processing the food item support by the food receiving portion 508 on the base 502.

Other types of registration features besides the sector wells 528 and apertures 594, and the channels 522 and platen channels 596 may be used to align and engage the base 502 on the platen 590. For example, instead of using the sector wells 528, the base 502 may include one or more tabs or other protrusions that may be vertically aligned and engage with one or more apertures on the platen 590. In some implementations, the platen 590 may have registration features 592b that include one or more protrusions or raised portions that extend upward from a face of the platen 590. Such protrusions may be vertically aligned with corresponding registration features 592a on the base 502 that may include one or more recessed areas or apertures on the base. In such an implementation, each protrusion on the platen 590 may be sized and shaped to securely engage with the corresponding aperture or raised portion on the base 502.

Figure 24A:
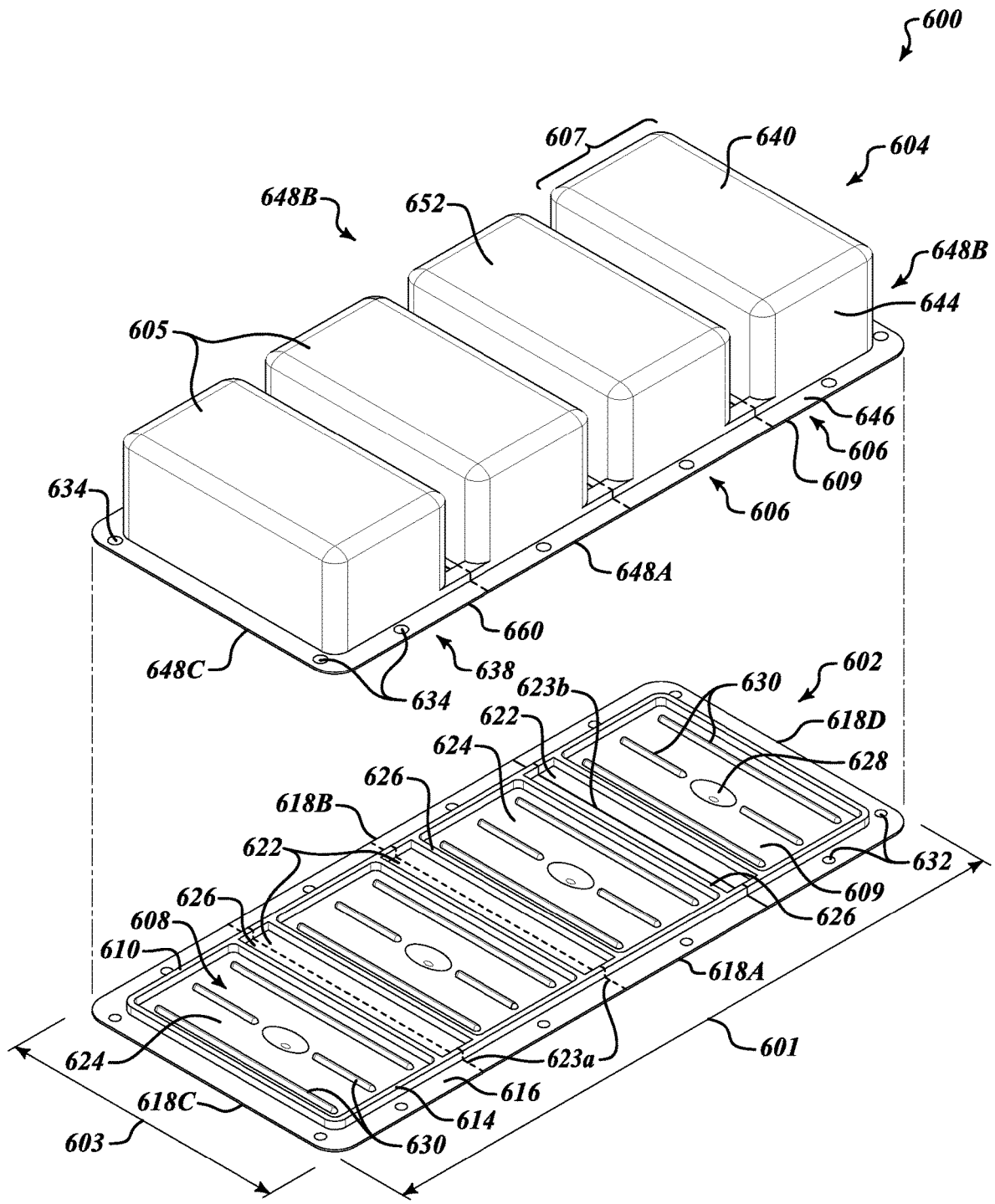
FIG. 24A is a top perspective view of a rectangular food container, according to one illustrated implementation.
Figure 24B:
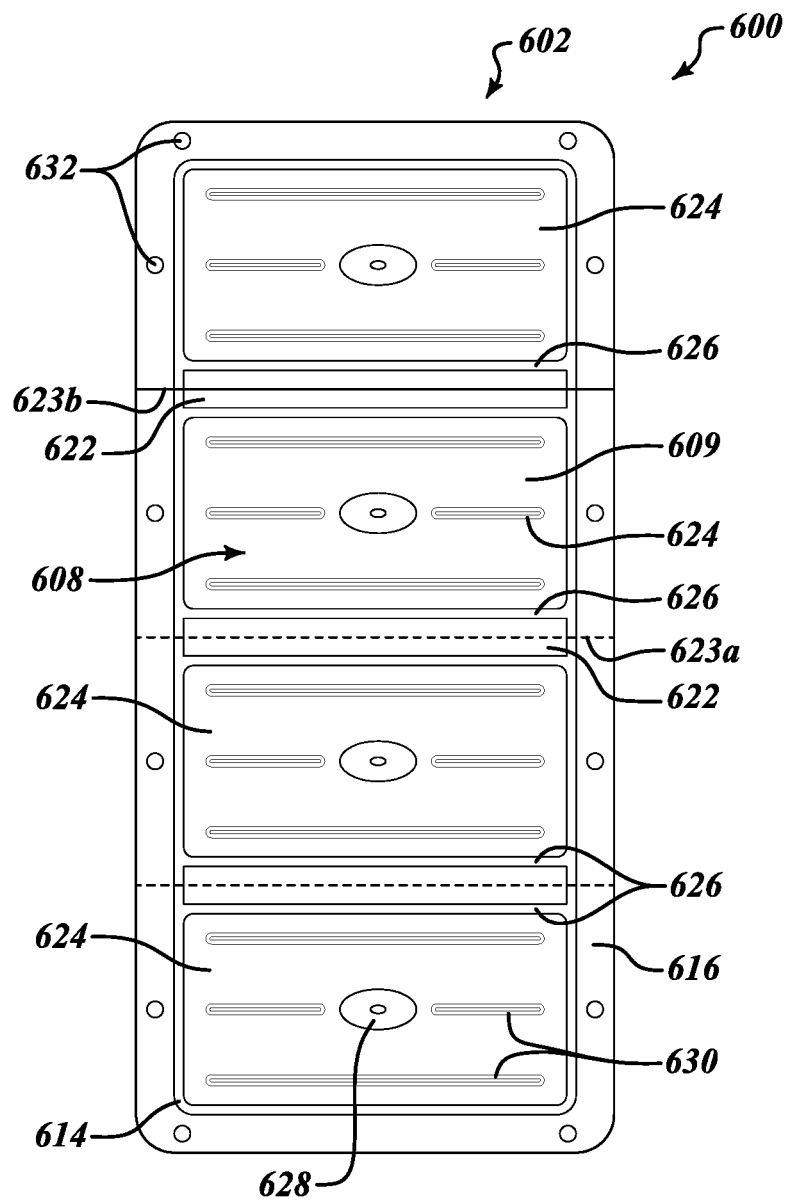
FIG. 24B is a top plan view of a base of the rectangular food container of FIG. 24A in which sections of the base are selectively separable from other sections of the base, according to one illustrated implementation.
Figure 24C:
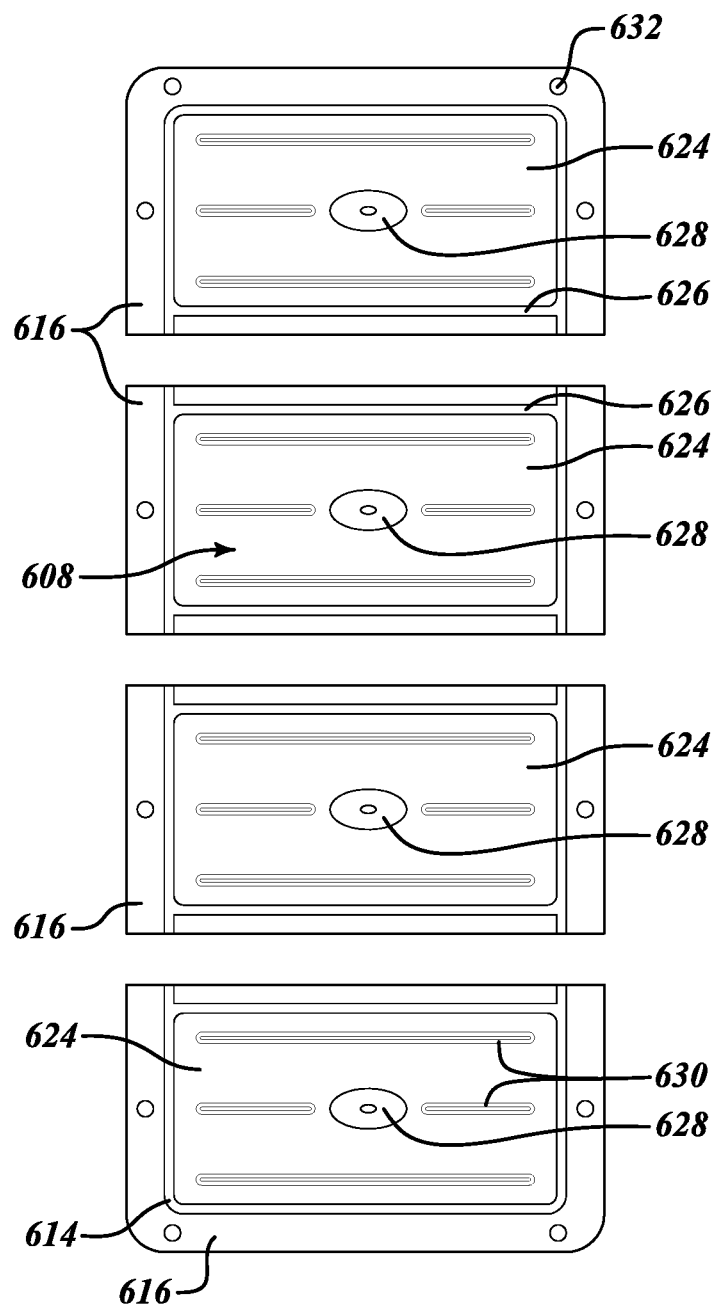
FIG. 24C is a top plan view of the different sections of the base of the rectangular food container of FIG. 24A in which the different sections have been broken apart, according to one illustrated implementation.

FIGS. 24A through 24C show portions of a rectangular food container 600, including a base 602 and a separate cover 604, which cooperate as shown in the figures and described below to form a number of closed interior chambers 606 for supporting, protecting, insulating and optionally cooking a food product (e.g., sandwiches). The rectangular food container 600 may have a length 601 and a width 603.

In at least some implementations, the base 602 and cover 604 may each be separately formed of a single layer of liquid-resistant insulating material including, but not limited to, molded sugarcane fiber ("bagasse"), molded wood fiber, molded bamboo fiber, molded paper, plastic (e.g., biodegradable plastic, thermoplastic material, bio-based plastic, recycled plastic, recyclable plastic), or synthetic food-safe materials other than plastic. The base 602 and/or the cover 604 may be opaque, semi-transparent, or transparent (e.g., an opaque base made with molded fiber and a cover made with transparent plastic material). In implementations wherein the base 602 cover 604 are formed from molded fibers, the single layer of material may have a relatively small thickness of between 0.5 mm and 1.0 mm (e.g., 0.8 mm). In implementations wherein the base 602 and cover 604 are formed from plastic (e.g., polyethylene terephthalate (PET), polylactic acid (PLA)), the single layer of material may have a thickness of 0.5-0.6 mm or less.

In some implementations, the base 602 is formed of a single layer of insulating material and includes an upwardly facing rectangular-shaped food receiving portion 608 which receives a portion of the food item (e.g., sandwich, bread) thereon. The base 602 further includes a raised peripheral rim 610 disposed about a perimeter of the food receiving portion 608. The rim 610 comprises a raised upwardly facing apex surface and a downwardly and outwardly extending sidewall 614 which meets with a substantially planar base flange 616 that extends outwardly from the rim. As shown in FIG. 24A, the base flange 616 has a substantially rectangular-shaped outer perimeter with rounded corners defined by first and second parallel edges 618A and 618B and third and fourth parallel edges 618C and 618D (collectively, "edges 618"). Among other things, the base flange 616 strengthens the rigidity of the base 602.

The food receiving portion 608 of the base 602 includes a planar surface 609 and a number of features which extend at least one of upward or downward from the planar surface 609. In particular, the food receiving portion 608 includes a sector well 628 which extends downwardly from the planar surface 609 and receives liquid drippings or condensation from the cooked food (e.g., sandwich) placed in the rectangular food container 600. In the illustrated implementation, the central well 620 has an oval perimeter, but may have other shapes (e.g., circle, triangle, octagon, design) in other implementations.

The food receiving portion 608 also includes a plurality of food receiving portion channels or grooves 622 (also referred to herein as "channels") being recessed downwardly below the planar surface 609 and running across at least a portion of the planar surface 609. In some implementations, the channels 622 may extend only partially across the planar surface 609. In the illustrated implementation, each of the channels 622 has an open-ended rectangular-shaped cross-sectional profile, but in other implementations the channels may have other shapes (e.g., U-shaped, V-shaped). One or more of the channels 622 may include separation lines 623 (e.g., perforations 623a and/or tear lines 623b) that extend partially or fully through the base 602. Each separation line 623 may be used to create a physical separation in the base 602. Such separation may be selectively effected, for example, through a user selectively separating or tearing the base 602 along one of the separation lines 623 running along the channels 622. As shown in FIG. 24A, one or more of the separation lines 623 may extend across the base 602 from one edge 618 (e.g., edge 618A) of the base 602 through one or more channels 622 to an opposite edge 618 (e.g., edge 618B) of the base 602. In some implementations, at least two of the separation lines 623 may intersect each other.

As shown in FIG. 24A, one or more channels 622 and corresponding portions of the edge(s) 618 may delineate a respective detachable portion 624 of the food receiving portion 608 which supports a portion of a food item (e.g., a portion of a sandwich). In the illustrated implementation, the base 602 includes three channels 622 that include separation lines 623 and four detachable portions 624. In some implementations, not all channels 622 include separation lines 623. For rectangular food objects such as sandwiches on bread loaves, the base 602 may include N channels having separation lines and N+1 detachable portions, where N is a positive integer. As shown in FIG. 24C, for example, the base 602 from FIG. 24A and FIG. 24B has been separated into four distinct detachable portions 624 along the separation lines 623 in each of the channels 622. Thus, as shown in FIG. 24C, the detachable portions 624 may be delineated by each of the adjacent channels 622 and the corresponding portions of the edge(s) 618 of the base 602. In some implementations, multiple detachable portions 624 may be separated from the base 602 as one contiguous unit by selectively separating non-adjacent channels 622 and the corresponding portions of the raised rim 614 from the remaining portion of the base 602. In some implementations, separation lines 623 may not be present in all of the channels 622, such that a detachable portion 624 may correspond to a relatively larger portion of the food item, such as a half or a quarter of a sandwich.

The plurality of channels 622 may be equally spaced along the length 601 of the base 602 to enable cutting of the food item (e.g., sandwich) into equally sized pieces when a cutting tool (e.g., knife) or apparatus engages with the channels 622. In some implementations, the plurality of channels 622 need not be equally spaced, but may have variable spacing. As shown in FIG. 24A, the channels 622 may be parallel to one set of edges (e.g., 618C, 618C). In some implementations, the channels 622 are not parallel to either set of edges 618, and may be used, for example, to store a sandwich or other food item that has been cut using an angled (i.e., non-perpendicular) cut. Because the channels 622 are recessed downward from the planar surface 609, for example, a user may cut through the food item over the channels 622 without damaging (e.g., cutting) the food receiving portion 608 of the base 602. Further, the channels 622 provide air space below the food item, which provides additional insulation. In some implementations, because the channels 622 may be substantially covered by the food item placed on the food receiving portion 608, indicia (e.g., visible and/or tactile markings) may be positioned on or adjacent the rim 610 in line with the channels 622 to aid the user in cutting the food item into pieces along the channels 622.

As discussed above, one or more channels 622 that include separation lines 623 and a corresponding portion of the edge(s) 618 delineate a respective detachable portion 624 of the food receiving portion 608 which receives an individual piece of the food item (e.g., portion of sandwich). Each detachable portion 624 includes a portion of the planar surface 609 and a raised detachable portion rim 626 which extends upward from the planar surface and adjacent each of the channels 622 which define the detachable portion 624. In addition to supporting the food item above the planar surface 609, the raised detachable portion rim 626 adjacent the channels 622 may aid in supporting the food item near the cutting location, thereby facilitating the cutting process to provide accurate individual pieces.

Each detachable portion 624 further includes a sector well 628 which may receive liquid drippings from the food product therein. In the illustrated implementation, each sector well 628 has a perimeter rim adjacent the planar surface 609 which has an oval profile. In other implementations, each of the perimeter rims may have a profile in the shape of at least one of a circle, a triangle, a square, another shape, or a symbol (e.g., logo). Each detachable portion 624 may also include a plurality of raised sector ribs or projections 630 which extend upward from the planar surface 609 having an uppermost portion which supports the hot food product (e.g., sandwich). In some implementations, the combined area of the ribs 630 in a sector portion 624 is smaller than the portion of the planar surface 609 in the sector portion. Thus, when the food product is supported on the uppermost portions of the ribs 630 and the raised detachable portion rim 626, heat loss due to conduction through the planar surface 609 is substantially reduced compared to food containers with flat bottom surfaces which have relatively large surface area contact with the bottom surface of the food product. Additionally, the raised ribs 630 and detachable portion rim 626 tend to isolate the bottom surface of the food product from the planar surface 609, which prevents the food product from becoming soggy due to trapped liquid on the planar surface 609 of the food receiving portion 608.

In the illustrated implementations, the shapes of the ribs 630 are elongated and have a length dimension which extends along the width 603 of the base 602. Additionally, in the illustrated implementations the ribs 630 are parallel. In other implementations, the number, sizes, orientations and dimensions of the raised ribs 630 may be different from shown in the figures. The raised ribs 630 may also function to improve the rigidity of the base 602.

In some implementations, each of a plurality of features of the base 602 comprising the raised rim 610, the sector wells 628, the channels 622, and the raised sector ribs 630 is spaced apart from at least one other of the plurality of features by a distance which is less than or equal to one inch. In some implementations, due to the aforementioned plurality of features, the food receiving portion 608 of the base 602 does not have a continuously planar surface which exceeds 2 inches by 2 inches. Such features significantly improve the strength of the base 602, while allowing the base to have a length dimension greater than 12 inches (e.g., 16 inches), a width dimension greater than 6 inches (e.g., 10 inches), an overall height which is less than 1.5 inches (e.g., 1 inch), and a material thickness between 0.5 mm and 1.0 mm (e.g., 0.8 mm). In other implementations, the base 602 may have a relatively larger height and the cover 604 may have a relatively smaller height.

The optional base flange 616 which extends around the raised rim 610 includes twelve fastening recesses or seats 632 that extend downwardly from the base flange. As discussed below, each of the fastening recesses 632 of the base 602 receives a corresponding one of a plurality of downwardly extending fastening protrusions 634 of the cover 604 to selectively retain the cover on the base 602. The fastening recesses 632 are generally dome-shaped in the illustrated implementations, but may be other shapes and sizes in other implementations. Further, other implementations may include more fastening recesses, fewer fastening recesses, or no fastening recesses.

In some implementations, at least some of the fastening recesses 632 and the sector wells 628 extend downwardly to a lowermost portion of the base 602 so that they are weight-bearing and function as "feet" which form an insulating air space below the food receiving portion 608 of the base 602 and a resting surface when the base is supported on the resting surface. The base 602 may include additional "feet" that extend downwardly and are spaced along the base 602 such that each detachable portion 624 may steadily rest upon a resting surface. Thus, the raised ribs 630 of each sector portion, together with at least some of the fastening recesses 632, and the sector wells 628, form a layer of air insulation between the planar surface 609 of the food receiving portion 608 and the food product and a layer of air insulation between the food receiving portion and a resting surface using only a single layer of material (i.e., the material which forms the base 602). Additionally, the aforementioned "feet" raise the remainder of the base 602 (and cover 604 when engaged with the base) slightly above a resting surface (e.g., table), which causes a shadow to be cast, similar to a more formal serving plate.

The sector wells 628, or other features, may be used as a registration feature for aligning and securing the rectangular food container 600 on, for example, a platen or other processing surface, as discussed above with respect to FIG. 23.

The cover 604 comprises a single layer of thermally insulating material (e.g., molded fiber) and includes a substantially downward facing interior surface 638 and a substantially upward facing exterior surface 640. As shown in FIG. 24A, the cover 604 comprises one or more dome portions 605 that may include a top planar surface 652 and one or more sidewalls 644. The sidewalls 644 meet with a substantially planar cover flange 646 which extends laterally outwardly therefrom. Similar to the base flange 616, the cover flange 646 has a substantially rectangular-shaped outer perimeter with rounded corners defined by first and second parallel edges 648A and 648B and third and fourth parallel edges 648C and 648D (collectively, "edges 648"). Among other things, the cover flange 646 strengthens the rigidity of the cover 604.

In some implementation, at least a portion of the interior surface 638 of a dome portion 605 and a food receiving portion 608 of the base 602 may delineate an interior chamber 606 to receive food items. Each of the interior chambers 606 may be vertically aligned with a corresponding detachable portion 624 in the base 602 when the cover 604 is engaged with the base 602. Thus, in such implementations in which the base 602 includes N number of detachable portions 624, the cover 604 may include a corresponding N number of interior chambers 606, where N is a positive integer. In some implementations, the cover 604 may include one or more detachable cover portions 607, formed by one or more separation lines 611 that extend across, for example, the width 603 of the cover 604. Each of the detachable cover portions 607 may be delineated by one or more separation lines 611 and portions of one or more edges 618 of the cover 604. Each detachable cover portion 607 may be selectively separable from the remaining detachable cover portions 607 of the cover 604.

The cover flange 646 may include twelve integrally formed fastening protrusions 634 which extend downwardly from the cover flange. The fastening protrusions 634 are generally dome-shaped in the illustrated implementations, but may be other shapes and sizes in other implementations. Further, other implementations may include more fastening protrusions, fewer fastening protrusions, or no fastening protrusions. As shown in FIG. 24A, each of the fastening protrusions 634 of the cover flange 646 is vertically aligned with one of the integrally formed fastening recesses 632 of the base flange 616 to form a fastener 631. In operation, each fastening recess 632 may receive a corresponding fastening protrusion 634 when the cover 604 is placed on the base 602. Among other things, such fasteners 631 may restrict lateral movement of the cover 604 relative to the base 602 which maintains the alignment of the cover relative to the base. In some implementations, each fastening recess 632 may be sized and dimensioned to receive a corresponding fastening protrusion 634 responsive to an external force pushing the fastening recess and the fastening protrusion together when the cover 604 is placed on the base 602, forming an interference or press fit. In such implementations, upon receiving a fastening protrusion 634, a fastening recess 632 may generate a fastening force which facilitates holding the cover 604 in a closed configuration on the base 602. Such fastening force resists external forces applied to the rectangular food container 600 so that the container remains closed throughout storage, transportation or any other function of the container. The interior surface 638 of the cover 604 and one or more of the detachable portions 624 of the food receiving portion 608 of the base 602 may delineate the interior chamber 606 for containing a food item.

In some implementations, the base flange 616 may include a number of fastening protrusions that extend upwardly from the base flange, and the cover flange 646 may include a corresponding number of fastening recesses that extend upwardly from the cover flange. In such implementations, the fastening recesses of the cover 604 may receive the fastening protrusions of the base 602.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible make such an undercut design, and therefore it is typically accepted that a molded pulp package cannot have any locking design with an audible snap function. However, in some implementations of the present disclosure, due to the combination of dimension of the interference, the angle, and the thickness of the base 602 and cover 604, the fastening mechanisms provide an unexpected performance with an audible cue (e.g., "snap") when the fastening protrusions are disengaged from the corresponding fastening recesses. In some implementations, this audible cue may be produced more than once (e.g., each time a fastening protrusion is disengaged from a fastening recess). In some implementations, each of the fastening recesses has a depth that is greater than 5 millimeters and a diameter that is greater than 8 millimeters, and each of the fastening protrusions has a depth which is 1 millimeter less than the depth of the fastening recesses, and a diameter which is 1 millimeter greater than the diameter of the fastening recesses. As described above, the dome portions 605 of the cover 604 may further comprise one or more substantially planar ceiling portions. The shape of the interior surface 638 of the cover 604 and/or the texture (e.g., rough texture) of the interior surface 638 may tend to absorb or retain moisture (e.g., condensation) which reduces the amount of moisture that returns to the hot food item (e.g., pizza) which could cause quality deterioration of the food item.

The interior surface of the sidewall 644 of the cover 604 has an inwardly and downwardly facing perimeter channel 660 sized and dimensioned to form engage the raised perimeter rim 610 of the base 602 when the cover 604 is engaged with the base 602. When the cover 604 is engaged with the base 602, the perimeter channel 660 of the sidewall 644 of the cover contacts the sidewall 614 of the raised rim 610 of the base 602 to form a "seal" which may limit or even prevent the flow of air into or out of the sealed rectangular food container 600. In some implementations, the perimeter channel 660 and the raised rim 610 are sized and dimension to form an interference or press fit therebetween when the cover 604 is engaged with the base 602.

When the cover 604 is engaged with the base 602, the base flange 616 and cover flange 646 are also in contact and fastened by the fasteners 631 which serve to restrict motion between the cover and the base, to add strength to the assembled rectangular food container 600, and to limit of airflow into the sealed rectangular food container 600. As discussed above, in some implementations the fasteners 631 may form an interference or press fit between each pair of protrusions 634 and recesses 632 of the cover 604 and base 602, respectively. In such implementations, the fasteners 631 also function to retain the cover 604 on the base 602.

In the illustrated implementation, the outer dimensions of the base 602 and the cover 604 are substantially matched which aids the user in aligning the cover 604 when placing the cover onto the base during use, particularly when the cover is not joined to the base via a hinge (e.g., flexible joint). In some implementations, due to various symmetries of the base 602 and the cover 604, the cover may be secured to the base at any of two relative rotational angles (e.g., 0° and) 180° relative to the base. That is, the edge 648A (FIG. 24A) of the cover 604 may be vertically aligned with any of the edges 618A-618B of the base 602. To remove the cover 604 from the base 602, the user may lift the cover relative to the base with sufficient force to overcome the "seal" between the perimeter channel 660 of the cover 604 and the rim 610 of the base 602 and, in implementations where the fasteners 631 are secured by interference or press fits, sufficient force to overcome the fastening forces of the respective fasteners 631.

The cover 604 and separable base 602 may conveniently be used to transport a large, hot, prepared food item (e.g., a submarine-style sandwich) between a pick-up location to a consumption location while maintaining the food item at a desired temperature for consumption. Once the food item is at the point of consumption, one or more of the detachable portions 624 of the base 602 may be separated to provide an eating surface, similar to a plate, for supporting a portion of the food item that is being consumed. In some implementations, multiple contiguous detachable portions 624 may be separated from the base 602 as a continuous unit to support a larger portion of the food item, such as a half or a quarter of a sandwich. The various portions, for example, may be spread across a counter, a table, or some other serving surface to provide multiple locations where people can retrieve a portion of the food item.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

To the extent that they are not inconsistent with the specific teachings and definitions herein, all of the US patents, US patent application publications, US patent applications, referred to in this specification and/or listed in the Application Data Sheet, including but not limited to U.S. Patent Application Ser. No. 62/311,787, filed Mar. 22, 2016, and U.S. Patent Application Ser. No. 62/529,933, filed Jul. 7, 2017 are incorporated herein by reference in their entirety.

The invention claimed is:

1. A food container comprising:
   a base having at least one edge, the base comprising a raised rim disposed about a perimeter of an upwardly facing food receiving portion which receives a food product, the food receiving portion comprising a substantially planar surface and a plurality of channels each being recessed downwardly into the planar surface and extending across at least a portion of the planar surface, with at least one channel and a corresponding portion of the at least one edge delineating a respective detachable portion of the food receiving portion, each of the detachable portions selectively separable from other detachable portions; and
   a cover selectively engageable with at least a portion of the raised rim of the base, the cover comprising a substantially downward facing interior surface and a substantially upward facing exterior surface, the interior surface having a perimeter channel sized and dimensioned to engage the at least a portion of the raised rim of the base when the cover is engaged with the base, and the cover sized and shaped to provide an interior chamber which protects the food product, the interior chamber defined at least in part by the interior surface of the cover and a corresponding part of the food receiving portion.

2. The food container of claim 1 wherein the at least one detachable portion is selectively separable along a separation line formed into the base along the at least one channel.

3. The food container of claim 2 wherein the at least one edge includes a notch directed inwards towards the raised rim, the notch aligned with the separation line.

4. The food container of claim 2 wherein a subset of the channels have separation lines.

5. The food container of claim 2 wherein the base comprises a material that has a uniform thickness except at the separation lines, the separation lines which comprise a portion of the base that has a reduced thickness relative to other portions of the base.

6. The food container of claim 2 wherein the separation line comprises a line of a plurality of perforations.

7. The food container of claim 2 wherein the separation line comprises a line that has been weakened before distribution of the food container by the manufacture thereof.

8. The food container of claim 2 further comprising:
a flange that extends outwardly the raised rim of the base.

9. The food container of claim 2 further comprising:
a flange that extends outwardly from the food receiving portion, the flange having a first pair of parallel sides and a second set of parallel sides that form an exterior periphery for the food container, wherein the first pair and the second pair of parallel sides surrounds the raised rim.

10. The food container of claim 9, wherein the flange includes at least one notch located along one of the sides of the flange, the at least one notch directed inwards towards the raised rim and aligned with the separation line.

11. The food container of claim 10, wherein the at least one notch is manipulable to effect a separation along the separation line.

12. The food container of claim 1 wherein the base comprises a number N of sector portions, the cover comprises the number N of interior chambers, and each of the interior chambers is vertically aligned with one of the detachable portions when the cover is engaged with the base.

13. The food container of claim 1 wherein the cover includes a plurality of detachable cover portions, each of the cover detachable portions corresponding to a detachable portion on the base, and at least one of the cover detachable portions is selectively detachable from at least one other cover detachable portions.

14. The food container of claim 1 wherein the base comprises a number N of sector portions, the cover comprises a number M of interior chambers, and wherein N is a positive integer and M is a positive integer that is less than N.

15. The food container of claim 1 wherein the base is rectangular in shape with a length and a width and each of the channels extends across at least a portion of the width of the base.

16. The food container of claim 1 wherein each detachable portion includes a raised detachable portion rim which extends upward from the planar surface and is adjacent at least one of the channels which delineate the detachable portion.

17. The food container of claim 1 wherein the base has a rectangular-shaped outer perimeter with rounded corners, the outer perimeter defined by first and second parallel edges and third and fourth parallel edges, and each of the channels are non-parallel with each of the first, second, third, and fourth edges.

18. The food container of claim 1 wherein the base comprises a base flange surrounding at least a portion of the raised rim, and the cover comprises a cover flange surrounding at least a portion of the perimeter channel of the interior surface.

19. The food container of claim 18 wherein the base flange comprises at least one base fastening recess which extends downwardly from the base flange, and the cover flange comprises at least one corresponding cover fastening protrusion which extends downwardly from the cover flange, the at least one base fastening recess sized and dimensioned to receive at least a portion of the at least one cover fastening protrusion when the cover is engaged with the base.

20. The food container of claim 19 wherein the at least one base fastening recess and the at least one cover fastening protrusion are each sized and dimensioned to provide an audible cue when the at least one base fastening recess is separated from the cover fastening protrusion.

21. The food container of claim 19 wherein the at least one base fastening recess has a depth that is greater than 5 millimeters and a diameter that is greater than 8 millimeters, and the at least one cover fastening protrusion has a depth which is 1 millimeter less than the depth of the at least one base fastening recess, and a diameter which is 1 millimeter greater than the diameter of the at least one base fastening recess.

22. The food container of claim 18 wherein the base flange comprises at least one base fastening protrusion which extends upwardly from the base flange, and the cover flange comprises at least one corresponding cover fastening recess which extends upwardly from the cover flange, the at least one cover fastening recess sized and dimensioned to receive at least a portion of the at least one base fastening protrusion when the cover is engaged with the base.

23. The food container of claim 1 wherein each detachable portion comprises a sector well that extends downwardly from the planar surface.

24. The food container of claim 23 wherein the sector well of each detachable portion has a rim adjacent the planar surface, the rim having a profile in the shape of at least one of an oval, a circle, a triangle, a square, or a symbol.

25. The food container of claim 24 wherein each of a plurality of features comprising the raised rim, the sector wells, the channels, and the raised sector ribs is spaced apart from at least one other of the plurality of features by a distance which is less than or equal to one inch.

26. The food container of claim 1 wherein each detachable portion comprises a plurality of raised sector ribs extending upwardly from the planar surface.

27. The food container of claim 1 wherein the base has an overall height which is less than or equal to 1.5 inches.

28. The food container of claim 1 wherein each of the base and the cover is formed from a single layer of material having a thickness in the range of 0.5 millimeters to 1.0 millimeters.

29. The food container of claim 1 wherein each detachable portion of the base does not have a continuously planar surface which exceeds 2 inches by 2 inches.

30. The food container of claim 1 wherein the base has a length dimension which is greater than or equal to 12 inches.

31. The food container of claim 1 wherein each of the base and the cover is formed from one of sugarcane fiber, wood fiber, bamboo fiber, or paper; or plastic, biodegradable plastic, or other synthetic materials.

32. The food container of claim 1 wherein the base has a square perimeter with rounded edges, and the raised rim that forms the perimeter of the food receiving portion has a circular profile.

33. The food container of claim 1 wherein the cover has at least one denesting lug which provides a space between at least a portion of the cover and at least a portion of another cover when the cover is stacked together with the other cover.

34. The food container of claim 1 wherein the food container is positionable on a platen to receive a food item, and wherein the base includes a plurality of registration features that selectively, physically engage with corresponding registration features on the platen to align the base on the platen.

35. The food container of claim 34 wherein the registration features on the platen include one or more apertures and the registration features on the base include a corresponding number of tabs, each tab which is sized and shaped to securely physically engage with the one of the apertures.

36. The food container of claim 34 wherein each detachable portion comprises a sector well that extends downwardly from the planar surface, wherein the registration feature on the platen includes one or more apertures, and the registration features on the base include one or more sector wells, and wherein each of the one or more sector wells on the base are sized, shaped, and positioned to engage with a corresponding aperture on the platen to thereby align the food container on the platen.

37. The food container of claim 34 wherein the registration features on the platen include one or more protrusions extending upward and the registration features on the base include a corresponding number of apertures or raised portions, each protrusion which is sized and shaped to securely physically engage with the one of the apertures or raised portions.

38. The food container of claim 1 wherein the plurality of channels comprises a number N of channels which delineate a corresponding number N+1 of detachable portions of the food receiving portion, where N is a positive integer.

39. The food container of claim 1 wherein the plurality of channels comprises a number N of channels which delineate a corresponding number N of detachable portions of the food receiving portion, where N is a positive integer.

40. The food container of claim 1 wherein at least some of the channels intersect with other channels.

41. The food container of claim 1 wherein the base and the cover are each formed from a single layer of material, and the base and the cover are sized and dimensioned to be nestable with other bases and covers, respectively.

42. The food container of claim 1 wherein the plurality of channels are equally radially spaced to enable cutting of the food product into equally sized pieces when a cutting tool moves along the channels.

\* \* \* \* \*